(12) United States Patent
Misaki

(10) Patent No.: US 8,709,265 B2
(45) Date of Patent: Apr. 29, 2014

(54) METHOD FOR MANUFACTURING TOUCH PANEL AND METHOD FOR MANUFACTURING DISPLAY DEVICE PROVIDED WITH TOUCH PANEL

(75) Inventor: Katsunori Misaki, Yonago (JP)

(73) Assignee: Sharp Kabushiki Kaisha, Osaka (JP)

( * ) Notice: Subject to any disclaimer, the term of this patent is extended or adjusted under 35 U.S.C. 154(b) by 66 days.

(21) Appl. No.: 13/511,147

(22) PCT Filed: Nov. 18, 2010

(86) PCT No.: PCT/JP2010/070618
§ 371 (c)(1),
(2), (4) Date: May 22, 2012

(87) PCT Pub. No.: WO2011/065292
PCT Pub. Date: Jun. 3, 2011

(65) Prior Publication Data
US 2012/0241408 A1 Sep. 27, 2012

(30) Foreign Application Priority Data
Nov. 26, 2009 (JP) ................. 2009-269037

(51) Int. Cl.
*H01B 13/00* (2006.01)
*C30B 33/00* (2006.01)
*B29D 15/00* (2006.01)
*H01L 51/40* (2006.01)
*H01L 27/14* (2006.01)
*G06F 3/041* (2006.01)

(52) U.S. Cl.
USPC .................. 216/20; 216/23; 216/24; 216/49; 216/58; 216/83; 438/28; 438/30; 438/689; 438/704; 257/72; 345/173

(58) Field of Classification Search
USPC ...................... 216/23, 24, 49, 58, 83; 257/72; 345/173; 438/28, 39, 689, 704
See application file for complete search history.

(56) References Cited

U.S. PATENT DOCUMENTS

| 6,010,918 A | 1/2000 | Marino et al. |
| 7,499,114 B2 * | 3/2009 | Choi et al. ..................... 349/12 |

(Continued)

FOREIGN PATENT DOCUMENTS

| JP | 2008-233976 A | 10/2008 |
| JP | 2009-129604 A | 6/2009 |

(Continued)

OTHER PUBLICATIONS

Official Communication issued in International Patent Application No. PCT/JP2010/070618, mailed on Feb. 8, 2011.

*Primary Examiner* — Nadine Norton
*Assistant Examiner* — Christopher Remavege
(74) *Attorney, Agent, or Firm* — Keating & Bennett, LLP

(57) ABSTRACT

Provided is a touch panel manufacturing method wherein the number of exposure masks needed for pattern formation is reduced, and a method for manufacturing a display device provided with a touch panel. A transparent conductive film layer (11) and a metal layer (12) are laminated on a transparent substrate (1), and the transparent conductive film layer (11) and the metal layer (12) are formed into predetermined electrode patterns, with use of one resist pattern. A protective film (13) covering the transparent conductive film layer (11) and the metal layer (12) is formed, and openings (14, 15, and 16) are provided at predetermined positioned in the protective film (13). By etching with use of the protective film (13) having the openings (14, 15, and 16), the metal layer (12) is removed so that the transparent conductive film layer (11) is exposed, whereby at least either touch electrodes (2) or connection terminals (5) are formed.

16 Claims, 34 Drawing Sheets

(56) References Cited

U.S. PATENT DOCUMENTS

| | | | |
|---|---|---|---|
| 8,178,383 B2 * | 5/2012 | Liu et al. | 438/70 |
| 8,388,852 B2 * | 3/2013 | Huang et al. | 216/43 |
| 8,475,872 B2 * | 7/2013 | Kang et al. | 427/282 |
| 2002/0016075 A1 | 2/2002 | Peng et al. | |
| 2006/0097991 A1 | 5/2006 | Hotelling et al. | |
| 2006/0118788 A1 * | 6/2006 | Park | 257/72 |
| 2007/0263129 A1 * | 11/2007 | Park et al. | 349/12 |
| 2009/0096759 A1 | 4/2009 | Nishiwaki et al. | |
| 2010/0012937 A1 * | 1/2010 | Lee et al. | 257/59 |
| 2011/0006998 A1 * | 1/2011 | Kang et al. | 345/173 |
| 2011/0063238 A1 * | 3/2011 | Liu et al. | 345/173 |
| 2011/0073855 A1 * | 3/2011 | Lin | 257/43 |
| 2011/0254808 A1 * | 10/2011 | Lin et al. | 345/175 |

FOREIGN PATENT DOCUMENTS

| | | |
|---|---|---|
| WO | 2005/029169 A1 | 3/2005 |
| WO | 2007/144993 A1 | 12/2007 |

* cited by examiner (a)

(b)

(c)

(a)

(b)

(c)

(d)

(a)

(b)

(c)

METHOD FOR MANUFACTURING TOUCH PANEL AND METHOD FOR MANUFACTURING DISPLAY DEVICE PROVIDED WITH TOUCH PANEL

TECHNICAL FIELD

The present invention relates to a method for manufacturing a touch panel having touch electrodes formed with transparent conductive films on an insulative transparent substrate, and to a method for manufacturing a display device provided with a touch panel.

BACKGROUND ART

Recently, with the spread of personal digital assistants (PDA), palm top computers, portable game equipment, etc., a touch panel formed on a transparent substrate has been used widely as an input means that can be combined with a display device.

For example, in a liquid crystal display device as a touch-panel-equipped display device, a transparent touch panel is laminated on an image display surface of liquid crystal panel, and an image displayed on the liquid crystal panel can be viewed through the touch panel. Such a liquid crystal display device is configured so that when a surface of the touch panel on a viewed side, that is, a surface thereof on which display images on the liquid crystal panel are observed, is pressed with a fingertip or an input pen in response to an image displayed thereon, the pressed position can be detected. This allows input contents to the touch panel to be reflected on the control of used equipment such as a PDA.

An electrostatic capacitance touch panel as an exemplary touch panel in which a transparent substrate is used has the following configuration: touch electrodes formed of transparent conductive films are formed as two-dimensional patterns on an insulative transparent substrate such as a glass plate or a film. Particularly, a projection-type electrostatic capacitance touch panel having touch electrodes arranged at predetermined intervals is capable of detecting a plurality of touched points at the same time, that is, applicable to so-called multitouching. Therefore, it particularly has attracted attention in recent years.

In such an electrostatic capacitance touch panel, touch electrodes formed in an area that overlaps an image display surface of a display panel are formed with transparent conductive films. On the other hand, connection terminals for outputting potentials of touch electrodes to an external circuit board, and lead lines for connecting the touch electrodes and the connection terminals are formed with metal layers made of a metal material such as aluminum, which has a lower resistance than that of the transparent conductive film. In the case where metal layers are used as connection terminals or lead lines, surfaces of the metal layers are covered with protective films so that oxidation or exfoliation of the metal layers is prevented. However, at least a part of each connection terminal should not be covered with a protective film, but has to be exposed, because they are connected to connection members such as a flexible printed circuit board (FPC) that connects the touch panel and external circuits.

FIG. 33 are cross-sectional views showing exemplary steps of a conventional process for manufacturing an electrostatic capacitance touch panel. It should be noted that in each of FIG. 33(a), FIG. 33(b), and FIG. 33(c), the left-side illustration shows a cross section of a part where a touch electrode is formed, that is, a cross section of a part A taken along an arrow line A-A' in FIG. 1 showing electrode patterns. Further, in each of FIG. 33(a), FIG. 33(b), and FIG. 33(c), the central illustration shows a cross section of a part where a lead line is formed, that is, a cross section of a part B taken along an arrow line B-B' in FIG. 1 showing the electrode patterns. Still further, in each of FIG. 33(a), FIG. 33(b), and FIG. 33(c), the right-side illustration shows a cross section of a part where a connection terminal is formed, that is, a cross section of a part C taken along an arrow line C-C' in FIG. 1 showing the electrode patterns.

As shown in FIG. 33, in the conventional touch panel manufacturing method, an aluminum (Al) layer and a molybdenum (Mo) layer covering the aluminum layer are formed by sputtering sequentially over an entire surface of a transparent substrate 701 formed of glass or a transparent film, and a resist film is formed thereover. Then, this resist film is exposed and developed by using a mask in such a manner that the resist film remains only on portions where lead lines and connection terminals are to be formed. Thereafter, etching is carried out using the remaining resist film as a mask. As a result, as shown in FIG. 33(a), metal layers each of which is made of a laminate of an aluminum layer 711 and a molybdenum layer 712 are formed on portions where lead lines and connection electrodes are to be formed.

Subsequently, on the transparent substrate 701, a transparent conductive film layer such as ITO (indium tin oxide) is formed by sputtering. Then, after a resist film (not shown) is applied on the transparent conductive film layer, the resist film is exposed and developed so as to remain on the touch electrode portions and the connection terminal portions. By etching the transparent conductive film layer by using this resist film as a mask, transparent conductive film layers 713 are formed on the laminates each of which is composed of the aluminum layer 711 and the molybdenum layer 712, on the touch electrode portions and the connection terminal portions. The configuration in which the transparent conductive films 713 are formed is shown in FIG. 33(b).

Thereafter, a protective film 714 made of SiN, SiO$_2$, or a transparent resin are formed over an entirety of the transparent substrate 701 by CVD or the like. Then, the protective film 714 is etched by using a resist pattern, whereby openings 715 are formed at the connection terminal portions.

Thus, the touch panel provided with touch electrodes 702, floating electrodes 703, lead electrodes 704, and connection terminals 705 as shown in FIG. 33(c) is produced. Here, the touch electrodes 702 are formed with transparent conductive film layers 713 formed as two-dimensional patterns. The floating electrodes 703 are formed with the transparent conductive film layers 713 provided between the touch electrodes 702. Each of the lead electrodes 704 is formed of the laminate of the aluminum layer 711 and the molybdenum layer 712. Each of the connection terminals 705 is formed of a laminate of the aluminum layer 711, the molybdenum layer 712, and the transparent conductive film layer 713. It should be noted that in this touch panel, the protective film 714 made of a transparent resin is formed over an entire surface of the panel except for the openings 715 above the connection terminals 705.

The following description explains another exemplary conventional method for manufacturing a touch panel. In the case where the touch electrodes are finely patterned, or in the case where lead lines are provided in narrow areas, lead lines are formed in a two-layer structure on a transparent substrate so that those in one layer should not be conductive with those in the other layer. In this case, connection terminals are also formed in a two-layer structure so as to match the layers where the lead lines connected with the connection terminals are formed.

FIGS. 34 and 35 are cross-sectional views showing exemplary steps of a process for manufacturing an electrostatic capacitance touch panel in which lead lines are formed in a three-dimensionally two-layer structure.

It should be noted that in each of FIGS. 34(a) to 34(c), and FIGS. 35(a) to 35(c), the left-side illustration shows a cross section of a part where a touch electrode is formed, that is, a cross section of a part D taken along an arrow line D-D' in FIG. 6 showing electrode patterns of a touch panel having lead lines divided in two layers. Further, in each of FIGS. 34(a) to 34(c) and FIGS. 35(a) to 35(c), the central illustration shows a cross section of a part where the lead lines are formed, that is, a cross section of a part E taken along an arrow line E-E' in FIG. 6 showing the electrode patterns. Still further, in each of FIGS. 34(a) to 34(c) and FIGS. 35(a) to 35(c), the right-side illustration shows a cross section of a part where connection terminals are formed, that is, a cross section of a part F taken along an arrow line F-F' in FIG. 6 showing the electrode patterns.

First, an aluminum layer and a molybdenum layer covering the aluminum layer are formed sequentially by sputtering over an entire surface of a transparent substrate 801 made of glass or a transparent film, and a resist film is formed thereover. Then, this resist film is exposed and developed in such a manner that the resist film remains only on portions where lead lines and connection terminals are to be formed in a first layer, that is, a lower layer that is formed immediately on the transparent substrate. Etching is carried out using this remaining resist film as a mask. As a result, as shown in FIG. 34(a), laminates each of which is made of an aluminum layer 811 and a molybdenum layer 812 are formed on portions where lead lines of the first layer and connection electrodes of the first layer are to be formed.

Subsequently, as shown in FIG. 34(b), a protective film 813 of the first layer, which is made of SiN, SiO$_2$, or a transparent resin and has a function as an interlayer insulative film between the first layer and a second layer, is formed by CVD or the like.

Next, an aluminum layer and a molybdenum layer covering the aluminum layer are formed sequentially by sputtering over the protective film 813 thus formed for the first layer, and a resist film is formed thereover. Then, this resist film is exposed and developed in such a manner that the resist film remains only on portions where lead lines and connection terminals are to be formed in the second layer, that is, an upper layer on a surface side of the touch panel. Thereafter, etching is carried out using this remaining resist film as a mask. As a result, as shown in FIG. 34(c), laminates each of which is made of an aluminum layer 814 and a molybdenum layer 815 are formed on portions where lead lines of the second layer and connection electrodes of the second layer are to be formed.

Next, the patterned resist film is caused to remain on the protective film 813 of the first layer, except for areas above the laminates of the aluminum layer 811 and the molybdenum layer 812 that are to become the connection terminals of the first layer. The protective film 813 of the first layer is etched by using this resist film as a mask, whereby an opening 816 is formed and a surface of the molybdenum layer 812 is exposed. This state is shown in FIG. 35(a).

Subsequently, a transparent conductive film layer made of ITO or the like is formed by CVD or the like on a surface of the protective film 813 of the first layer. Then, a resist film is formed so as to be patterned in accordance with two-dimensional patterns of touch electrodes and floating electrodes formed between the touch electrodes. Here, at the same time, the resist film is caused to remain in the part F where the connection terminal is to be formed, in such a manner that the resist film covers the opening 816 of the protective film 813 of the first layer. Then, etching is carried out by using this resist film, so that the transparent conductive film layer 817 thus patterned remains on portions in the part D where the touch electrode and the floating electrode are to be formed, and on a portion in the part F to cover the connection terminal of the first layer, as shown in FIG. 35(b).

Next, over an entire surface of the transparent substrate 801, a protective film 818 of the second layer, made of SiN, SiO$_2$, or a transparent resin is formed by CVD. A resist film is formed in a patterned form such that the resist film remains on the protective film 818 of the second layer except for areas where the connection terminal of the first layer and the connection terminal of the second layer are to be formed. Etching is carried out by using this resist film as a mask, so that openings 819 and 820 are formed in the protective film 818 of the second layer. As a result, as shown in FIG. 35(c), a touch panel is produced that is provided with the floating electrode 803, the lead electrode 804a of the first layer, the lead electrode 804b of the second layer, the connection terminal 805a of the first layer, and the connection terminal 805b of the second layer. Here, the floating electrode 803 is covered with the protective film 818 of the second layer, and is formed between the touch electrodes 802. Surfaces of the connection terminal 805a of the first layer and the connection terminal 805b of the second layer are exposed in openings 816, 819, and 820 provided in the protective film 813 of the first layer and the protective film 818 of the second layer.

It should be noted that, for example, JP2008-233976A proposes that in the case where the lead lines and the connection terminals, together with touch electrodes, are formed with transparent conductive layers, portions of the transparent conductive films where the touch electrodes and the lead lines are connected are made thicker than the touch electrode portions, so that the electric conduction between the touch electrodes and the lead lines is ensured further.

DISCLOSURE OF THE INVENTION

In the above-described conventional touch panel manufacturing method, even in the case of the touch panel as shown in FIG. 33 in which the lead lines 407 and the connection terminals 705 are provided in one layer, at least three exposure masks are needed. More specifically, first, a first exposure mask is needed for forming a pattern of metal layers of the lead lines 704 and the connection terminals 705 each of which is formed with the aluminum film 711 and the molybdenum film 712. Then, a second exposure mask is needed for patterning the transparent conductive film layer 713 that forms the touch electrodes 702 and the floating electrodes 703, and functions as a protective film for the metal layers of the connection terminals 705. Further, a third exposure mask is needed for forming the openings 715 in the protective film 714, so that the openings 715 become through holes for providing conduction in portions where the connection terminals 705 are to be formed.

Further, as shown in FIGS. 34 and 35, in the case of the touch panel in which the metal layers of the lead lines 804 and the connection terminals 805 are formed in a two-layer structure, at least five exposure masks are needed. First, a first exposure mask is needed for forming a pattern of the lead lines 804a of the first layer and the connection terminals 805a of the first layer, each of which is formed of the aluminum film 811 and the molybdenum film 812. Then, a second exposure mask is needed for forming a pattern of the lead lines 804b of the second layer and the connection terminals 805b of the second layer, each of which is formed of the aluminum film 814 and the molybdenum film 815. Further, a third exposure mask is needed for forming the openings 816 in the protective film 813 of the first layer so as to expose the connection terminals 805a of the first layer therein. Then, a fourth exposure mask is needed for patterning the transparent conductive film 817 that functions as a film for protecting the touch electrodes 802, the floating electrodes 803, the metal layers of the connection terminals 805a of the first layer, and the metal layers of the connection terminals 805b of the second layer. Still further, a fifth exposure mask is needed for forming openings 819 and 820 that are to be through holes for conduction in portions in the protective film 818 of the second layer where the connection terminals 805a and 805b are to be formed.

Thus, using a multiplicity of exposure masks needs a multiplicity of exposing and developing steps for forming resist patterns, and a multiplicity of etching steps using the resist patterns thus formed. Therefore, this leads to an increase in the manufacturing costs and time needed for manufacturing a touch panel. Further, an increase in the number of exposure masks means an increase in the number of times of carrying out mask alignment. Therefore, this is consequently a factor of increasing displacements of the layers formed, and leads to a decrease in the pattern precision of a produced touch panel.

Therefore, an object of embodiments described below is to provide a method for manufacturing a touch panel characterized in that the number of exposure masks needed for forming a pattern is reduced, and to provide a method for manufacturing a display device provided with such a touch panel.

A touch panel manufacturing method according to one embodiment of the present invention includes: sequentially laminating a transparent conductive film layer and a metal layer on an insulative transparent substrate, and thereafter, forming the transparent conductive film layer and the metal layer into a predetermined electrode pattern, using a same resist pattern; forming a protective film that covers the transparent conductive film layer and the metal layer, and providing an opening at a predetermined position in the protective film so that the opening passes through the protective film; and removing the metal layer by etching with use of the protective film having the opening, so as to expose the transparent conductive film layer, thereby forming at least one of a touch electrode and a connection terminal that outputs a potential of the touch electrode to outside of the touch panel.

By the method for manufacturing a touch panel according to one embodiment of the present invention, the number of exposure masks needed for forming a pattern can be reduced.

EMBODIMENTS FOR CARRYING OUT THE INVENTION

Figure 1:
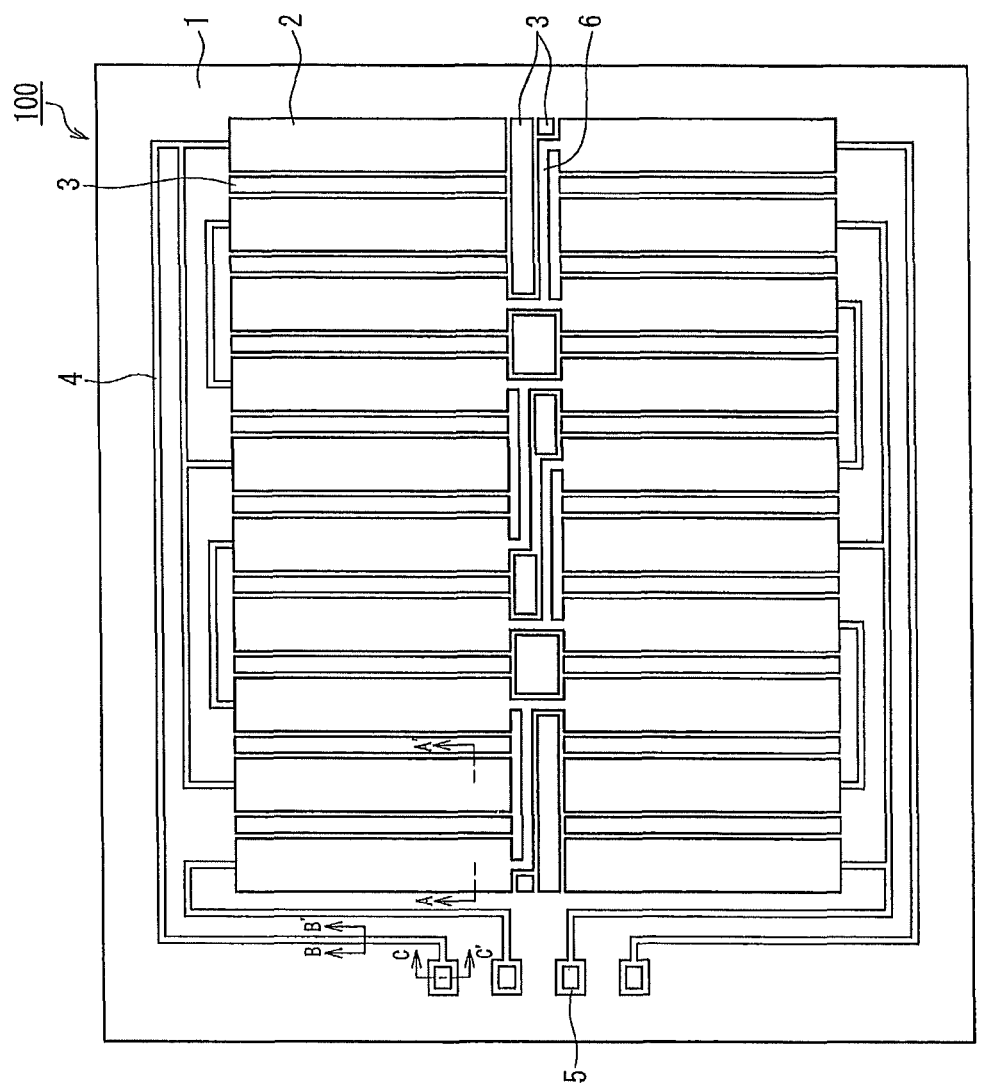
FIG. 1 is a plan view showing electrode patterns of a touch panel that is manufactured by a touch panel manufacturing method according to Embodiment 1 and in which lead lines are formed in one layer.

A touch panel manufacturing method according to one embodiment of the present invention includes: sequentially laminating a transparent conductive film layer and a metal layer on an insulative transparent substrate, and thereafter, forming the transparent conductive film layer and the metal layer into a predetermined electrode pattern, using a same resist pattern; forming a protective film that covers the transparent conductive film layer and the metal layer, and providing an opening at a predetermined position in the protective film so that the opening passes through the protective film; and removing the metal layer by etching with use of the protective film having the opening, so as to expose the transparent conductive film layer, thereby forming at least one of a touch electrode and a connection terminal that outputs a potential of the touch electrode to outside of the touch panel (first method).

By the above-described method, for example, a touch panel in which touch electrodes, lead lines, and connection terminals are formed on the same layer can be manufactured with use of two exposure masks. More specifically, the touch panel having the above-described configuration can be manufactured with use of a first exposure mask for forming the transparent conductive film layer and the metal layer into the predetermined electrode pattern, and a second exposure mask for forming the opening at the predetermined position in the protective film. Therefore, as compared with the conventional touch panel manufacturing method that requires at least three exposure masks in order to manufacture a touch panel having the same electrode pattern, the simplification of the manufacturing steps and the reduction of costs can be achieved by the decrease in the number of masks. Besides, it is possible to manufacture a touch panel at high accuracy, with less mask position displacement, due to the decrease in the number of times of mask alignment.

The above-described first method preferably further includes: laminating a surface transparent conductive film layer on the metal layer, and thereafter, forming the surface transparent conductive film layer into the predetermined electrode pattern, using the same resist pattern; and modifying a portion of the surface transparent conductive film layer thus formed, the portion being to become the connection terminal, so that the portion should not be removed by the etching (second method).

This makes it possible to manufacture the touch panel having the connection terminal that is formed with a lamination of metal layers having low resistances and whose exposed surface is covered and protected with the transparent conductive film layer, without an increase in the number of masks.

In the above-described first or second method, preferably, the protective film is formed of an organic resin film, and the method further includes exposing the transparent conductive film layer by the etching, and thereafter, partially fusing the protective film so as to smoothen a wall surface of the opening (third method).

This makes it possible to prevent the protective film from being damaged when the touch panel is used. More specifically, the above-described method causes projections and recesses on wall surface of the openings in the protective film to be eliminated, and therefore, prevents the wall surfaces from hooking something when the touch panel is used. Therefore, a touch panel with excellent durability can be manufactured.

The above-described first method preferably includes: sequentially laminating the transparent conductive film layer of a first layer and the metal layer of the first layer on the transparent substrate, and thereafter, forming the transparent conductive film of the first layer and the metal layer of the first layer into a predetermined electrode pattern, using a same resist pattern; forming the protective film of the first layer that covers the transparent conductive film layer of the first layer and the metal layer of the first layer; sequentially laminating a transparent conductive film layer of a second layer and a metal layer of the second layer on the protective film of the first layer, and thereafter, forming the transparent conductive film layer of the second layer and the metal layer of the second layer into a predetermined electrode pattern, using a same resist pattern; forming a protective film of the second layer that covers the transparent conductive film layer of the second layer and the metal layer of the second layer; providing the opening of the first layer at the predetermined position in the protective film of the first layer and providing an opening of the second layer at a predetermined position in the protective film of the second layer so that the opening of the first layer passes through the protective film of the first layer and the opening of the second layer passes through the protective film of the second layer; and removing the metal layer of the first layer and the metal film of the second layer by etching with use of the protective film of the first layer having the opening of the first layer and the protective film of the second layer having the opening of the second layer, so as to expose the transparent conductive film layer of the first layer and the transparent conductive film layer of the second layer, thereby forming at least one of the touch electrode and the connection terminal (fourth method).

This makes it possible to manufacture a touch panel having touch electrodes, lead electrodes, connection terminals formed in a two-layer structure, with three exposure masks. More specifically, the above-described touch panel can be manufactured with use of a first exposure mask for forming the electrode pattern of the first layer, a second exposure mask for forming the electrode pattern of the second layer, and a third exposure mask for forming the predetermined openings in the protective films of the first layer and the second layer.

In the above-described fourth method, preferably, the protective film of the first layer and the protective film of the second layer are formed with a same material, and the opening of the first layer in the protective film of the first layer is formed at the same time when the opening of the second layer in the protective film of the second layer, by using the resist pattern formed on the protective film of the second layer as a mask (fifth method). This makes it possible to manufacture a touch panel with use of three exposure masks.

In the fourth method, preferably, the protective film of the first layer is formed with a material different from that of the protective film of the second layer, and the opening of the first layer in the protective film of the first layer is formed by using the protective film of the second layer having the opening of the second layer as a mask (sixth method). This makes it possible to manufacture a touch panel with use of three exposure masks, even in the case where the protective films of the first and second layers are formed with different materials.

In one of the above-described fourth to sixth methods, preferably, the protective film of the second layer is formed with an organic resin film, and the method further includes exposing the transparent conductive film layer of the first layer and the transparent conductive film layer of the second layer by the etching, and thereafter, partially fusing the protective film of the second layer so as to smoothen wall surfaces of the opening of the first layer and the opening of the second layer (seventh method). This makes it possible to prevent the protective films from being damaged when the touch panel is used, even in the case where touch electrodes, lead electrodes, and connection terminals are formed in a two-layer structure. Therefore, by the above-described method, a touch panel with high durability can be manufactured.

In the first method, preferably, a part of a lead line for connecting the touch electrode and the connection terminal is formed with a rerouting line formed in a different layer than a layer where the touch electrode and the connection terminal are formed; another one of the opening is formed in a portion of the protective film where the rerouting line and the lead line are to be connected; the portion where the rerouting line and the lead line are connected is formed as a part of the predetermined electrode pattern; and the rerouting line is formed by patterning a conductive film formed on the protective film with use of a resist pattern (eighth method).

This makes it possible to manufacture a touch panel in which a part of the lead line is formed with a rerouting line, with use of three exposure masks More specifically, the above-described touch panel can be manufactured with use of a first exposure mask for forming the transparent conductive film layer and the metal layer into the predetermined electrode pattern, a second exposure mask for forming the opening in the protective film, and a third exposure mask for forming the rerouting line.

In the above-described eighth method, preferably, the rerouting line is provided in a portion where the lead line crosses another lead line three-dimensionally (ninth method).

Since the lead lines can be crossed three-dimensionally with this rerouting line, the degree of freedom in the design of lead lines can be increased.

In the above-described eighth method, preferably, a part of the lead line other than the part is also formed with the rerouting line, and a portion where the lead line crosses another lead line three-dimensionally is provided in the same layer where the touch electrode and the connection terminal are provided (tenth method).

This configuration also makes it possible to manufacture a touch panel with use of three exposure masks, as is the case with the above-described eighth method.

In one of the eighth to tenth methods, preferably, the resist pattern remains above the rerouting line, so as to function as a protective film for the rerouting line (eleventh method). This makes it possible to protect the rerouting line, without forming another protective film.

In one of the eighth to tenth methods, preferably, an insulative surface protective film is formed on areas other than the exposed transparent conductive film layer, so as to cover the rerouting line (twelfth method). This surface protective film prevents the metal layer from being exposed to air and oxidized.

In one of the first to twelfth methods, preferably, between the touch electrode and another touch electrode, a floating electrode that is not conductive to the touch electrodes is provided, and the floating electrode is formed with the transparent conductive film layer, at the same time when the touch electrodes are formed (thirteenth method).

This makes the electrode patterns of the touch electrodes less visible to a user. Moreover, this makes it possible to prevent generation of undesired floating charges at portions where the touch electrodes are formed.

A method for manufacturing a display device provided with the touch panel according to one embodiment of the present invention includes: forming a display panel by using, as a substrate, the transparent substrate of the touch panel manufactured by the touch panel manufacturing method according to any one of the first to thirteenth methods (fourteenth method).

This allows the transparent substrate of the touch panel to double as the substrate of the display panel. Further, this makes it possible to manufacture a display device provided with a touch panel at low costs and with accuracy in electrode pattern formation, taking advantage of the characteristics of the touch panel manufacturing method of the present invention.

Further, a method for manufacturing a display device provided with the touch panel according to one embodiment of the present invention includes forming a display panel having a front substrate and a back substrate, and thereafter, forming a touch panel by using, as a transparent substrate, the front substrate of the display panel, by the touch panel manufacturing method according to any one of the first to thirteenth methods (fifteenth method).

This manufacturing method also allows the transparent substrate of the touch panel to double as the substrate of the display panel.

In the fourteenth or fifteenth method, the display panel is preferably a liquid crystal panel (sixteenth method).

Hereinafter, a method for manufacturing a touch panel according to one embodiment of the present invention, and a method for manufacturing a display device provided with a touch panel are explained by using specific embodiments and referring to drawings.

It should be noted that the following explanation of respective embodiments of the touch panel manufacturing method and the method for manufacturing a display device provided with a touch panel is explained by referring to, as a touch panel, a projection-type electrostatic capacitance touch panel formed on a transparent substrate made of glass. The touch panel manufacturing method of each embodiment described below is not limited to the method for manufacturing a projection-type electrostatic capacitance touch panel, but can be used as a method for manufacturing various types of touch panels having, as touch electrodes, transparent conductive film layers formed as two-dimensional patterns on a transparent substrate.

Further, the drawings referred to hereinafter show, in a simplified manner, only principal members needed for explanation among constituent members of a touch panel and a display device formed by a touch panel manufacturing method and a method for manufacturing a display device provided with the touch panel, for convenience of explanation. Therefore, the touch panel manufacturing method and the method for manufacturing a display device provided with the touch panel can be applied as a method for manufacturing a touch panel and a display device that include arbitrary constituent members that are not shown in the drawings that are referred to. Further, the dimensions of the members shown in the drawings, particularly the dimensions thereof in the touch panel thickness direction, do not necessarily faithfully reflect actual dimensions of constituent members, dimensional ratios of the members, etc.

[Embodiment 1]

First, a method for manufacturing a touch panel in which touch electrodes, lead lines, and connection terminals are formed in one layer on a transparent substrate is explained as Embodiment 1.

FIG. 1 is a plan view showing a touch electrode pattern in a touch panel 100 manufactured by a touch panel manufacturing method according to Embodiment 1.

In the touch panel 100, transparent conductive film layers made of ITO or the like are formed as two-dimensional patterns on a glass substrate 1 as an insulative transparent substrate, whereby touch electrodes 2 are formed thereon. Since the touch panel 100 of the present embodiment is a projection-type electrostatic capacitance touch panel, the touch electrodes 2 are formed in a manner such that a plurality of approximately-rectangular electrode patterns in the same size are arranged as shown in FIG. 1. In the touch panel of the present embodiment, ten of the electrode patterns are arrayed in a line in a horizontal direction, and two of such lines of the electrode patterns are arrayed in a vertical direction. Thus, the touch panel 100 includes twenty of the electrode patterns in total.

It should be noted that the arrayed patterns of the touch electrodes 2 are not limited to the example shown in FIG. 1. Therefore, the electrode pattern shape of the touch electrodes 2 may be a shape other than the rectangle shown in FIG. 1, and the number of the patterns arrayed in the horizontal and vertical directions is not limited to 10×2.

In a projection-type electrostatic capacitance touch panel, patterned touch electrodes need to be provided at predetermined intervals, for example, about 200 μm to 800 μm, so as to detect a position of a user's finger in contact with a vicinity of the touch electrodes. Therefore, areas where no touch electrode is formed are present between the touch electrodes.

In the touch panel 100 of the present embodiment, as shown in FIG. 1, floating electrodes 3 formed with transparent conductive films made of ITO, etc., as is the case with the touch electrodes 2, are provided between the touch electrodes 2.

It should be noted that the floating electrodes 3 make the electrode patterns of the touch electrodes 2 less visible to a user. Besides, the floating electrodes 3 prevent undesired floating charges from being accumulated in areas between the touch electrodes 2 where no touch electrode 2 is formed, and from causing fluctuations of potentials of the touch electrodes. Therefore, there is no limitation on the arrangement intervals and shapes of the floating electrodes 3, unlike the touch electrodes 2. In the touch panel 100 of the present embodiment shown in FIG. 1, a rectangular floating electrode 3 having the same long side length as the long side length of the touch electrode 2 is provided between horizontally adjacent ones of the touch electrodes 2 as viewed in FIG. 1. On the other hand, between vertically adjacent ones of the touch electrodes 2, there are provided quadrilateral floating electrodes 3 having various aspect ratios as shown in FIG. 1, so as to avoid connection lines 6 that connect the touch electrodes 2. These, however, merely show exemplary shape and arrangement of the floating electrodes 3, and do not limit the shape of the floating electrodes 3.

The floating electrodes 3 for making the touch electrodes 2 less visible to a user are not essential constituent elements for the touch panel 100. Therefore, not only in the present embodiment but also in the other embodiments, the floating electrodes 3 do not have to be necessarily provided as electrode patterns in a touch panel manufactured by a touch panel manufacturing method. In this case, needless to say, areas where no electrode is formed are present between the patterned touch electrodes 2.

The touch electrodes 2 are connected to the connection terminals 5 formed at an end part of the glass substrate 1, via lead lines 4 provided in a peripheral area around a detection region for detecting a touched position with the touch electrodes 2. More specifically, the touch electrodes 2 are connected to the connection terminals 5 via the lead lines 4 formed in the peripheral area around the touched position detection region and the connection lines 6 that connect the touch electrodes 2 with one another in the touched position detection region. In the touch panel 100 of the present embodiment, four connection terminals 5 are provided. With the touch panel 100 of the present embodiment, a change in an electrostatic capacitance that occurs when a fingertip or the like approaches the touch electrode 2 is detected as a change in a voltage at the four connection terminals 5, whereby a touched position is detected.

Figure 2:
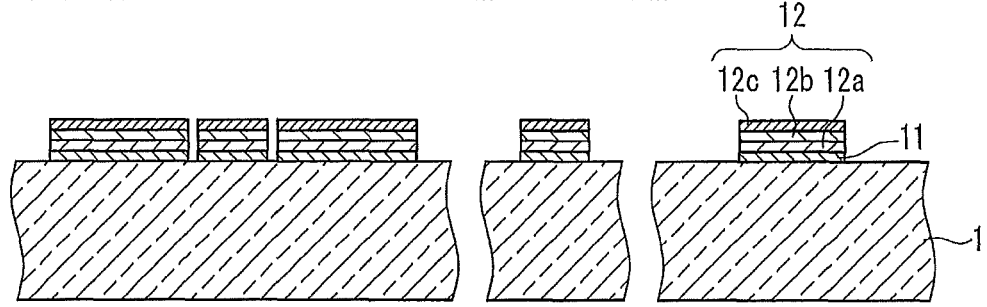
FIG. 2 are cross-sectional views showing steps of the touch panel manufacturing method according to Embodiment 1.
Figure 2:
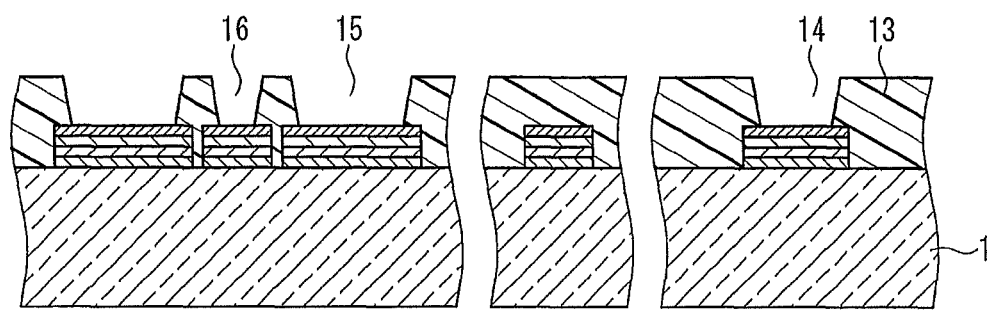
Figure 2:
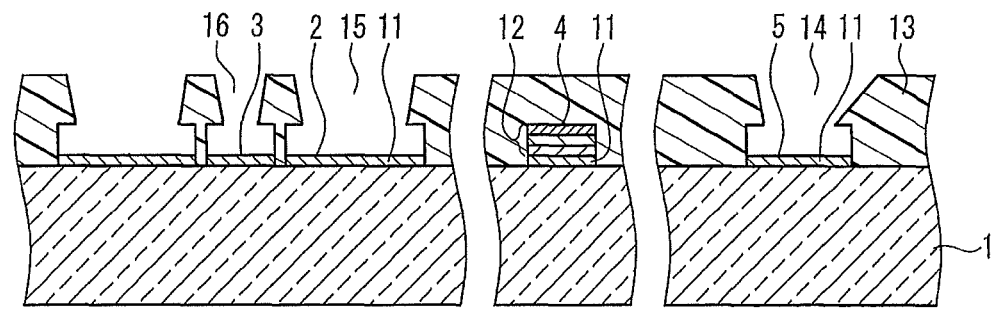

FIG. 2 are cross-sectional views showing exemplary steps of a touch panel manufacturing method according to the present embodiment.

In each of FIG. 2(a), FIG. 2(b), and FIG. 2(c), the illustration on the left side shows a cross section of a part where the touch electrodes 2 and the floating electrode 3 are formed, that is, a cross section taken along an arrow line A-A' in FIG. 1 showing the electrode patterns. In the following description, the part having the cross section taken along the arrow line A-A' in FIG. 1 is referred to as a "part A".

In each of FIG. 2(a), FIG. 2(b), and FIG. 2(c), the illustration in the center shows a cross section of a part where the lead line is formed, that is, a cross section taken along an arrow line B-B' in FIG. 1 showing the electrode patterns. In the following description, the part having the cross section taken along the arrow line B-B' in FIG. 1 is referred to as a "part B".

In each of FIG. 2(a), FIG. 2(b), and FIG. 2(c), the illustration on the right side shows a cross section of a part where the connection terminal is formed, that is, a cross section taken along an arrow line C-C' in FIG. 1 showing the electrode patterns. In the following description, the part having the cross section taken along the arrow line C-C' in FIG. 1 is referred to as a "part C".

In the touch panel manufacturing method according to the present embodiment, the transparent conductive film layer 11 made of ITO or the like is formed over an entire surface of the glass substrate 1 as the transparent substrate, and thereafter, a MoN layer 12a, an aluminum layer 12b, and a BM metal layer 12c that compose a metal layer 12 are laminated sequentially by sputtering.

Thereafter, on the BM metal layer 12c as an uppermost layer of the metal layer 12, a resist film (not shown) is formed. Then, by usual photolithography, this resist film is covered with a mask, and exposed and developed, whereby a resist pattern is caused to remain on portions in the part A shown in FIG. 1 where the touch electrodes 2 and floating electrodes 3 are to be formed, on a portion in the part B shown in FIG. 1 where the leak line 4 is to be formed, on a portion in the part C shown in FIG. 1 where the connection terminal 5 is to be formed, as well as on portions where the connection lines 6 (not shown in FIG. 2) are to be formed.

It should be noted that the connection lines for connecting the touch electrodes 2 with one another in the touched position detection region are formed completely in the same manner as that for the touch electrodes 2 in the manufacturing method, and therefore they are not mentioned particularly herein, to avoid complication of explanation. Further, detailed explanation about the connection terminals 6 is omitted as well.

Next, the BM metal layer 12c is etched with an acid-mixed liquid by using the resist pattern formed as described above as a mask, and thereafter, the aluminum layer 12b and the MoN layer 12a are etched by using the same resist pattern, with an acid-mixed liquid of phosphoric acid, acetic acid, and nitric acid. Further, by using the same resist pattern, the transparent conductive film layer 11 is etched with an oxalic acid liquid. Thereafter, the resist film remaining on the BM metal layer 12c is removed with a resist removing solution.

Thus, laminates each of which is composed of the transparent conductive film layer 11 and the metal layer 12 and which are arranged as the electrode patterns as shown in FIG. 1 are formed. The state in which the laminates are formed in this way is shown in FIG. 2(a).

Next, a protective film 13 made of, for example, SiN, is formed over the glass substrate 1 by CVD, so as to cover the laminates of the transparent conductive film layers and the metal layers. Then, the resist film is caused to remain by photolithography in the part A except for areas where the touch electrodes 2 and the floating electrodes 3 are to be formed, and in the part C except for areas where the connection terminals 5 are to be formed.

Thereafter, the protective film 13 is etched by dry etching (the RIE method) using a fluorine-based gas, using the remaining resist film as a mask. With this, openings 15 and 16 passing through the protective film 13 are formed in the part A, and openings 14 passing through the protective film 13 are formed in the part C, so as to expose the BM metal layer 12c formed on the surfaces of the laminates of the transparent conductive film layers 11 and the metal layers 12. The resist film remaining on the protective film 13 is removed by a resist removing solution. This state is shown in FIG. 2(b).

Next, the BM metal layer 12c is etched with an acid-mixed liquid, by using the protective film 13 having the openings 14, 15, and 16 passing therethrough as a mask, and thereafter, the aluminum layer 12b and the MoN layer 12a are etched sequentially with an acid-mixed liquid of phosphoric acid, acetic acid, and nitric acid. As a result, the metal layers 12 are removed and the transparent conductive layers 11 are exposed in the part A as the touched position detection region, and in the part C as a region where the connection terminal is formed. In the part B where the lead line is formed, the protective film 13 remains, and therefore, the laminates of the transparent conductive film layers 11 and the metal layers 12 still remain covered with the protective film 13.

In this way, the electrode patterns shown in FIG. 1 are formed, and the touch electrodes 2 and the floating electrode 3 formed with the transparent conductive film layers 11 are formed in the part A. In the part B, the lead line 4 whose resistance is reduced as the metal layer 12 is laminated on the transparent conductive film layer 11 is formed in a state of being covered with the protective film 13. Then, in the part C, the connection terminal 5 made of the transparent conductive film layer 11 is exposed in the opening 14 that is formed in the protective film 13 so as to become a via hole for connection.

By the touch panel manufacturing method according to the present embodiment having the steps shown in FIGS. 2(a), 2(b), and 2(c), the lead lines 4, which connect the touch electrodes 2 in the electrode patterns shown in FIG. 1 and the connection terminals 5, can be formed by laminating the metal film 12 having a low resistance. The exposure masks used herein are the following two in total: a first exposure mask for patterning the transparent conductive film layer 11 and the metal layer 12 as shown in FIG. 2(a); and a second exposure mask for forming the openings 14, 15, and 16 at predetermined positions in the protective film 13 as shown in FIG. 2(b).

Figure 33:
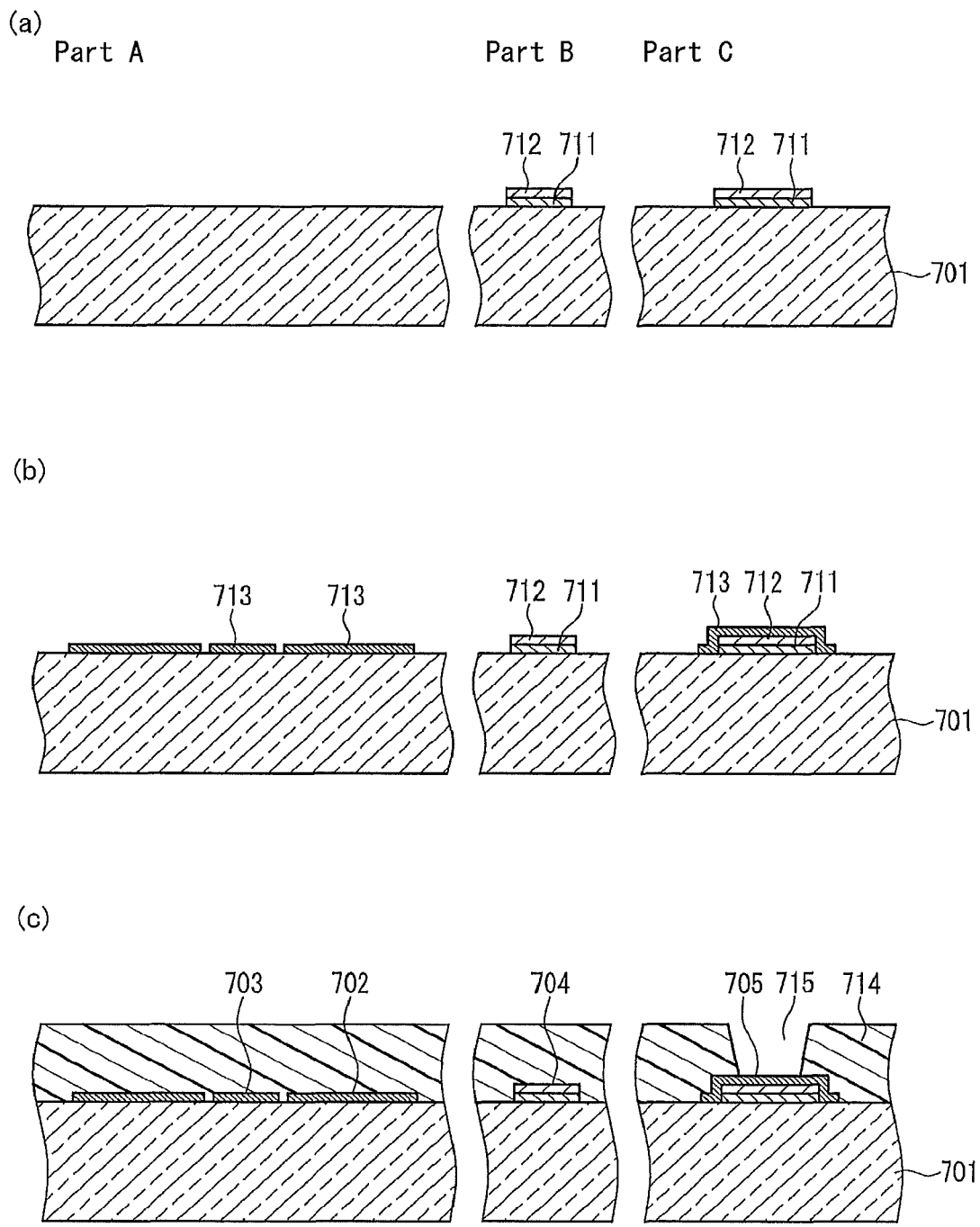
FIG. 33 are cross-sectional views showing steps of a conventional method for manufacturing a touch panel in which lead lines are formed in a one-layer structure.

Therefore, as compared with the conventional manufacturing method, which requires three exposure masks as shown in FIG. 33, the number of masks used can be reduced in the case of the touch panel manufacturing method of the present embodiment. This makes it possible to manufacture a touch panel at low costs, and with this method, it is less likely that a displacement would occur to patterns due to an error in mask alignment.

Next, several application examples are explained regarding the touch panel manufacturing method having electrode patterns shown in FIG. 1

Figure 3:
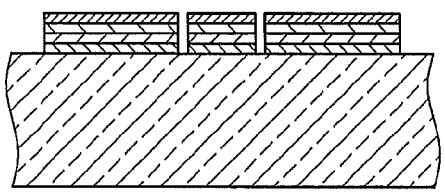
FIG. 3 are cross-sectional views showing steps of a touch panel manufacturing method according to a first application example of Embodiment 1.
Figure 3:
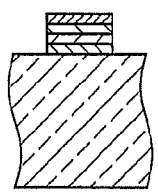
Figure 3:
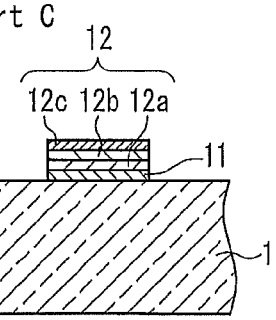
Figure 3:
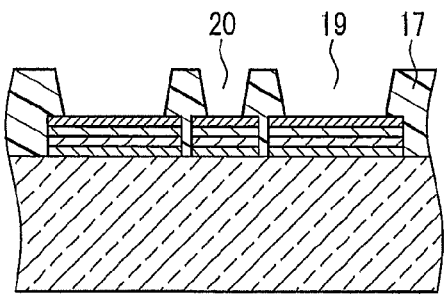
Figure 3:
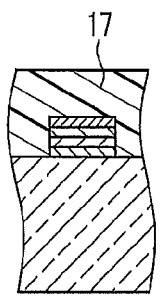
Figure 3:
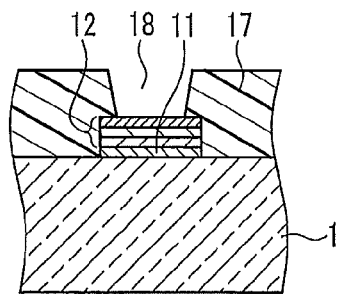
Figure 3:
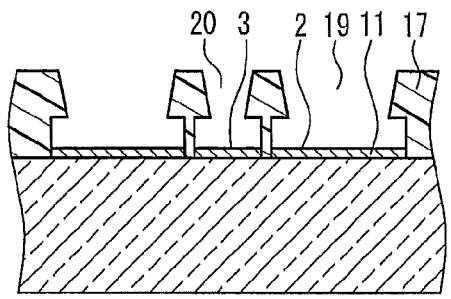
Figure 3:
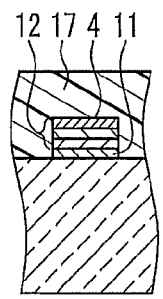
Figure 3:
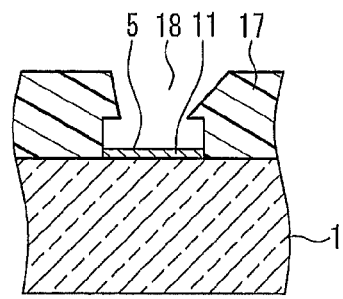
Figure 3:
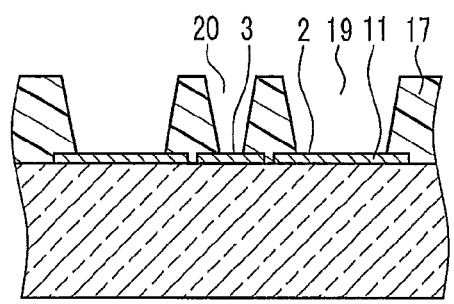
Figure 3:
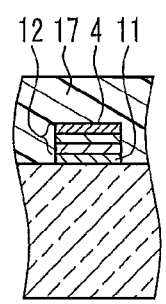
Figure 3:
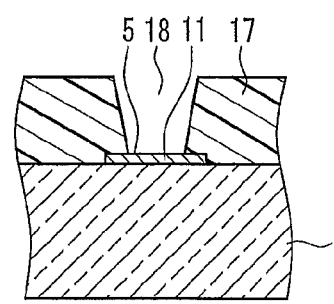

FIG. 3 are cross-sectional views showing a first application example of the touch panel manufacturing method of the present embodiment.

It should be noted that parts shown in FIGS. 3(a), 3(b), and 3(c) are identical to the parts shown in FIGS. 2(a), 2(b), and 2(c), which show cross sections of the parts in the touch panel manufacturing method of the above-described embodiment. In other words, the illustration on the left side shows a cross section of a part (part A) where the touch electrode 2 and the floating electrode 3 are formed, which is taken along an arrow line A-A' in FIG. 1. Further, the illustration in the center shows a cross section of a part (part B) where the lead line 4 is formed, taken along an arrow line B-B' in FIG. 1, and the illustration on the right side shows a cross section of a part (part C) where the connection terminal 5 is formed, taken along an arrow line C-C' in FIG. 1.

As shown in FIG. 3, first, the transparent conductive film layer 11 made of ITO or the like is formed over an entire surface of the glass substrate 1 as a transparent substrate, and thereafter, the MoN layer 12a, the aluminum layer 12b, and the BM metal layer 12c that compose the metal layer 12 are laminated sequentially by sputtering. Then, a resist pattern is formed by photolithography, and the laminates of the metal layer 12 and the transparent conductive film layer 11 are etched by using this resist pattern. Thereafter, the resist film is removed. FIG. 3(a) shows this state, in which the laminates each of which is composed of the transparent conductive film layer 11 and the metal layer 12 are formed in the electrode patterns shown in FIG. 1, on portions in the part A where the touch electrode 2 and the floating electrode 3 are to be formed, on a portion in the part B where the lead line 4 is to be formed, and on a portion in the part C where the connection terminal 5 is to be formed.

Next, a transparent organic resin film 17 as a protective film is applied over an entire surface of the glass substrate 1, and openings 19 and 20 are formed in the part A and an opening 18 is formed in the part C, by photolithography, so that surfaces of the laminates of the transparent conductive film layer 11 and the metal layer 12 are exposed therein. This state is shown in FIG. 3(b).

Next, the BM metal layer 12c is etched with an acid-mixed liquid, by using the transparent organic resin film 17 having the openings 18, 19, and 20 at the predetermined positions as a mask, and thereafter, the aluminum layer 12b and the MoN layer 12a are etched sequentially with an acid-mixed liquid of phosphoric acid, acetic acid, and nitric acid. As a result, in the part A as a touched position detection region and the part C as a region where the connection terminal is formed, the metal layer 12 is removed, whereby the transparent conductive film layer 11 is exposed. In the part B where the lead line is to be formed, the laminate of the transparent conductive film layer 11 and the metal layer 12 covered with the transparent organic resin film 17 remains. This state is shown in FIG. 3(c).

Thereafter, while being irradiated with ultraviolet rays in an exposure amount of seven to eight times an optimal exposure amount in the case of curing a resin film, the transparent organic resin film 17 is annealed under fusing conditions suitable for materials used in the transparent organic resin film 17, for example, an ambient temperature of 200° C. As a result, the transparent organic resin layer 17 is partially fused, which smoothens walls of the openings 19 and 20 in the part A that expose the surfaces of the touch electrode 2 and the floating electrode 3 and a wall of the opening 18 in the part C that exposes the surface of the connection terminal 5, as shown in FIG. 3(d).

By the touch panel manufacturing method of the present embodiment shown in FIG. 2, bottom portions of the openings 14, 15, and 16 of the protective film 13 have smaller areas as compared with surface areas of the metal layers 12 in the portions where the touch electrode 2, the floating electrode 3, and the connection terminal 5 are to be formed. Therefore, after the metal layer 12 is etched by using the protective film 13 as a mask, the protective film 13 remains around the touch electrode 2, the floating electrode 3, and the connection terminal 5, in a state in which top portions of the protective film 13 extends in an umbrella-like shape, as shown in FIG. 2(c).

Thus, if the cross-sectional shape of the protective film 13 is in an umbrella-like shape and there are portions having greater areas on the top face side rather than on the bottom face side, an object tends to be hooked by these umbrella-like projections and the protective film could possibly be damaged when the touch panel is used. Then, a fragment would become a foreign substance on the surface of the touch panel, or the patterned transparent conductive film layer is peeled off together with the protective film. In contrast, in the case of the first application example as shown in FIG. 3 having the annealing step for smoothening the wall shapes of the openings in the protective film, damage to or peeling of the protective film upon the use of the touch panel is prevented, whereby a touch panel with high reliability can be obtained.

It should be noted that the annealing step used in the first application example shown in FIG. 3 is intended to smoothen the cross-sectional shape of the protective film under the fusing condition of the protective film of the touch panel, and is not intended to obtain a smooth cross-sectional shape through an exposing-developing step with use of a mask, such as photolithography. Therefore, in the first application example as well, the touch panel having the electrode patterns shown in FIG. 1 and in which the lead lines 4 that connect the touch electrodes 2 and the connection terminals 5 are formed with the metal films 12 having a low resistance can be manufactured with use of two masks in total.

Figure 4:
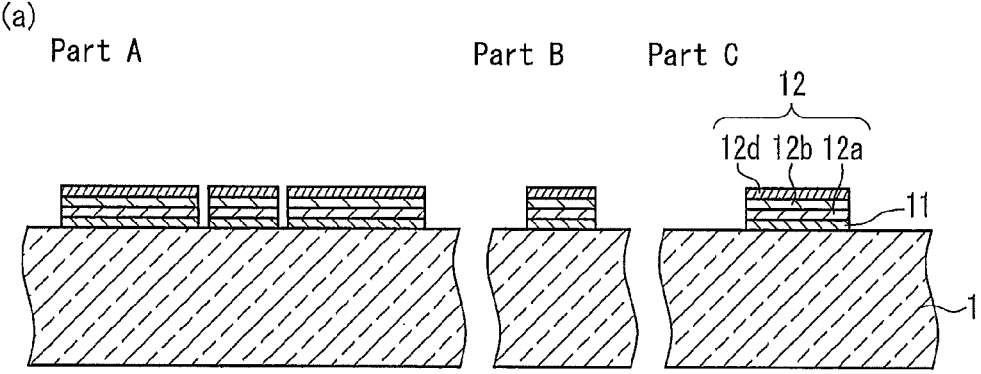
FIG. 4 are cross-sectional views showing steps of a touch panel manufacturing method according to a second application example of Embodiment 1.
Figure 4:
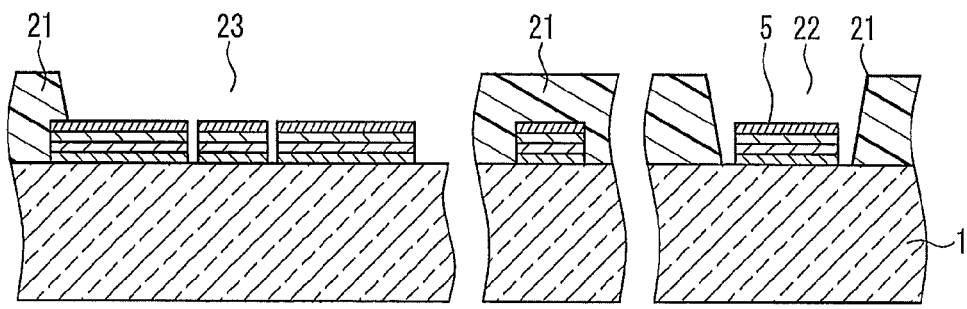
Figure 4:
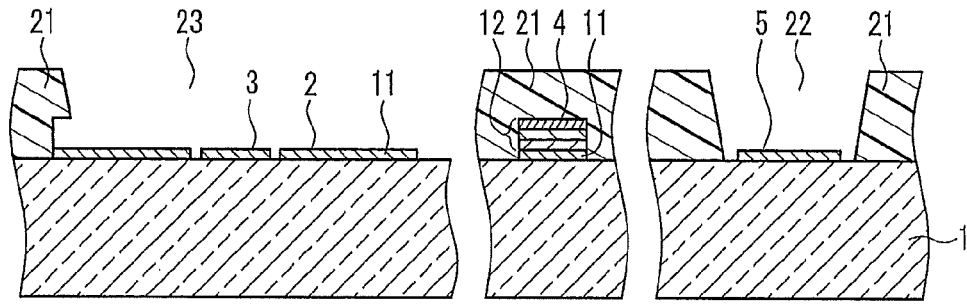

Next, FIG. 4 are cross-sectional views showing a second application example of the touch panel manufacturing method of the present embodiment. Parts A, B, and C in each of FIGS. 4(a), 4(b), and 4(c) are the part A as a part having a cross section taken along the arrow line A-A' in FIG. 1, the part B as a part having a cross section taken along the arrow line B-B' in FIG. 1, and the part C as a part having a cross section taken along the arrow line C-C' indicated by FIG. 1, respectively, as is the case with FIGS. 2 and 3 mentioned above.

In the second application example shown in FIG. 4, the transparent conductive film layer 11 made of ITO or the like is formed over an entire surface of the glass substrate 1 as the transparent substrate, and thereafter, the MoN layer 12a, the aluminum layer 12b, and a MoNb layer 12d that compose the metal layer 12 are laminated sequentially by sputtering. Then, the laminates each of which is composed of the transparent conductive film layer 11 and the metal layer 12 are formed by photolithography on portions in the part A where the touch electrode 2 and the floating electrode 3 are to be formed, on a portion in the part B where the lead line 4 is to be formed, and on a portion in the part C where the connection terminal 5 is to be formed, as shown in FIG. 4(a).

Next, a protective film 21 made of SiN or a transparent organic resin is applied over an entire surface of the glass substrate 1, and openings 22 and 23 are formed by photolithography in the part A as the touched position detection region and the part C where the connection terminal is to be formed. Here, the touch panel manufacturing method according to the second application example is different from the configuration of the above-described embodiment shown in FIG. 2 in the point that the opening 23 in the part A is formed as a large opening that exposes the entire detection region for detecting a touched position in which the touch electrodes 2 and the floating electrodes 3 are formed. Besides, the aforementioned method is different from the configuration of the above-described embodiment shown in FIG. 2 in the point that the opening 22 in the part C where the connection terminal 5 is to be formed is an opening having an opening area larger than the pattern of the transparent conductive film layer 11 and the metal layer 12.

Thereafter, by using the protective film 21 as a mask, the MoNb layer 12d, the aluminum layer 12b, and the MoN layer 12a are etched with an acid-mixed liquid of phosphoric acid, acetic acid, and nitric acid. With this, the transparent conductive film layer 11 is exposed in the part A as the touched position detection region and in the part C where the connection terminal 5 is formed. This state is shown in FIG. 4(c).

As shown in FIG. 4(c), in the second application example, the openings 22 and 23 in the protective film 21 where the touch electrode 2, the floating electrode 3, and the connection terminal 5 are to be formed have large areas. Therefore, the protective film does not have a cross section in an umbrella-like shape as is the case with the above-described embodiment shown in FIG. 2(c). Therefore, by the manufacturing method of the second application example, a touch panel having high reliability in terms of durability, in which the damage or peeling of the protective film can be prevented, can be obtained with use of two exposure masks.

In the touch panel manufacturing methods explained as the present embodiment, the first application example, and the second application example, the metal layer 12 is removed by using, as masks, the protective films 13, 17, and 21 in which the openings 14, 18, and 22 are provided, respectively, from the laminates each of which is composed of the transparent conductive film layer 11 and the metal layer 12. If the metal layer 12 is exposed on a surface of the touch panel, it is in contact with air and is oxidized easily. Therefore, by removing the metal layer 12 as described above, the oxidation of the surface of the connection terminal 5 can be prevented. This makes it possible to prevent connection failure from occurring between the connection terminal 5 and a FPC or the like (not shown) for outputting a potential of the touch electrode as a touched position detection signal from the connection terminal 5.

On the other hand, the connection terminal 5 does not have to be transparent, since it is provided in a peripheral area around the touched position detection region of the touch panel. The connection terminal 5, which is a portion that is required to be highly conductive, as is the case with the lead line 4, is rather preferably formed by laminating the metal layer 12 on the transparent conductive film layer 11.

A method for manufacturing a touch panel that includes connection terminals 5 each of which is formed by laminating the metal layer 12 having a low resistance is explained hereinafter as a third application example of the present embodiment.

Figure 5:
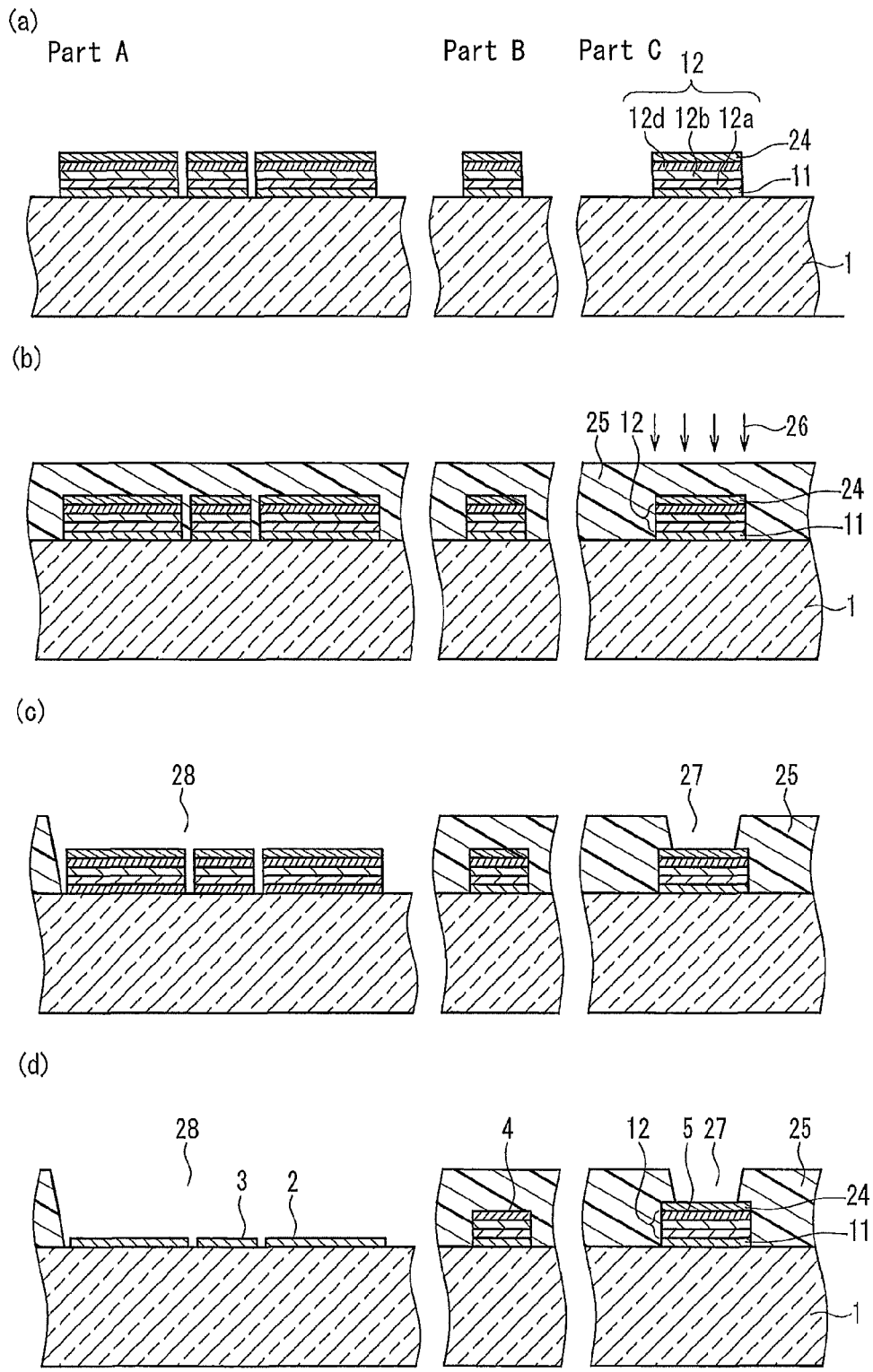
FIG. 5 are cross-sectional views showing steps of a touch panel manufacturing method according to a third application example of Embodiment 1.

FIG. 5 are cross-sectional views showing the third application example. It should be noted that parts A, B, and C in each of FIGS. 5(a), 5(b), and 5(c) are the part having a cross section taken along the arrow line A-A' in FIG. 1, the part having a cross section taken along the arrow line B-B' in FIG. 1, and the part having a cross section taken along the arrow line C-C' in FIG. 1, respectively, as is the case with FIGS. 2, 3, and 4 mentioned above.

In the third application example shown in FIG. 5, the transparent conductive film layer 11 made of ITO or the like is formed over an entire surface of the glass substrate 1 as the transparent substrate, and thereafter, the MoN layer 12a, the aluminum layer 12b, and the MoNb layer 12d that compose the metal layer 12 are laminated sequentially by sputtering. Then, a surface transparent conductive film layer 24 made of ITO or the like is formed again on the MoNb layer 12d by sputtering or the like.

Thereafter, as shown in FIG. 5(a), a laminate composed of the transparent conductive film layer 11, the metal layer 12, and the surface transparent conductive film layer 24 is formed by using a resist pattern on portions in the part A where the touch electrode 2 and the floating electrode 3 are to be formed, on a portion in the part B where the lead line 4 is to be formed, and on a portion in the part C where the connection terminal 5 is to be formed.

Next, a protective film 21 made of SiN is formed by sputtering or the like over an entire surface of the glass substrate 1. Then, as shown in FIG. 5(b), laser light 26 is projected to a portion in the touch panel where the connection terminal 5 is to be formed, for laser-annealing the surface transparent conductive film layer 24 so as to modify its composition, so that the portion should not be removed by etching with an etching liquid used in an etching step that is to be carried out later.

Subsequently, openings 27 and 28 are formed by photolithography in the protective film 25, in the part A as the touched position detection region and in a portion in the part C where the connection terminal is to be formed, respectively. Here, as shown in FIG. 5(c), in the touch panel manufacturing method according to the third application example, a large opening that exposes an entirety of the touched position detection region where the touch electrodes 2 and the floating electrodes 3 are to be formed is formed as the opening 28 in the part A, as is the case with the second application example. Besides, in a portion in the part C where the connection terminal 5 is to be formed, the opening 27 in the part C has an opening area smaller than a width of the laminate pattern composed of the transparent conductive film layer 11, the metal layer 12, and the surface transparent conductive film layer 24.

Thereafter, by using the protective film 25 as a mask, the surface transparent conductive film layer 24 is etched with an oxalic acid liquid, and thereafter, the MoNb layer 12d, the aluminum layer 12b, and the MoN layer 12a are etched with an acid-mixed liquid of phosphoric acid, acetic acid, and nitric acid. With this, as shown in FIG. 5(d), the transparent conductive film layers 11 that form the touch electrodes 2 and the floating electrodes 3 are exposed in the part A as the touched position detection region.

On the other hand, in the part B where the surface transparent conductive film layer 24 at the top of the laminate is covered with the protective film 25, and in the part C where the surface transparent conductive film layer 24 at the top is modified by laser annealing, the surface transparent conductive film layer 24 is not etched with oxalic acid. Therefore, the laminates each of which is composed of the transparent conductive film layer 11, the metal layer 12, and the surface transparent conductive film layer 24 are left in the parts B and C.

Thus, by the touch panel manufacturing method according to the third application example, a touch panel having the touch electrodes 2 and the floating electrodes 3 formed with the transparent conductive film layers 11, and the lead lines 4 and the connection terminals 5 that have low resistances, can be manufactured with use of two exposure masks.

Though the large opening 28, which exposes an entirety of the touched position detection region where the touch electrodes 2 and the floating electrodes 3 are formed, is provided as shown in FIG. 5(c), this opening 28 is not essential in the configuration of the third application example. For example, as is the case with the touch panel manufacturing method of the present embodiment as shown in FIG. 2, the openings 19 and 20 may be provided so as to correspond to the touch electrodes 2 and the floating electrodes 3, respectively.

On the other hand, it is important that the opening 27 at the portion in the part C where the connection terminal 5 is to be formed has an opening area smaller than the width of the laminate pattern composed of the transparent conductive film layer 11, the metal layer 12, and the surface transparent conductive film layer 24. In the case where the area of the opening 27 in the part C is larger than the width of the laminate of the transparent conductive film layer 11 and the metal layer 12 as is the case with the opening 22 in the second application example shown in FIG. 4 described above, the laminate is etched as is the case with the metal layer 12 formed in the part A. More specifically, in the etching step, since the surface transparent conductive film layer 24 is modified by laser annealing, it is not etched easily, but if the metal layer 12 is exposed as the opening 27 has an excessively large area, the metal layer 12 is etched consequently, and the connection terminal 5 cannot be formed.

While referring to the drawings, the foregoing description has explained the embodiment as a fundamental example and its application examples of the method for manufacturing the touch panel 100 having a touch electrode pattern formed in one layer as shown in FIG. 1. In all of these embodiments and examples, a touch panel having a desired touch electrode pattern can be manufactured with two exposure masks, which are fewer than in the conventional manufacturing method. Further, the process as the touch panel manufacturing method can be simplified, whereby the manufacturing time and cost can be reduced. Still further, since the number of times of exposure mask alignment can be reduced, whereby a touch panel having a higher accuracy in the formation of electrode patterns can be obtained.

Still further, the layers shown regarding the touch panel manufacturing method of the above-described embodiment have the following thicknesses, for example. The glass substrate 1 has a thickness of 0.7 mm, and the transparent conductive film layer 11 has a thickness of 70 nm. The MoN layer 12a, the aluminum layer 12b, the BM metal layer 12c, and the MoNb layer 12d that compose the metal layer 12 have thicknesses of 50 nm, 150 nm, 100 nm, and 100 nm, respectively. The protective films 13, 17, 21, and 25 have a thickness of 3 μm each.

Still further, the embodiment is explained by referring to, as an example, a case where ITO is used for forming the transparent conductive film layer 11 and the surface transparent conductive film layer 24, but alternatively IZO, ZnO, or the like can be used. Regarding the metal layer, the embodiment is explained by referring to an exemplary three-layer laminate of a MoN layer, an aluminum layer, and a BM metal layer, as well as to a three-layer laminate of a MoN layer, an aluminum layer, and a MoNb layer. Preferably, these exemplary laminates are used according to environments where it is used, display quality, etc. It should be noted that a black metal film such as a chromium oxide film, an oxide film made of an alloy containing nickel (Ni), molybdenum (Mo), aluminum (Al), titanium (Ti) or the like can be used as a BM metal layer. The metal layer is not limited to a three-layer laminate, but a two-layer laminate of a BM layer and MoN, a single layer of a BM metal, MoN, or the like may be used as the metal layer.

As the protective films 13, 17, and 25 that are not to be fused partially after the formation, a SiN film or a $SiO_2$ film are mentioned, but other than these, SiON can be used. On the other hand, as the transparent organic resin used for forming the protective film 21 in the case where it is partially fused after being formed so that walls of openings are smoothened, an epoxy resin, an acrylic resin, a novolac resin, or the like can be used.

In the case where different materials than the materials mentioned above as exemplary materials are used as materials for the transparent conductive film layer 11, the surface transparent conductive film layer 24, the metal layer 12, and the protective films 13, 17, 21, and 25, needless to say, etching liquids that can etch these films excellently selectively are used, respectively. More specifically, an acid-mixed liquid of nitric acid, phosphoric acid, and acetic acid is used as an etching liquid in the case where a metal film is etched, and oxalic acid or the like is used as an etching liquid in the case where a transparent conductive film layer is etched.

Further, as the resist agent for forming a resist pattern, a novolac resin, an acrylic resin, or the like can be used. As a developing liquid for developing a resist film, NaOH, KOH, or the like can be used. As a removing solution for removing a resist film, NMP, amine, glycol ether, or the like can be used.

[Embodiment 2]

Next, a method for manufacturing a touch panel in which touch electrodes, lead lines, and connection terminals are formed in a two-layer structure on an insulative transparent substrate is explained as Embodiment 2.

Figure 6:
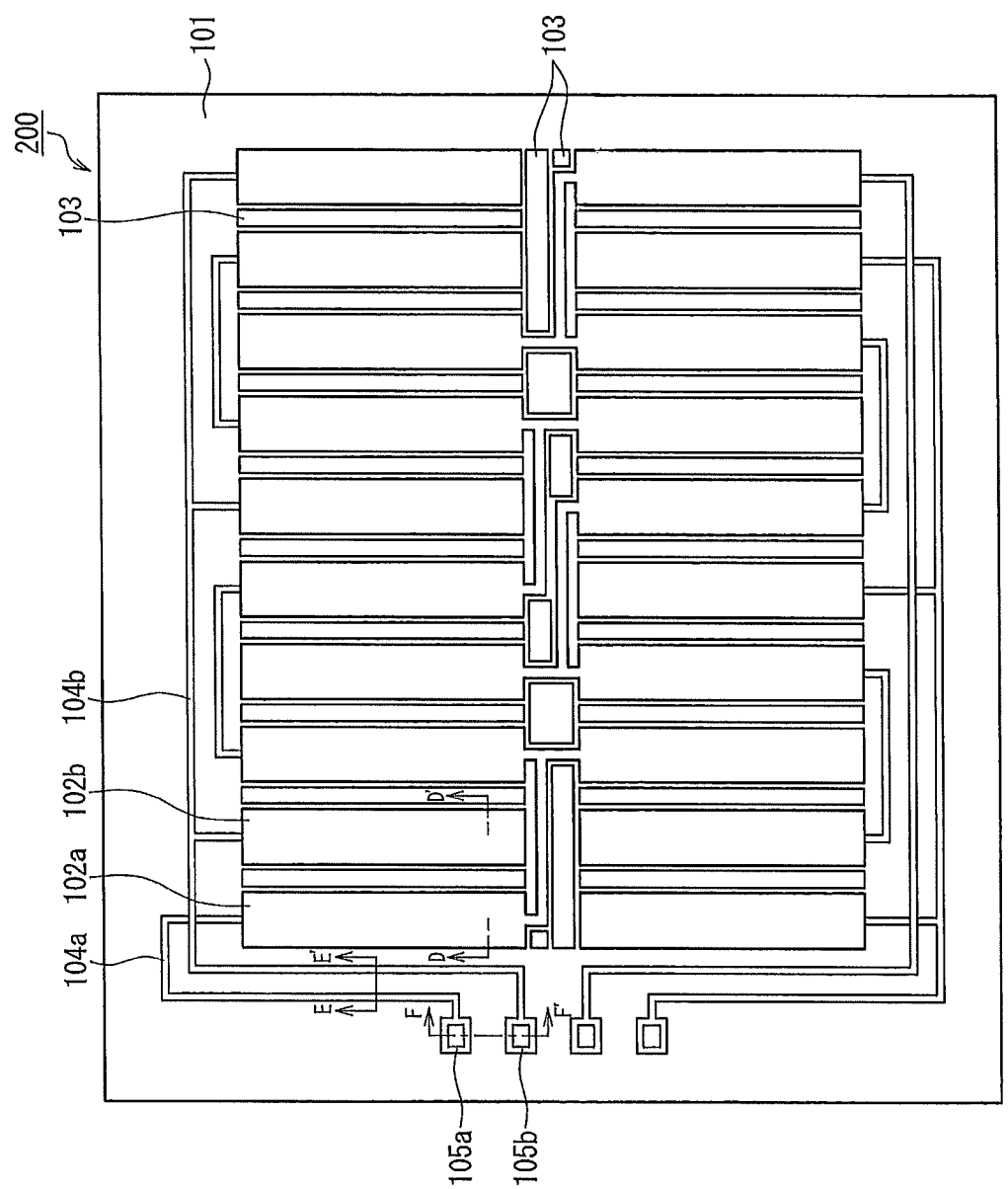
FIG. 6 is a plan view showing electrode patterns of a touch panel that is manufactured by a touch panel manufacturing method according to Embodiment 2, and in which touch electrodes, lead lines, and connection terminals are formed in two-layer structures, respectively.

FIG. 6 is a plan view showing electrode patterns of a touch panel 200 manufactured by a touch panel manufacturing method according to Embodiment 2.

In the touch panel 200, transparent conductive film layers made of ITO are formed as two-dimensional patterns on a glass substrate 101 as an insulative transparent substrate, whereby touch electrodes are provided. In the touch panel 200 of the present embodiment, touch electrodes 102a and 102b, lead lines 104a and 104b, and connection terminals 105a and 105b are formed in a two-layer structure in which they are divided into two layers vertically arranged. This is the point in which the present embodiment is different from the electrode patterns of the touch panel 100 according to Embodiment 1 shown in FIG. 1.

To avoid complication in the illustration beyond necessity, the touch panel shown in FIG. 6 is shown as identical to the touch panel 100 in FIG. 1 regarding the shapes and arrangement of the touch electrodes 102a and 102b and the connection terminals 105a and 105b, except for the lead lines 104a and 104b partially crossing three-dimensionally. However, in the case where the touch electrodes are finely patterned or in the case where a peripheral area around the touched position detection region where the touch electrodes are formed is so narrow that it is difficult to arrange lead lines thereon, the touch electrodes, and the lead lines, and the connection terminals connected to these are formed in a two-layer structure in some cases. The description of the present embodiment explains a manufacturing method in which the touch panel 200 in which the touch electrodes 102a and 102b, the lead lines 104a and 104b, and the connection terminals 105a and 105b are formed in a two-layer structure in this way is exposed with a smaller number of exposure masks.

As shown in FIG. 6, ten of approximately rectangular electrode patterns in the same size are arrayed in a line in a horizontal direction, and two of such lines of the electrodes are arrayed in a vertical direction, whereby twenty of the touch electrodes in total are provided, in the touch panel 200 manufactured by the touch panel manufacturing method of the present embodiment, as is the case with the touch panel 100 shown in FIG. 1. These touch electrodes include touch electrodes 102a of a first layer as the lower layer that is composed of a transparent electrode layer directly formed on the glass substrate 101, and touch electrodes 102b of a second layer as the upper layer that is a different layer in the panel thickness direction than the first layer for the touch electrodes 102a. These touch electrodes 102a and 102b are arranged alternately in a planar view.

It should be noted that the pattern shape of each of the touch electrodes 102a and 102b is not necessarily a rectangle shown in FIG. 6, and the number of the patterns arranged in the horizontal and vertical directions is not limited to 10×2, as is the case with FIG. 1.

In the touch panel 200 manufactured by the touch panel manufacturing method of the present embodiment, floating electrodes 103 made of ITO are provided between the touch electrodes 102 and in the same layer as the layer where the touch electrodes 102a are provided, i.e., the first layer. It should be noted that there is no limitation on the arrangement and shape of the floating electrodes 103, as is the case with the touch electrode pattern of the touch panel 100 shown in FIG. 1. Here, the case where the floating electrodes 103 are formed in the same layer where the touch electrodes 102a are formed, i.e., the first layer, is described, but this is not an essential requirement in the present embodiment. Therefore, the floating electrodes 103 may be formed in the same layer where the touch electrodes 102b are formed, i.e., the second layer.

Further, the floating electrodes 103 for making the touch electrodes 102 less visible to a user are not essential constituent elements for the touch panel 200, as is the case with the touch panel 100 shown in FIG. 1.

In the touch panel 200 of the present embodiment, the lead lines and the connection terminals are also formed in two layers, i.e., the first layer as the lower layer and the second layer as the upper layer, as is the case with the touch electrodes. More specifically, the lead lines 104a and the connection terminals 105a are formed in the first layer where the touch electrodes 102a and the floating electrodes 103 are formed, and the lead lines 104b and the connection terminals 105b are formed in the second layer where the touch electrodes 102b are formed.

Next, the method for manufacturing the touch panel according to the present embodiment is explained with reference to FIGS. 7 to 9, which are cross-sectional views showing exemplary manufacturing steps.

It should be noted that in each of FIGS. 7(a), 7(b), 8(a), 8(b), 9(a), and 9(b), the illustration on the left side shows a cross-sectional configuration of a part where the touch electrodes 102a and 102b and the floating electrodes 103 are formed, that is, a cross-sectional configuration of a part taken along an arrow line D-D' in FIG. 6. In the following description, the part having the cross section taken along the arrow line D-D' in FIG. 6 is referred to as a "part D".

Further, in each of FIGS. 7(a), 7(b), 8(a), 8(b), 9(a), and 9(b), the illustration in the center shows a cross-sectional configuration of a part where the lead lines 104a and 104b are formed, that is, a cross-sectional configuration of a part taken along an arrow line E-E' in FIG. 6. In the following description, the part having the cross section taken along the arrow line E-E' in FIG. 6 is referred to as a "part E".

Still further, in each of FIGS. 7(a), 7(b), 8(a), 8(b), 9(a), and 9(b), the illustration on the right side shows a cross-sectional configuration of a part where the connection terminals 105a and 105b are formed, that is, a cross-sectional configuration of a part taken along an arrow line F-F' in FIG. 6. In the following description, the part having the cross section taken along the arrow line F-F' in FIG. 6 is referred to as a "part F".

In the method for manufacturing the touch panel 200 according to the present embodiment, a transparent conductive film layer 111 made of ITO or the like is formed over an entire surface of the glass substrate 101 as the transparent substrate, and thereafter, a MoN layer 112a, an aluminum layer 112b, and a MoNb metal layer 112c that compose a metal layer 112 are laminated sequentially by sputtering.

Thereafter, on the MoNb metal layer 112c as an uppermost layer of the metal layer 112, a resist film (not shown) is formed. By usual photolithography of covering this resist film with a predetermined mask and exposing and developing the same, a resist pattern is caused to remain on portions in the part D where the touch electrode 102a and floating electrode 103 of the first layer are to be formed, on a portion in the part E where the leak line 104a of the first layer is to be formed, and on a portion in the part F where the connection terminal 105a of the first layer is to be formed.

Next, the MoNb layer 112c, the aluminum layer 112b, and the MoN layer 112a are etched simultaneously with an acid-mixed liquid of phosphoric acid, acetic acid, and nitric acid by using the resist pattern formed as described above as a mask. Further, by using the same resist pattern, the transparent conductive film layer 111 is etched with an oxalic acid liquid.

Thereafter, the resist film remaining on the MoNb layer 112c is removed with a resist removing solution. This state is shown in FIG. 7(a).

Next, as shown in FIG. 7(b), a protective film 113 of the first layer, made of, for example, SiN, is formed over an entire surface of the glass substrate 101 by CVD. This protective film 113 of the first layer becomes a film that provides insulation between the second layer and the first layer.

Next, a transparent conductive film layer 114 made of ITO or the like is formed over an entire surface of the protective film 113 of the first layer, and thereafter, a MoN layer 115a, an aluminum layer 115b, and a MoNb layer 115c that compose a metal layer 115 are laminated by sputtering sequentially.

Thereafter, on the MoNb layer 115c as an uppermost layer of the metal layer 115, a resist film (not shown) is formed. Then, by usual photolithography of covering this resist film with a predetermined mask, and exposing and developing the same, a resist pattern is caused to remain on a portion in the part D where the touch electrode 102b of the second layer is to be formed, on a portion in the part E where the leak line 104b of the second layer is to be formed, and on a portion in the part F where the connection terminal 105b of the second layer is to be formed, in the same manner as that for the first layer.

Next, the MoNb layer 115c, the aluminum layer 115b, and the MoN layer 115a are etched simultaneously with an acid-mixed liquid of phosphoric acid, acetic acid, and nitric acid by using the resist pattern thus formed as a mask. Further, by using the same resist pattern, the transparent conductive film layer 114 is etched with an oxalic acid liquid.

Thereafter, the resist film remaining on the MoNb layer 115c is removed with a resist removing solution. This state is shown in FIG. 8(a).

Next, as shown in FIG. 8(b), a protective film 116 of the second layer, made of, for example, SiN, is formed over the glass substrate 101 by CVD.

Then, a resist film is caused to remain by photolithography in the part D except for areas where the touch electrode 102a and the floating electrode 103 of the first layer and the touch electrode 102b of the second layer are to be formed, and in the part F except for areas where the connection terminal 105a of the first layer and the connection terminal 105b of the second layer are to be formed.

Thereafter, the protective film 116 of the second layer and the protective film 113 of the first layer are etched by dry etching (the RIE method) using a fluorine-based gas, using the remaining resist film as a mask. With this, openings 119, 120, and 121 are formed in the part D, and openings 117 and 118 are formed in the part F, so as to expose surfaces of the laminates composed of the transparent conductive film layer 111 and the metal layer 112 of the first layer, and surfaces of the laminates composed of the transparent conductive film layer 114 and the metal layer 115 of the second layer. The resist film remaining on the protective film 116 of the second layer is removed by a resist removing solution. This state is shown in FIG. 9(a).

Next, the MoNb layers 112c and 115c, the aluminum layers 112b and 115b, and the MoN layers 112a and 115a are etched sequentially with an acid-mixed liquid of phosphoric acid, acetic acid, an nitric acid, by using, as masks, the protective film 113 of the first layer and the protective film 116 of the second layer in which the openings 117, 118, 119, 120, and 121 are formed at predetermined positions. As a result, in the part D as the touched position detection region and the part F where the connection terminals 105 are to be formed, the metal layer 112 of the first layer and the metal layer 115 of the second layer are removed, whereby the transparent conductive film layer 111 of the first layer and the transparent conductive film layer 114 of the second layer are exposed. In the part E, where the lead lines 104a of the first layer and the lead lines 104b of the second layer are formed, the protective film 113 of the first layer and the protective film 116 of the second layer remain. Therefore, the laminate of the transparent conductive film layer 11 and the metal layer 112 covered with the protective film 113 remains in the first layer, and the laminate of the transparent conductive film layer 114 and the metal layer 115 covered with the protective film 116 remains in the second layer.

In this way, as shown in FIG. 9(b), the touch electrode 102a and the floating electrode 103 of the first layer formed with the transparent conductive film layer 111 of the first layer are formed in the part D, and at the same time, the touch electrode 102b of the second layer formed with the transparent conductive film layer 114 of the second layer are formed in the part D as well. In the part E, the lead line 104a having a reduced resistance due to the metal layer 112 laminated thereon is formed in the first layer, in a state of being covered with the protective film 113 of the first layer and the protective film 116 of the second layer. In the part E, the lead line 104b having a reduced resistance due to the metal layer 115 laminated thereon is formed in the second layer, in a state of being covered with the protective film 116 of the second layer. In the part F, the openings 118 and 117, which are to be via holes for connection, are formed in the protective film 113 of the first layer and the protective film 116 of the second layer, and therefore, the connection terminal 105a of the first layer formed with the transparent conductive film layer 111 and the connection terminal 105b of the second layer formed with the transparent conductive film layer 114 are exposed.

Figure 7:
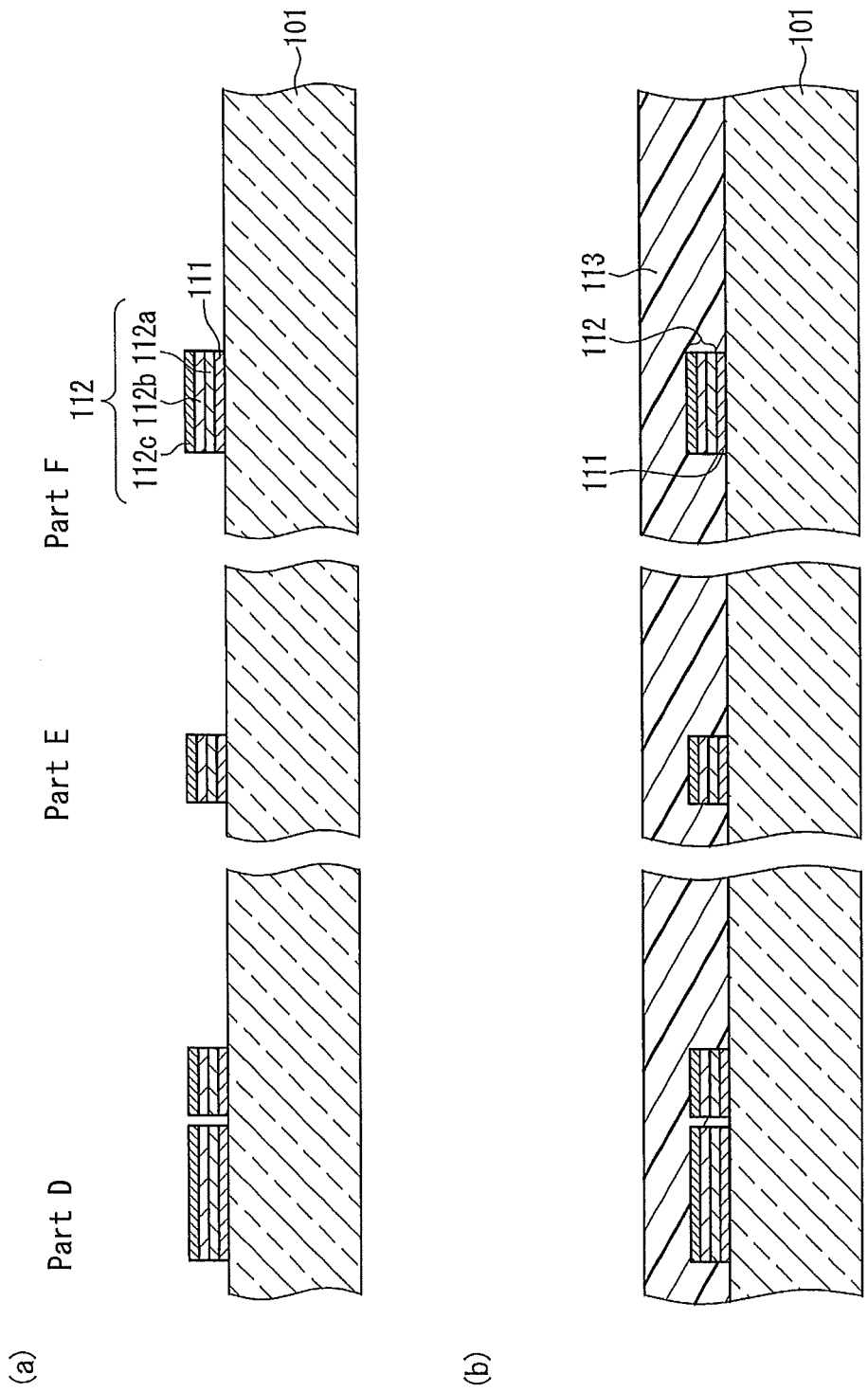
FIG. 7 are cross-sectional views showing steps in an initial stage in the touch panel manufacturing method according to Embodiment 2.
Figure 8:
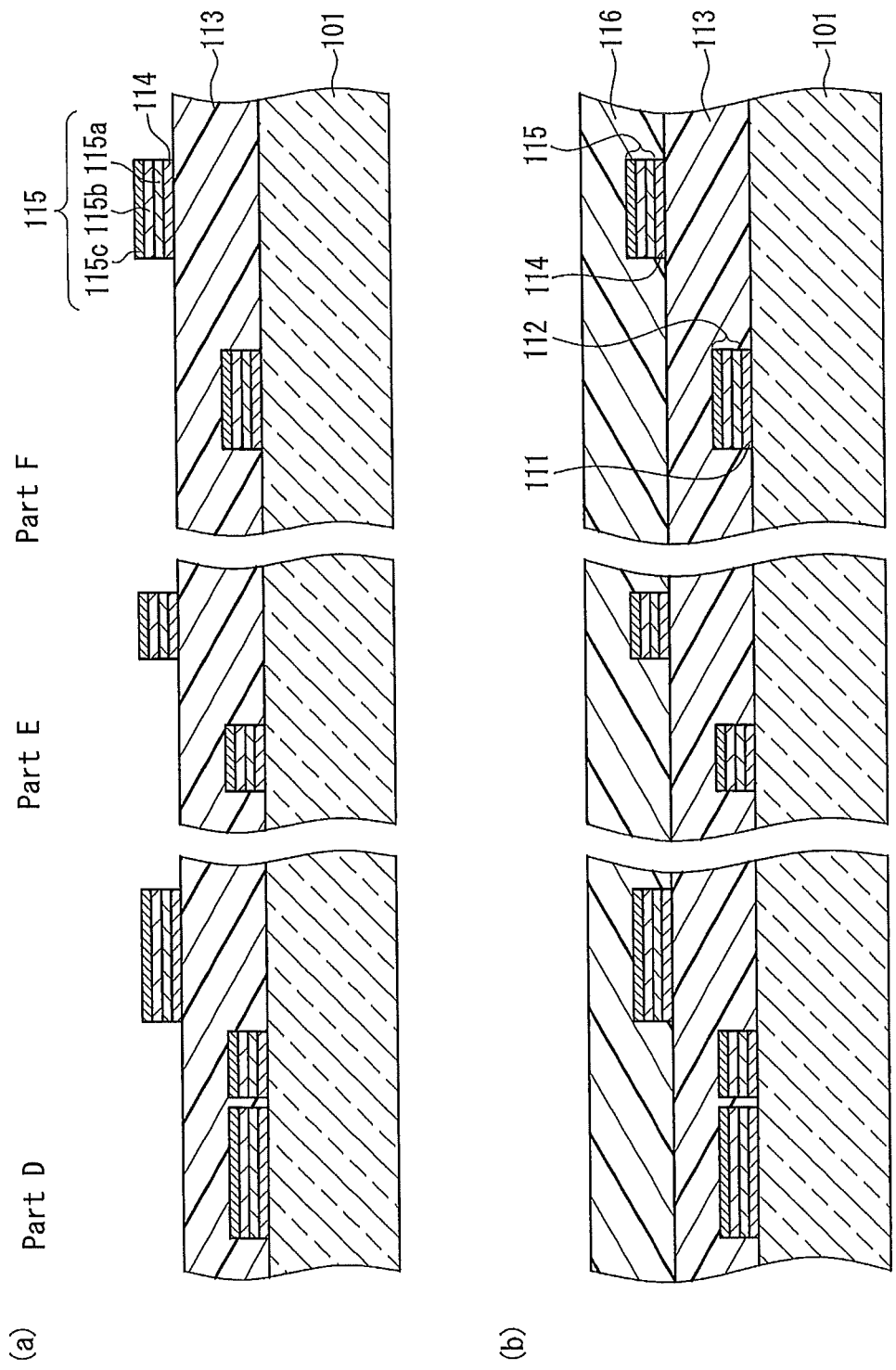
FIG. 8 are cross-sectional views showing steps in a middle stage in the touch panel manufacturing method according to Embodiment 2.
Figure 9:
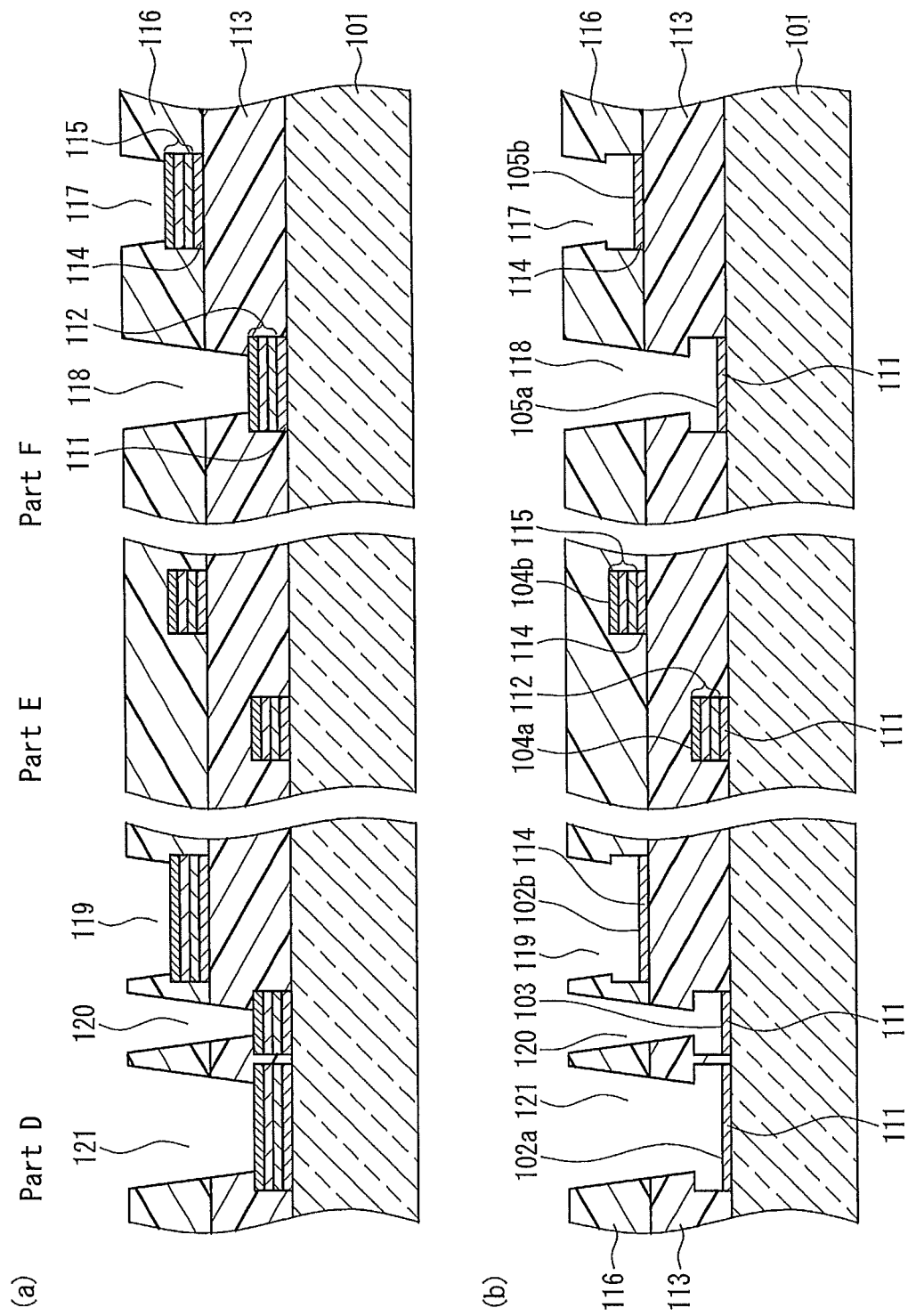
FIG. 9 are cross-sectional views showing steps in a later stage in the touch panel manufacturing method according to Embodiment 2.

With the touch panel manufacturing method of the present embodiment shown in FIGS. 7 to 9, a configuration of electrode patterns separated in two layers as shown in FIG. 6 can be realized. With this manufacturing method, the lead line 104a connecting the touch electrode 102a and the connection terminal 105a, and the lead line 104b connecting the touch electrode 102b and the connection terminal 105b can be formed by laminating the metal films 112 and 115 having low resistances, respectively.

The exposure masks used herein are three in total. More specifically, a first exposure mask is needed for patterning the transparent conductive film layer 111 and the metal layer 112 formed in the first layer, as shown in FIG. 7(a). Further, a second exposure mask is needed for patterning the transparent conductive film layer 114 and the metal layer 115 formed in the second layer, as shown in FIG. 8(a). Still further, a third exposure mask is needed for forming the openings 117, 118, 119, 120, and 121 at predetermined positions in the protective film 113 of the first layer and the protective film 116 of the second layer, as shown in FIG. 8(a).

Figure 34:
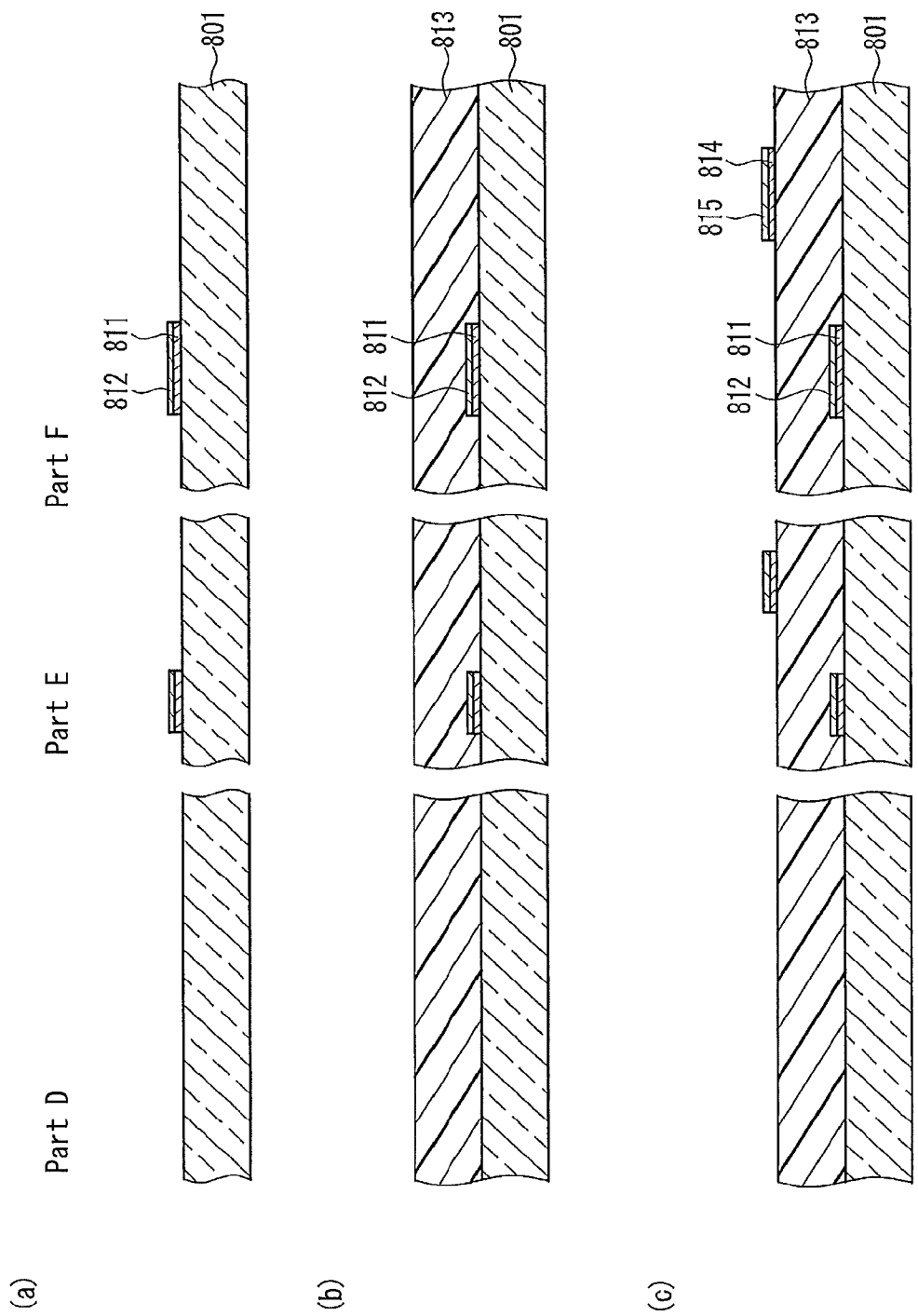
FIG. 34 are cross-sectional views showing steps in an initial half stage of a conventional method for manufacturing a touch panel in which lead lines are formed in a two-layer structure.
Figure 35:
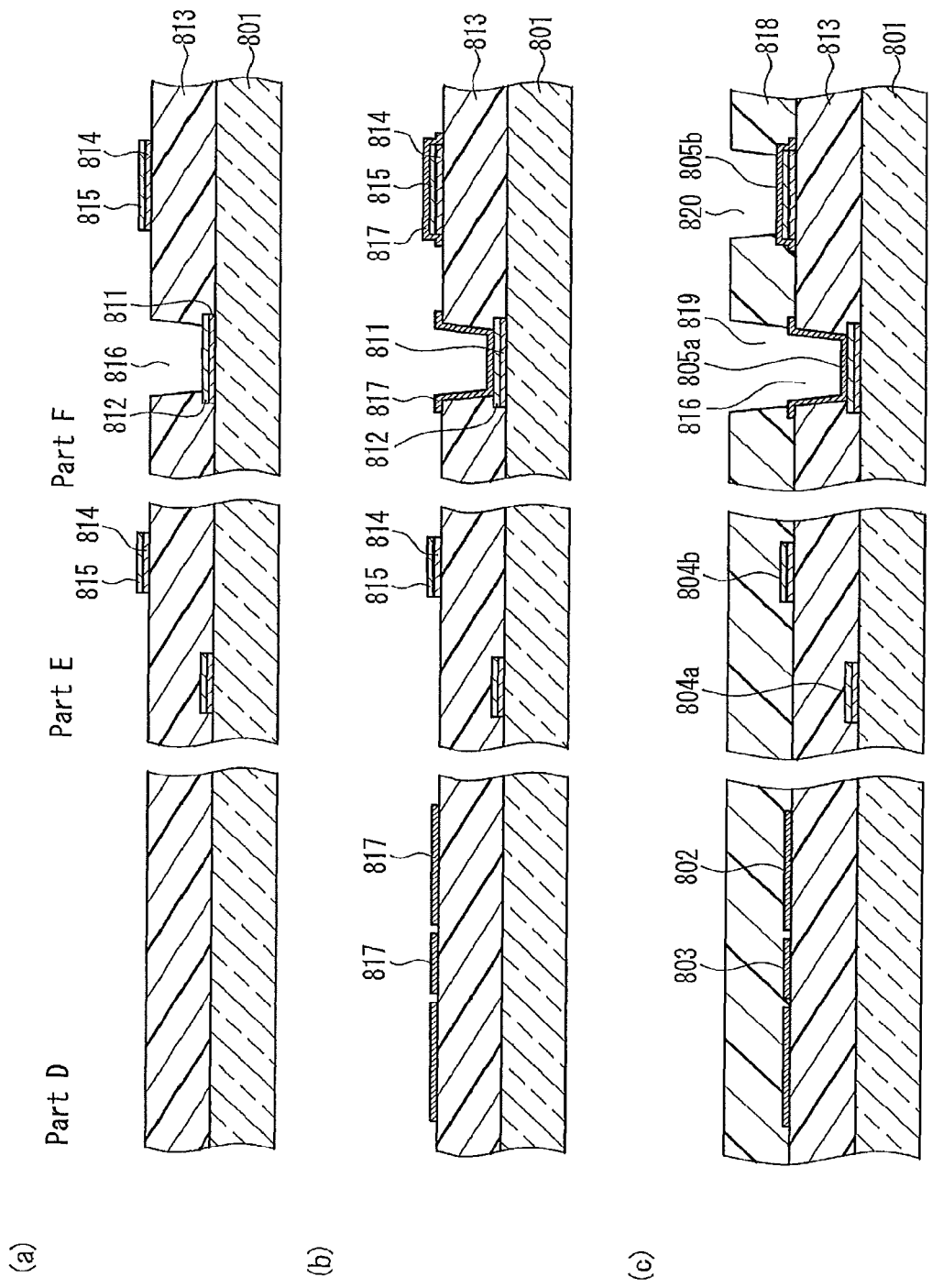
FIG. 35 are cross-sectional views showing steps in a latter half stage of the conventional method for manufacturing a touch panel in which lead lines are formed in a two-layer structure.

Therefore, the number of masks, which is at least five in the conventional manufacturing method shown in FIGS. 34 and 35, can be reduced to three. Therefore, the touch panel manufacturing method of the present embodiment is a manufacturing method that is characterized in low manufacturing costs and that is characterized in that it is less likely that a displacement would occur to patterns due to an error in mask alignment, as a method of manufacturing a touch panel in which touch electrode patterns are formed in two layers.

Figure 10:
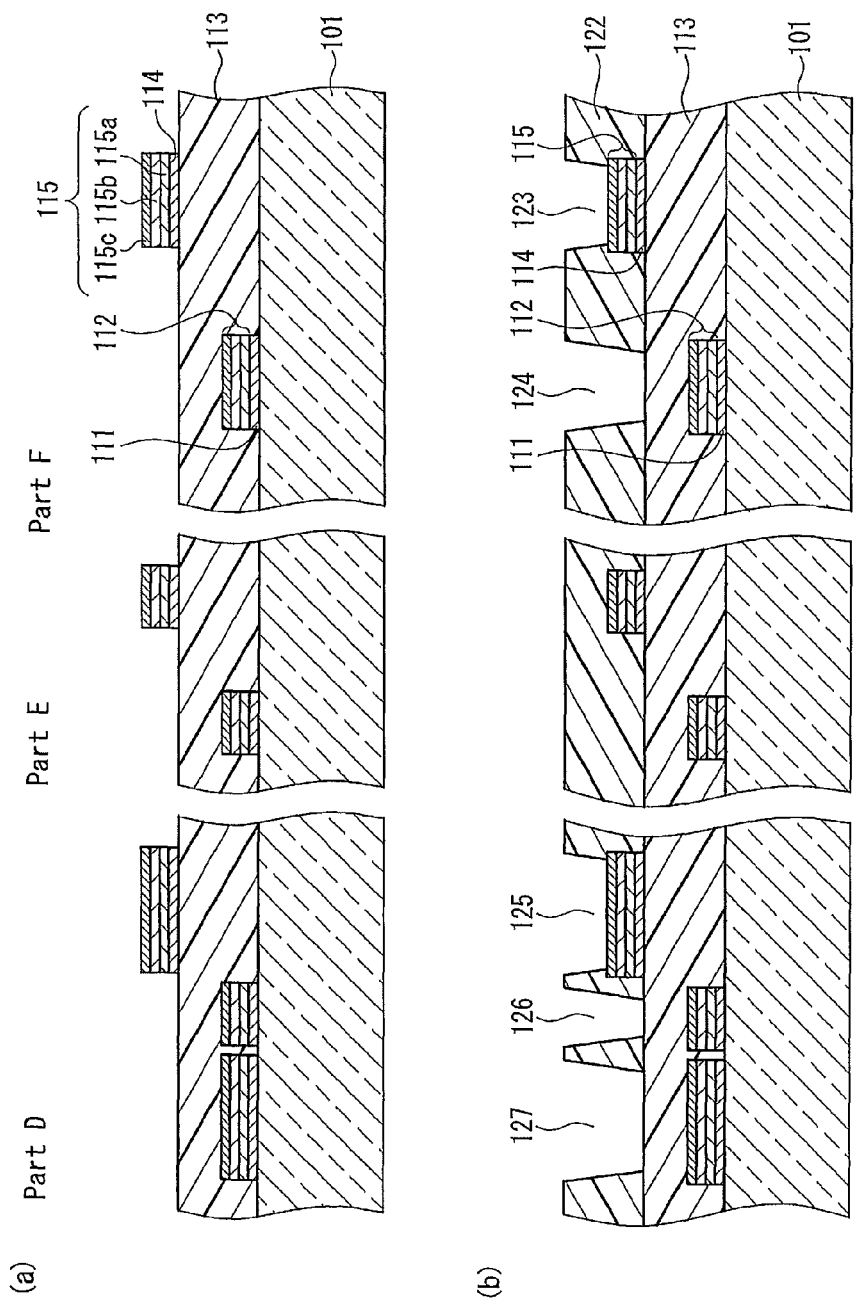
FIG. 10 are cross-sectional views showing steps in a middle stage in a touch panel manufacturing method according to a first application example of Embodiment 2.
Figure 11:
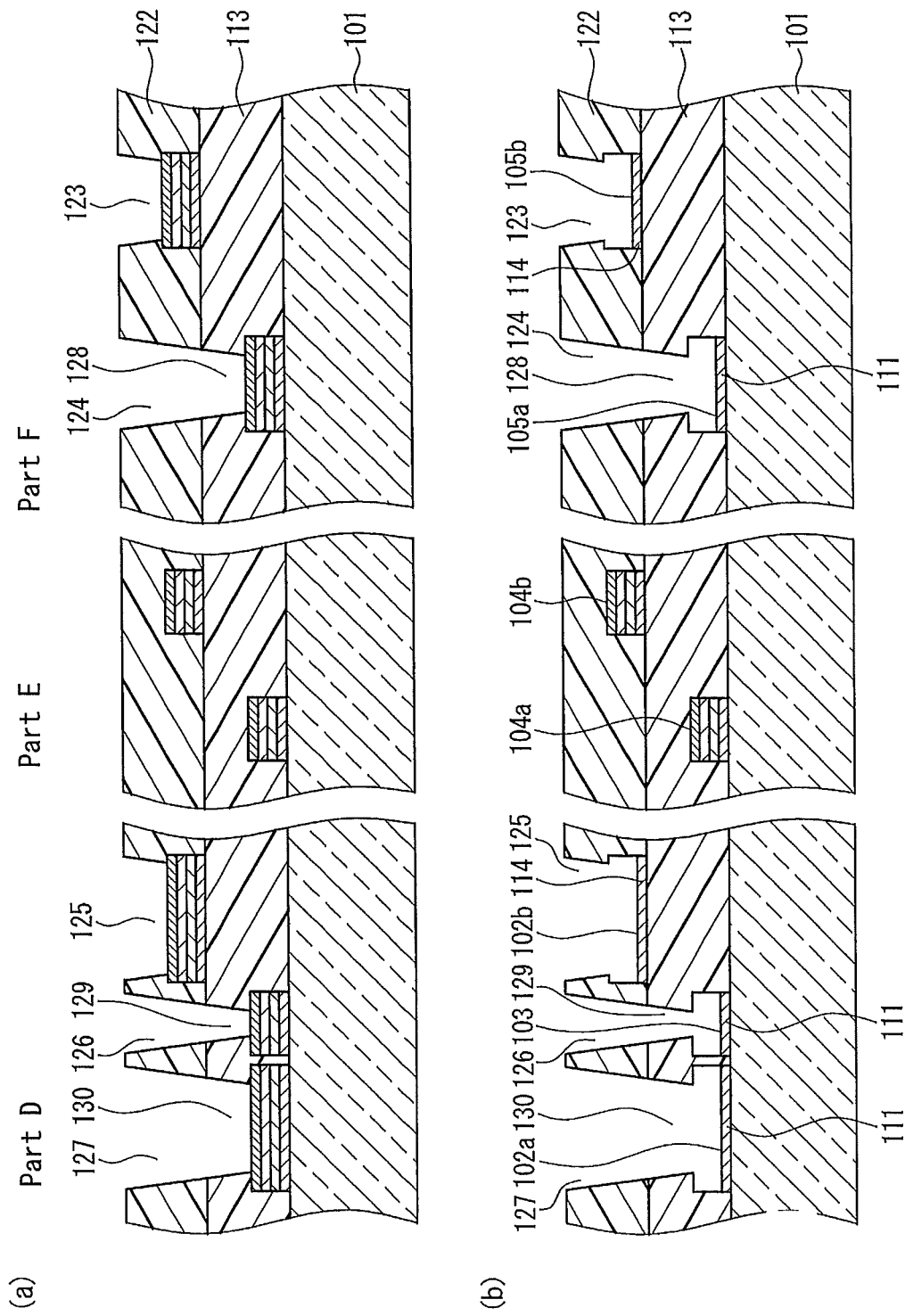
FIG. 11 are cross-sectional views showing parts in a later stage in the touch panel manufacturing method according to the first application example of Embodiment 2.
Figure 12:
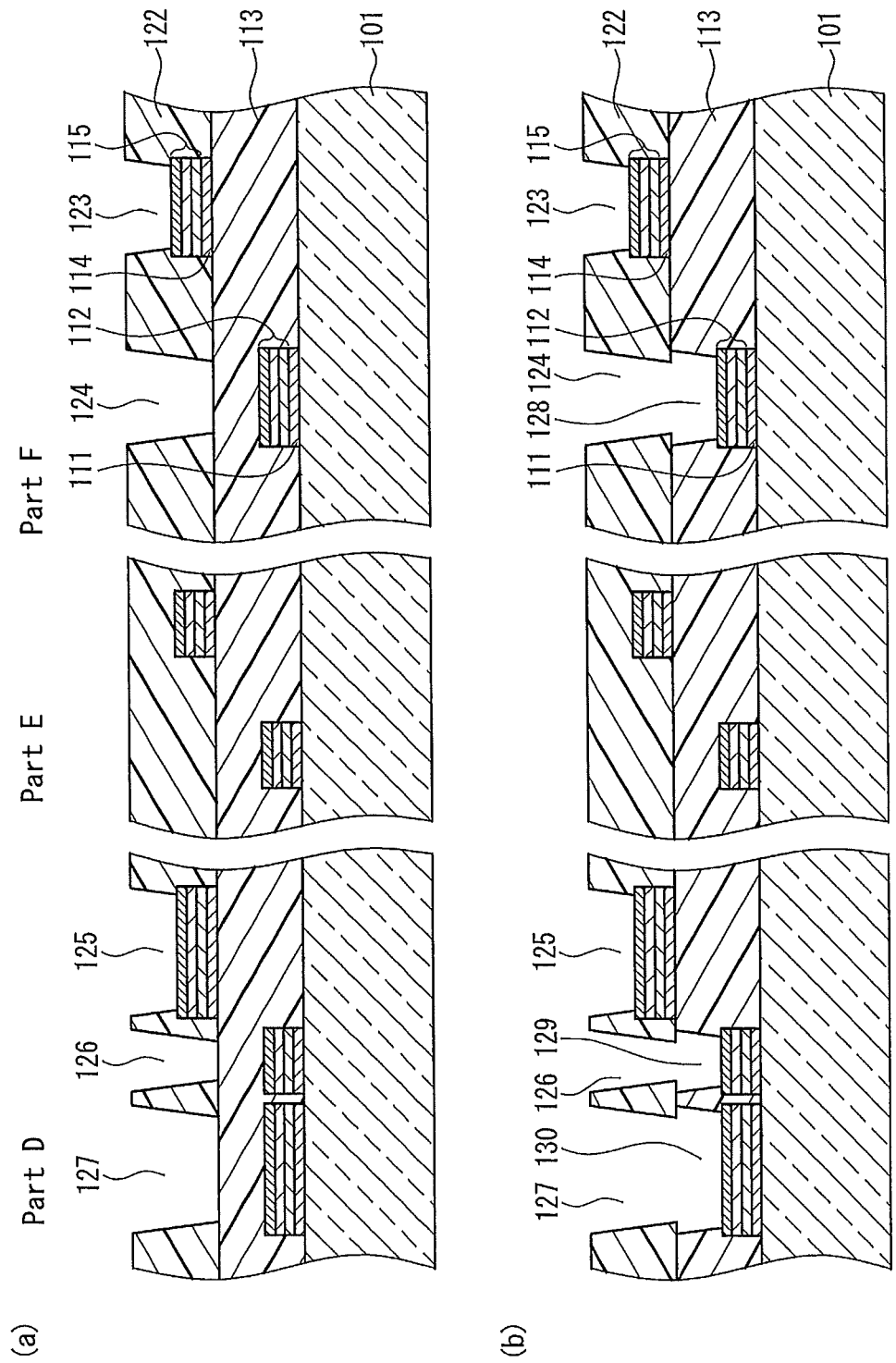
FIG. 12 are cross-sectional views showing steps in a middle stage in a touch panel manufacturing method according to a second application example of Embodiment 2.
Figure 13:
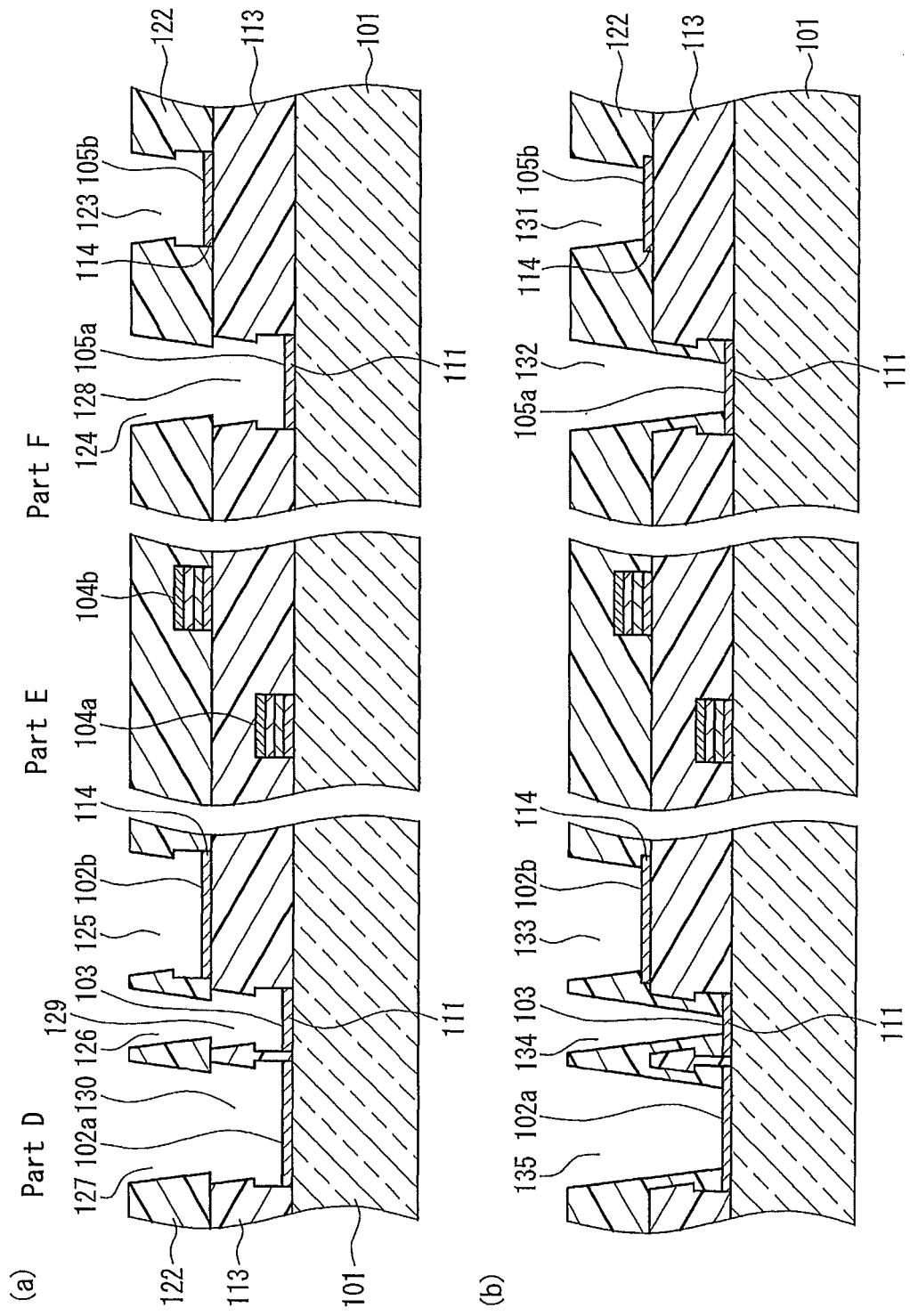
FIG. 13 are cross-sectional views showing steps in a later stage in the touch panel manufacturing method according to the second application example of Embodiment 2.

Next, referring to FIGS. 10 and 11, a touch panel manufacturing method of a first application example of the present embodiment is explained. It should be noted that parts D, E, and F shown in FIGS. 10(a), 10(b), 11(a), and 11(b) are identical to those shown in FIGS. 7 to 9, which show cross-sectional structures of the respective parts in the touch panel manufacturing method of the present embodiment described above. More specifically, the parts D, E, and F are parts having cross sections taken along the arrow line D-D', the arrow line E-E', and the arrow line F-F' in FIG. 6, respectively.

The touch panel manufacturing method of the first application example is different from the touch panel manufacturing method of the present embodiment described above in the point that the protective film of the first layer and the protective film of the second layer are not made of the same material. In other words, the protective film of the first layer and the protective film of the second layer are made of different materials, respectively; for example, the protective film of the first layer is formed with a SiN film, and the protective film of the second layer is formed with a transparent organic resin.

In the touch panel manufacturing method of the first application example as well, after the laminate of the transparent conductive film layer 111 and the metal layer 112 of the first layer as the lower layer is formed on the transparent substrate 101, the protective film 113 of the first layer is formed, and then, a laminate of the transparent conductive film layer 114 and the metal layer 115 of the second layer as the upper layer is formed on the protective film 113. Up to this stage, the process is identical to the touch panel manufacturing method of the present embodiment shown in FIGS. 7(a), 7(b), and 8(a). Therefore, illustration of the process up to this stage is omitted. FIG. 10(a) shows this state, which is identical to the state shown in FIG. 8(a).

Next, in the touch panel manufacturing method of the first application example, a protective film 122 of the second layer made of a transparent organic resin is formed over an entire surface of the protective film 113 of the first layer, so as to cover the laminate of the transparent conductive film layer 114 of the second layer and the metal layer 115 of the second layer.

Then, by photolithography, an opening 127 is formed in a portion in the part D in the protective film 122 of the second layer made of the transparent organic resin where the touch electrode 102a is to be formed, and an opening 126 is formed in a portion thereof where the floating electrode 103 is to be formed, as shown in FIG. 10(b). Further, an opening 125 is formed in a portion in the protective film 122 of the second layer where the touch electrode 102b of the second layer is to be formed. Further, an opening 124 is formed in a portion in the part F where the connection terminal 105a of the first layer is to be formed, and an opening 123 is formed in a portion thereof where the connection terminal 105b of the second layer is to be formed.

Thereafter, the protective film 113 of the first layer is etched by dry etching (the RIE method) using a fluorine-based gas, using the remaining portions of the protective film 122 where openings are not formed as a mask. More specifically, as shown in FIG. 11(a), an opening 128 is formed in the protective film 113 of the first layer, using the opening 124 formed in the protective film 122 of the second layer, and an opening 129 is formed in the protective film 113 of the first layer, using the opening 126 formed in the protective film 122 of the second layer. Further, an opening 130 is formed in the protective film 113 of the first layer, using the opening 127 formed in the protective film 122 of the second layer.

Next, using the protective film 113 of the first layer having the openings 128 to 130 formed therein, and the protective film 122 of the second layer having the openings 123 to 127 formed therein as a mask, the MoNb layers 112c and 115c, the aluminum layers 112b and 115b, and the MoN layers 112a and 115a are etched sequentially with an acid-mixed liquid of phosphoric acid, acetic acid and nitric acid. As a result, in the part D as the touched position detection region and in the part F as a region where the connection terminals 105a and 105b are to be formed, the metal layers 112 and 115 are removed, whereby the transparent conductive film layers 111 and 114 are exposed. In the part E where the lead lines 104a and 104b are formed, the protective film 113 of the first layer and the protective film 116 of the second layer remain. Therefore, the laminates of the transparent conductive film layers 111 and 114 and the metal layers 112 and 115 covered with the protective films 113 and 116 remain.

In this way, the touch panel 200 in the two-layer structure having the electrode patterns shown in FIG. 6 can be formed, as shown in FIG. 11(b).

In the first application example of the present embodiment, since the protective film 122 of the second layer is formed with a transparent organic resin other than SiN as a material for the protective film of the first layer, the protective film 116 of the second layer and the protective film 113 of the first layer cannot be etched at once for forming openings, unlike the manufacturing method shown in FIGS. 7 to 9. However, by using the openings 124, 126, and 127 formed in the protective film 116 of the second layer made of a transparent organic resin, etching can be performed for forming the openings 128 to 130 in the protective film 113 of the first layer. Therefore, exposure masks used are three in total, too, in the touch panel manufacturing method of the first application example of the present embodiment. More specifically, the three masks are a first exposure mask for patterning the transparent conductive film layer 111 and the metal layer 112 of the first layer; a second exposure mask for patterning the transparent conductive film layer 114 and the metal layer 115 of the second layer; and a third exposure mask for forming the openings 123 to 127 in the protective film 122 of the second layer, as shown in FIG. 10(b).

Therefore, in the first application example of the present embodiment, even in the case where the protective film of the first layer and the protective of the second layer of the touch panel are formed of different materials, the touch panel 200 shown in FIG. 6 can be manufactured at low costs with high accuracy, by using three masks. Next, a touch panel manufacturing method of a second application example of the present embodiment is explained with reference to FIGS. 12 to 13. It should be noted that parts D, E, and F shown in each of FIGS. 12(a), 12(b), 13(a), and 13(b) are identical to those shown in FIGS. 7 to 11, which show the touch panel manufacturing method of the embodiment and the manufacturing method of the first application example described above. More specifically, the parts D, E, and F are parts having cross sections taken along the arrow line D-D', the arrow line E-E', and the arrow line F-F' in FIG. 6, respectively.

In the touch panel manufacturing method of the second application example of the present embodiment, after a laminate of the transparent conductive film layer 111 and the metal layer 112 of the first layer is formed on the transparent substrate 101, the protective film 113 of the first layer, made of, for example, $SiO_2$, is formed. Then, a laminate of the transparent conductive film layer 114 and the metal layer 115 of the second layer is formed on the protective film 113, and further, the protective film 122 of the second layer, made of a transparent organic resin, is formed.

Then, by photolithography, in the protective film 122 of the second layer, an opening 127 is formed in the part D at a position where the touch electrode 102a of the first layer is to be formed, and an opening 126 is formed therein at a position where the floating electrode 103 is to be formed. Further, an opening 125 is formed therein at a position where the touch electrode 102b of the second layer is to be formed. Further, an opening 124 is formed in the part F therein at a position where the connection terminal 105a of the first layer is to be formed, and an opening 123 is formed therein at a position where the connection terminal 105b of the second layer is to be formed. The process up to this stage is identical to that of the first application example described above. This state, i.e., a state identical to the state of the first application example shown in FIG. 10(b), is shown in FIG. 12(a).

Next, in the manufacturing method of the second application example as well, openings 128 to 130 are formed in the protective film 113 of the first layer by dry etching (the RIE method) using a fluorine-based gas, by using the openings 124, 126, and 127 formed in the protective film 122 of the second layer made of a transparent organic resin. Here, in the second application example, etching conditions are controlled so that opening areas of upper parts of the openings 128 to 130 formed in the protective film 113 of the first layer are greater than opening area of lower parts of the openings 124, 126, and 127 formed in the protective film 122 of the second layer, respectively, as shown in FIG. 12(b). Regarding this point, the present configuration is different from that of the first application example, in which the openings 128, 129, and 130 formed in the protective film 113 of the first layer have shapes continuous to the openings 124, 126, and 127 formed in the protective film 122 of the second layer, as shown in FIG. 11(a).

Then, in the second application example, by using the protective film 113 of the first layer having the openings 128 to 130 formed therein, and the protective film 122 of the second layer having the openings 123 to 127 formed therein as a mask, the MoNb layers 112c and 115c, the aluminum layers 112b and 115b, and the MoN layers 112a and 115a are etched sequentially with an acid-mixed liquid of phosphoric acid, acetic acid and nitric acid. As a result, as shown in FIG. 13(a), the metal layer 112 and 115 are removed, whereby the transparent conductive film layers 111 and 114 are exposed in the parts D and F.

Next, while being irradiated with ultraviolet rays in an exposure amount of seven to eight times an optimal exposure amount at curing, the protective film 122 of the second layer, which is a transparent organic resin film, is annealed under fusing conditions suitable for the transparent organic resin film as its material, for example, an ambient temperature of 200° C. As a result, walls of openings 133 to 135 in the part D that expose the surfaces of the touch electrodes 102a and 102b and the floating electrode 103, and walls of openings 131 and 132 in the part F that expose the surfaces of the connection terminals 105a and 105b, are caused to have smooth surfaces continuous from the glass substrate 101 side, as shown in FIG. 13(b).

Thus, by the method for manufacturing the touch panel 200 of the second application example, the openings 131 to 135 that expose the touch electrodes 102a and 102b, the floating electrode 103, and the connection terminals 105a and 105b can be formed so as to have such cross-sectional shapes as to provide continuous, smooth walls. Therefore, the following problem can be prevented: when the touch panel is used, a step-like portion of the protective film 113 of the first layer or the protective film 122 of the second layer is hooked by something, whereby the protective film 113 of the first layer or the protective film 122 of the second layer could possibly damaged and a fragment would become a foreign substance on the surface of the touch panel. Further, the following inconvenience can be prevented: the touch electrodes 102a and 102b, the floating electrode 103, the connection terminals 105a and 105b thus patterned could be peeled off together with the protective film 113 of the first layer and the protective film 122 of the second layer. Thus, a touch panel with high reliability can be obtained.

It should be noted that the annealing step used in the touch panel manufacturing method of the second application example is intended to smoothen the cross-sectional shape of the protective film 122 of the second layer under the fusing condition for the protective film 122 of the second layer as shown in FIGS. 13(b), and another exposing-developing step with use of a mask is not required. Therefore, in the second application example as well, the touch panel having the electrode patterns formed in two layers as shown in FIG. 6 and in which the lead lines 104a and 104b formed by laminating the metal films 112 and 115 having low resistances, respectively, can be manufactured with use of three masks in total.

Figure 14:
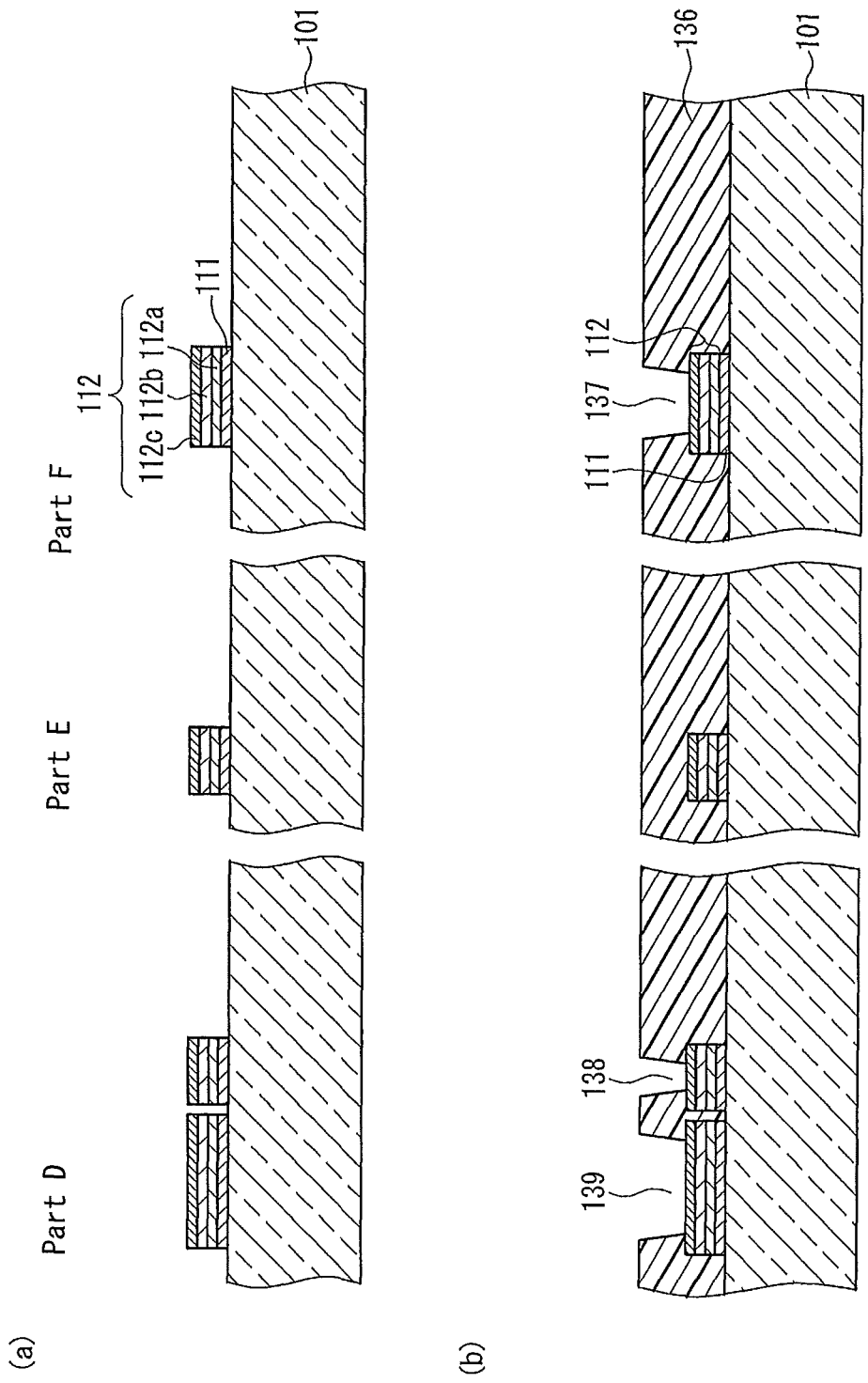
FIG. 14 are cross-sectional views showing steps in an initial stage in a touch panel manufacturing method according to a third application example of Embodiment 2.
Figure 15:
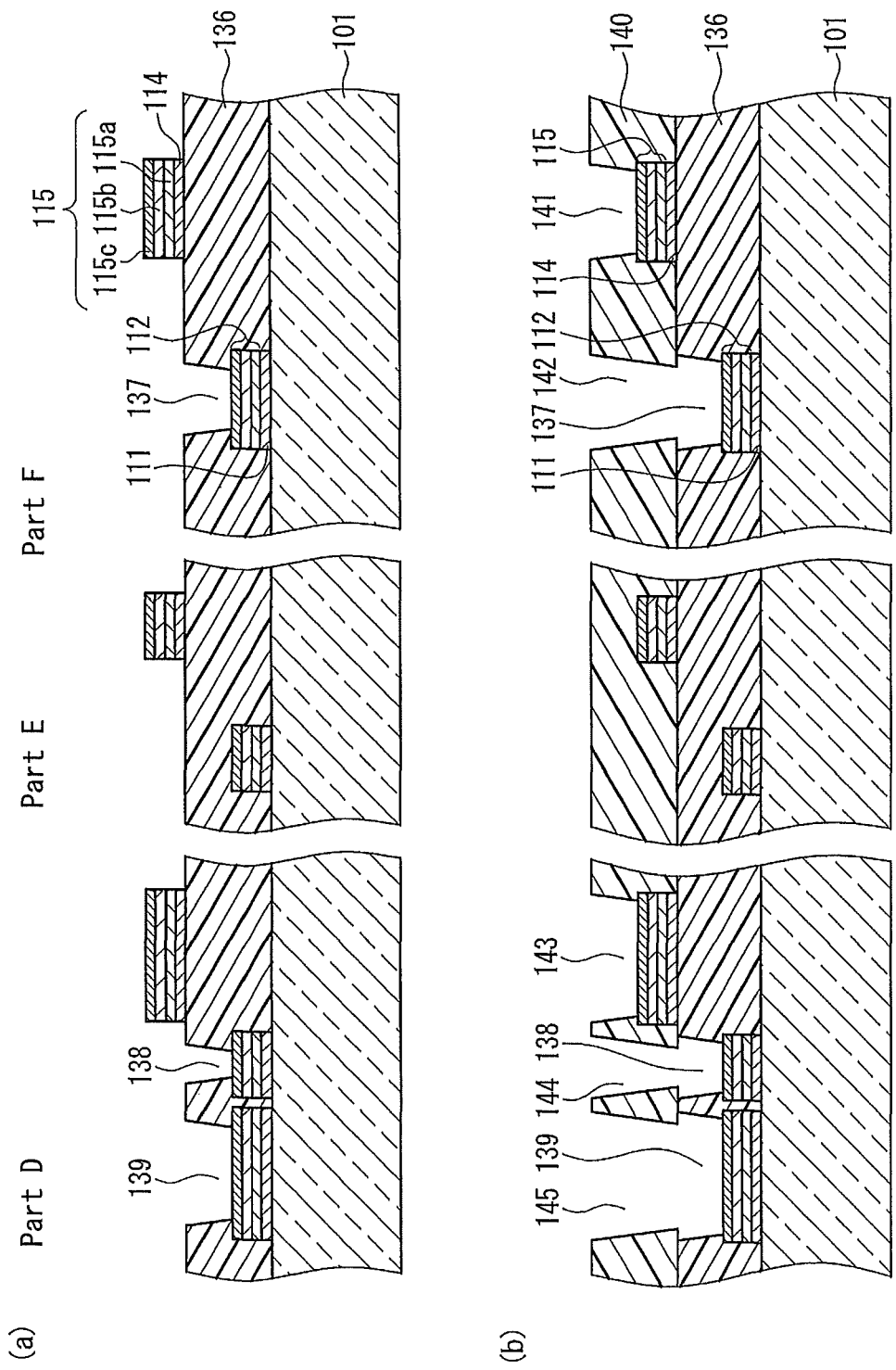
FIG. 15 are cross-sectional views showing steps in a middle stage in the touch panel manufacturing method according to the third application example of Embodiment 2.
Figure 16:
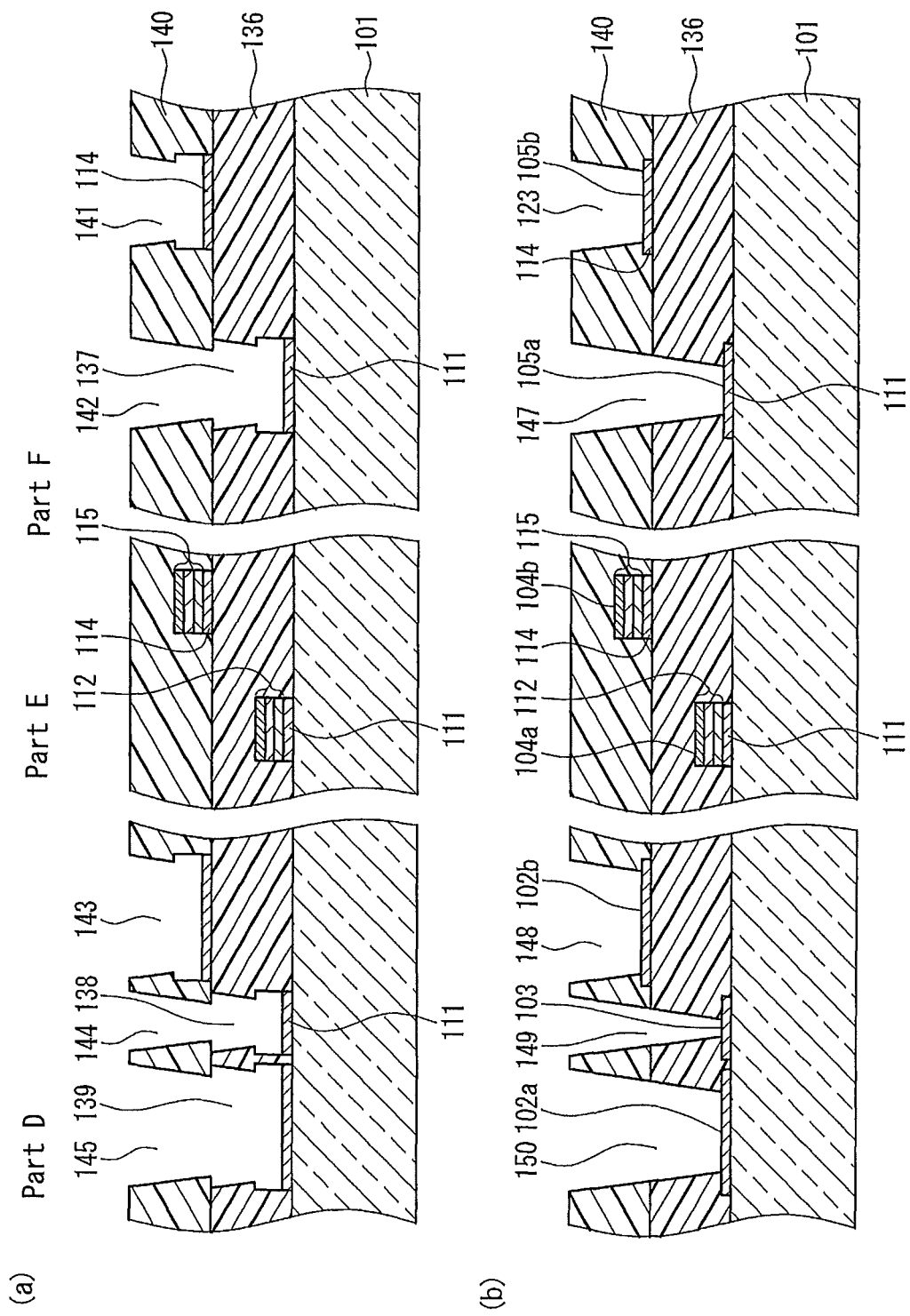
FIG. 16 are cross-sectional views showing steps in a later stage in the touch panel manufacturing method according to the third application example of Embodiment 2.

Next, a touch panel manufacturing method of a third application example of the present embodiment is explained with reference to FIGS. 14 to 16. It should be noted that parts D, E, and F shown in each of FIGS. 14 to 16 are parts having cross sections taken along the arrow line D-D', the arrow line E-E', and the arrow line F-F' in FIG. 6, respectively.

In the touch panel manufacturing method according to the third application example, a transparent conductive film layer 111 made of ITO or the like is formed over an entire surface of the glass substrate 101 as the transparent substrate, and thereafter, a MoN layer 112a, an aluminum layer 112b, and a MoNb metal layer 112c that compose a metal layer 112 are laminated sequentially by sputtering. Then, a resist film (not shown) is formed and a predetermined resist pattern is formed by usual photolithography. Thereafter, using this resist pattern as a mask, the MoNb layer 112c, the aluminum layer 112b, the MoN layer 112a, and the transparent conductive film layer 111 are etched. This state is a state shown in FIG. 14(a), which is identical to the state shown in FIG. 7(a) for the explanation of the manufacturing method of the present embodiment.

Next, as shown in FIG. 14(b), a protective film 136 of the first layer formed with a transparent organic resin film is formed over an entire surface of the glass substrate 101. Then, openings 139, 138, and 137 are formed in the protective film 136 of the first layer at positions corresponding to the touch electrode 102a, the floating electrode 103, and the connection terminal 105a of the first layer, respectively, by usual photolithography, so that the MoNb layer 112c as an uppermost layer of the metal layer 112 is exposed. Here, as shown in FIG. 14(b), the laminate of the transparent conductive film layer 111 and the metal layer 112, which is to be the lead line 104a of the first layer formed in the part E, is covered with the protective film 136 of the first layer.

Next, after a transparent conductive film layer 114 made of ITO or the like is formed on the protective film 136 of the first layer, a MoN layer 115a, an aluminum layer 115b, and a MoNb layer 115c that are first, second, and third layers composing the metal layer 115, are laminated sequentially by sputtering. Then, by usual photolithography using a resist film, in the same manner as that for the first layer, laminates each of which is composed of the transparent conductive film layer 114 and the metal layer 115 are formed in the second layer in the part D so as to become the touch electrode 102b, in the second layer in the part E so as to become the lead line 104b, and in the second layer in the part F so as to become the connection terminal 105b. Thus, a state shown in FIG. 15(a) is obtained.

Next, a protective film 140 of the second layer formed of a transparent organic resin film is formed over an entire surface of the glass substrate 101. Then, openings 145, 144, and 143 are formed at positions in the part D where the touch electrode 102a and the floating electrode 103 of the first layer and the touch electrode 102b of the second layer are to be formed, respectively, by photolithography, as shown in FIG. 15(b).

Further, openings 142 and 141 are formed at positions in the part F where the connection terminal 105a of the first layer and the connection terminal 105b of the second layer are to be formed, respectively.

Here, since the openings 137, 138, and 139 have been formed in the protective film 136 of the first layer, the openings 145, 144, and 142 formed in the protective film 140 of the second layer are connected to the openings 139, 138, and 137 formed in the protective layer 136 of the first layer, as shown in FIG. 15(b). More specifically, the opening 145 formed in the protective layer 140 of the second layer and the opening 139 formed in the protective film 136 of the first layer are connected with each other, and the opening 144 formed in the protective film 140 of the second layer and the opening 138 formed in the protective film 136 of the first layer are connected with each other. Further, the opening 142 formed in the protective film 140 of the second layer and the opening 137 formed in the protective film 136 of the first layer are connected with each other. Thus, the laminates in the first layer each of which is composed of the transparent conductive film layer 111 and the metal layer 112, and the laminates in the second layer each of which is composed of the transparent conductive film layer 114 and the metal layer 115, which are formed at positions corresponding to the touch electrodes 102a and 102b and the floating electrode 103 in the part D and the connection terminals 105a and 105b in the part F, are exposed.

Thereafter, etching is carried out by using, as a mask, the protective film 140 of the second layer having the openings 141 to 145 formed therein, and the protective film 136 of the first layer having the openings 137 to 139 formed therein, whereby the metal laminates 112 and 115 laminated on the transparent conductive film layers 111 and 114 in the parts D and F, respectively, are removed. The state in which the metal layers 112 and 115 have been removed is shown in FIG. 16(a).

Thereafter, annealing is carried out under fusing conditions suitable for fusing the protective film 136 of the first layer and the protective film 140 of the second layer that are transparent organic resin films. As a result, walls of openings 148, 150, and 149 in the part D that expose the surfaces of the touch electrodes 102a and 102b and the floating electrode 103, and walls of openings 146 and 147 in the part F that expose the surfaces of the connection terminals 105a and 105b, are caused to have continuous, smooth surfaces, as shown in FIG. 16(b).

With the manufacturing method of the third application example shown in FIGS. 14 to 16, a touch panel 200 that has electrode patterns separated in two layers shown in FIG. 6 and the lead lines 104a and 104b formed by laminating the metal films 112 and 115 having low resistances can be obtained.

The exposure masks used herein are four in total. More specifically, first, a first exposure mask is needed for patterning the transparent conductive film layer 111 and the metal layer 112 formed in the first layer as shown in FIG. 14(a). A second exposure mask is needed for forming the predetermined openings 137, 138, and 139 in the protective film 136 of the first layer as shown in FIG. 14(b). Further, a third exposure mask is needed for patterning the transparent conductive film 114 and the metal layer 115 formed in the second layer as shown in FIG. 15(a). Still further, a fourth exposure mask is needed for forming the openings 141, 142, 143, 144, and 145 at predetermined positions in the protective film 140 of the second layer as shown in FIG. 15(b).

Thus, it is necessary to expose the insulative film 136 of the first layer and the insulative film 140 of the second layer with different masks, respectively, for patterning, so as to finely form the touch electrodes in order to increase the number of electrodes (number of channels), so as to increase the touch sensitivity of the touch panel. For this purpose, the number of exposure masks needed is four in total, which is one more as compared with the touch panel manufacturing method according to the present embodiment described above. With this third application example, however, a touch panel that is characterized in that transparent organic resins as acrylic resins are used for forming the protective film 136 of the first layer and the protective film 140 of the second layer and that electrode patterns are provided in a two-layer structure can be manufactured with fewer masks as compared with the conventional manufacturing method shown in FIGS. 34 and 35, which requires five masks.

Figure 17:
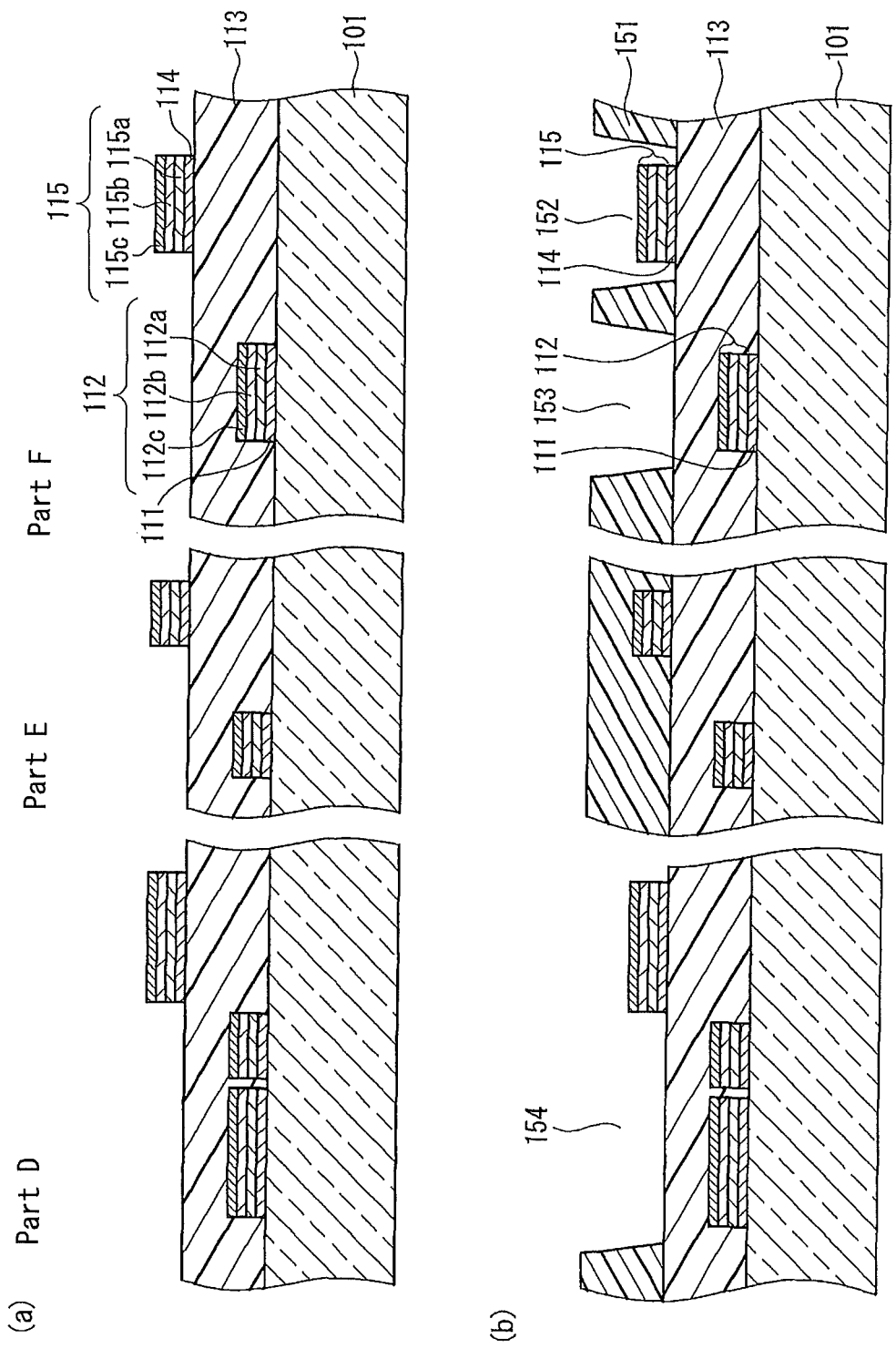
FIG. 17 are cross-sectional views showing steps in a middle stage in a touch panel manufacturing method according to a fourth application example of Embodiment 2.
Figure 18:
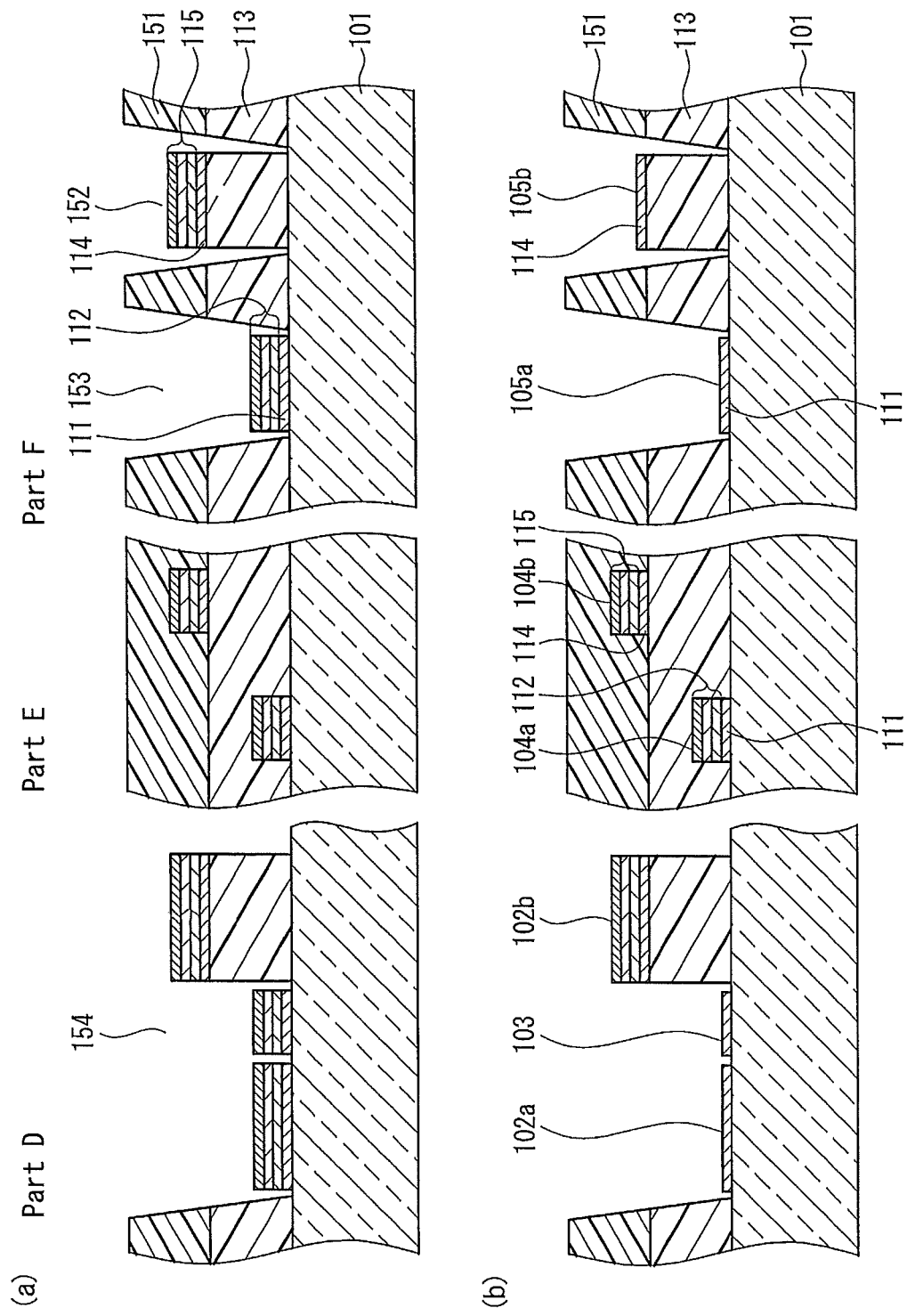
FIG. 18 are cross-sectional views showing steps in a later stage in the touch panel manufacturing method according to the fourth application example of Embodiment 2.

Next, a touch panel manufacturing method of a fourth application example of the present embodiment is explained with reference to FIGS. 17 and 18. It should be noted that parts D, E, and F shown in each of FIGS. 17 and 18 are parts having cross sections taken along the arrow line D-D', the arrow line E-E', and the arrow line F-F' in FIG. 6, respectively.

In the manufacturing method according to the fourth application example, the process of patterning a laminate of the transparent conductive film layer 111 of the first layer and the metal layer 112, then, forming a protective film of the first layer made of, for example, $SiO_2$, and patterning a laminate of the transparent conductive film layer 114 and the metal layer 115 of the second layer is identical to that of the first application example described above. Therefore, illustration of this process is omitted. The state in which the laminate of the transparent conductive film layer 114 and the metal layer 115 of the second layer is patterned is shown in FIG. 17(a).

Subsequently, the protective film 151 of the second layer made of a transparent organic resin is formed on the protective film 113 of the first layer. Here, in the first application example shown in FIGS. 10 and 11, the openings 127, 125, 126, 124, and 123 are formed in the protective film 122 of the second layer at positions corresponding to the touch electrode 102a, 102b, and the floating electrode 103 in the part D and the connection terminals 105a and 105b in the part F, respectively. In the fourth application example, however, as shown in FIG. 17(b), an opening 154 is formed in the part D so as to expose an entirety of the touched position detection region where the touch electrodes 102a and 102b and the floating electrode 103 are formed. Besides, openings 153 and 152 formed in the part F at positions corresponding to the connection terminals 105a and 105b have opening areas greater than areas of the laminates of the transparent electrodes 111 and 114 and the metal layers 112 and 115, which are to be the connection terminals 105a and 105b, respectively. The fourth application example is different from the first application example in the above-described points.

Subsequently, the protective film 113 of the first layer made of $SiO_2$ is etched by dry etching (the RIE method) using a fluorine-based gas, by using the protective film 151 of the second layer as a mask. Here, by controlling etching conditions, etching is carried out so that the protective film 113 of the first layer should not be etched below the laminates each of which is composed of the transparent conductive film layer 114 and the metal layer 115, in the portions that are to be the touch electrode 102b of the second layer and the connection terminal 105b of the second layer, as shown in FIG. 18(a).

Then, as shown in FIG. 18(a), top faces and side faces of the laminates each of which is composed of the transparent conductive film layer 111 and the metal layer 112 are exposed, as to the portions that are to be the touch electrodes 102, the floating electrode 103, and the connection terminal 105a formed in the first layer.

Next, the MoNb layers 112c and 115c, the aluminum layers 112b and 115b, and the MoN layers 112a and 115a are etched sequentially with an acid-mixed liquid of phosphoric acid, acetic acid, and nitric acid. As a result, in the part D as the touched position detection region, and the F part as a region where the connection terminals 105a and 105b are formed, the metal layers 112 and 115 are removed, whereby the transparent conductive film layers 111 and 114 are exposed. Here, the touch electrode 102b and the connection terminal 105b of the second layer are positioned on the protective layer 113 of the first layer remaining below the same.

In the fourth application example as well, the number of exposure masks used is three in total. More specifically, a first exposure mask is needed for patterning the transparent conductive film layer 111 and the metal layer 112 formed in the second layer. Further, a second exposure mask is needed for patterning the transparent conductive film layer 114 and the metal layer 115 formed in the first layer. Still further, a third exposure mask is needed for forming the openings 152, 153, and 154 at predetermined positions in the protective film 151, as shown in FIG. 17(b).

Therefore, with the fourth application example, a touch panel 200 in which transparent organic resins such as a transparent acrylic resin are used for forming the protective films on the touch panel surface, which has an electrode pattern form shown in FIG. 6, and in which an entirety of the touched position detection region is exposed, can be manufactured at low costs with high accuracy, by using three masks.

So far the touch panel manufacturing method according to the present embodiment and the application examples of the same have been explained. These touch panel manufacturing methods make it possible to manufacture a touch panel having a touch electrode pattern in which touch electrodes, lead lines, and connection terminals are formed in vertically arranged two layers, with use of fewer exposure masks as compared with the conventional manufacturing method. This makes it possible to reduce the touch panel manufacturing cost, and to reduce the number of times of exposure mask alignment. Therefore, the above-described manufacturing methods make it unlikely that errors would occur during the touch panel manufacturing.

It should be noted that the film thicknesses of layers shown in the touch panel manufacturing method of the above-described embodiment are basically identical to those of Embodiment 1 described above.

For example, the glass substrate 1 has a thickness of 0.7 mm, and each of the transparent conductive film layer 111 of the first layer and the transparent conductive film layer 114 of the second layer has a thickness of 70 nm. Further, for example, the MoN layers 112a and 115a, and the aluminum layers 112b and 115b, which compose the first metal layer 112 and the second metal layer 115, respectively, have a thickness of 50 nm, and a thickness of 150 nm, respectively. Still further, for example, the MoNb layers 112c and 115c have a thickness of 100 nm each, and the protective films 113 and 136 of the first layer, and the protective films 122, 140, and 151 of the second layer have a thickness of 3 μm each.

As the materials used for forming the transparent conductive film layers and the protective films, and the materials used as the resist films and the etching liquids, those explained in the description of Embodiment 1 can be used.

[Embodiment 3]

Next, Embodiment 3 of a touch panel manufacturing method is explained. The present embodiment relates to method for manufacturing a touch panel having a so-called rerouted line, that is, a touch panel in which touch electrodes and connection terminals are formed in one layer and at least a part of lead lines are rerouted and connected in a different layer than the layer in which the touch electrodes and connection terminals are formed.

Figure 19:
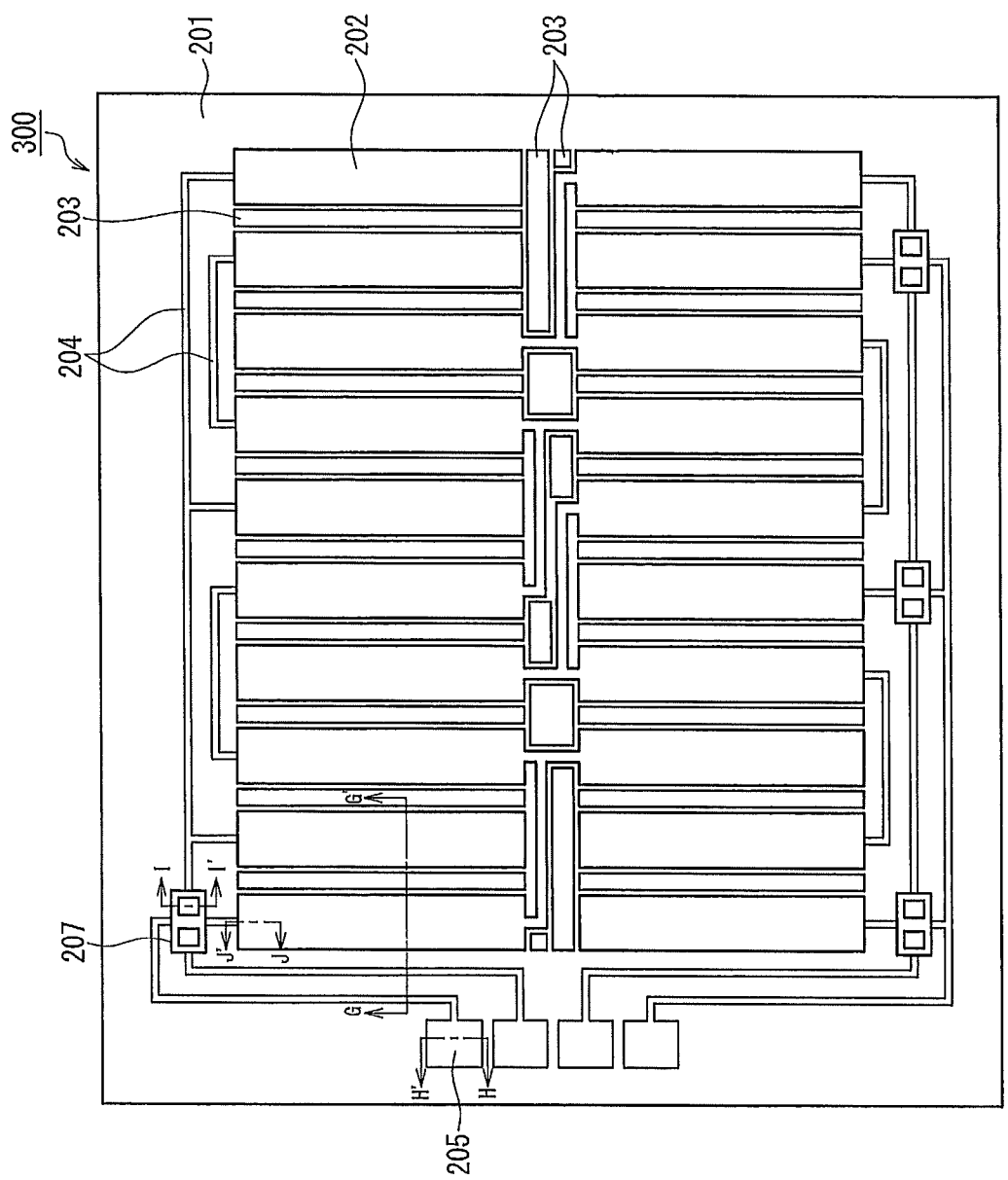
FIG. 19 is a plan view showing electrode patterns of a touch panel manufactured by a touch panel manufacturing method according to Embodiment 3 and in which lead lines are partially rerouting lines.

FIG. 19 is a plan view showing electrode patterns of a touch panel 300 manufactured by the touch panel manufacturing method of the present embodiment.

The touch panel 300 includes touch electrodes 202 obtained by forming transparent conductive film layers made of ITO as two-dimensional patterns on a glass substrate 201 as an insulative transparent substrate. In the touch panel 300 of the present embodiment, the lead lines 204 for connecting the touch electrodes 202 and the connection terminals 205 are discontinued in the layer where the touch electrodes 202 and the connection terminals 205 are formed, and have three-dimensionally crossing portions each of which is cross-shaped as viewed two-dimensionally, formed with a rerouting line 207 provided in another layer.

To avoid complication in the illustration beyond necessity, the shapes and basic arrangement pattern of the touch electrodes 202, the lead lines 204, and the connection terminals 205 shown in FIG. 19 are shown as identical to those of the electrode patterns of Embodiment 1 shown in FIG. 1 in which the lead lines 4 are formed in the same layer as that for the touch electrodes 2. However, in the case where the electrodes are finely patterned or in the case where a peripheral area around the touched positioned detection region is so narrow that it is difficult to arrange lead lines 204 on one surface, rerouting portions having the rerouting lines 207 for crossing the lead lines 204 three-dimensionally are formed in some cases as shown in FIG. 19.

It should be noted that the touch panel 300 having electrode patterns shown in FIG. 19 is identical to the touch panel 100 shown in FIG. 1 regarding the arrangement and shapes of the touch electrodes 202, the point that floating electrodes 203 are arranged between the touch electrodes 202, and the like. Therefore, detailed explanation is omitted.

Figure 20:
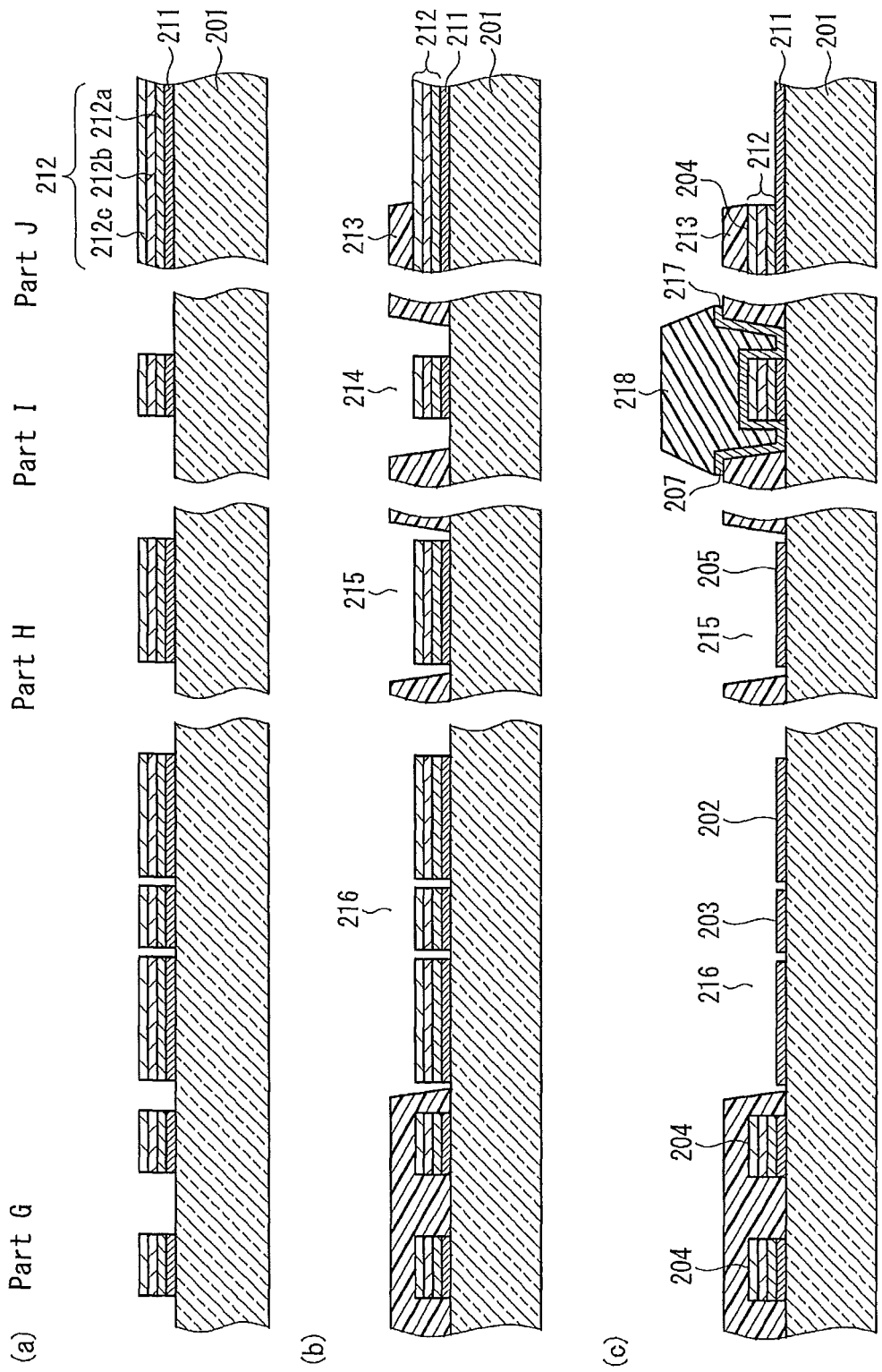
FIG. 20 are cross-sectional views showing steps of a touch panel manufacturing method according to Embodiment 3.

FIG. 20 are cross-sectional views showing exemplary steps of the method for manufacturing the touch panel 300 shown in FIG. 19.

It should be noted that each of FIGS. 20(a), 20(b), and 20(c) shows four illustrations. The illustration on the left end shows a cross-sectional configuration of a part taken along an arrow line G-G' in FIG. 19 showing electrode patterns, that is, a cross-sectional configuration of a part where the touch electrode 202, the floating electrode 203, and two of the lead lines 204 are formed. In the following description, the part having the cross section taken along the arrow line G-G' in FIG. 19 is referred to as a part G.

In each of FIGS. 20(a), 20(b), and 20(c), the second illustration from the left side shows a cross-sectional configuration of a part taken along an arrow line H-H' in FIG. 19, that is, a cross-sectional configuration of a part where the connection terminal 205 is formed. In the following description, the part having the cross section taken along the arrow line H-H' in FIG. 19 is referred to as a part H.

In each of FIGS. 20(a), 20(b), and 20(c), the third illustration from the left side shows a cross-sectional configuration of a part taken along an arrow line H' in FIG. 19 showing electrode patterns, that is, a cross-sectional configuration of a connection portion where the lead lines 204 and the rerouting line 207 are connected. In the following description, the part having the cross section taken along the arrow line I-I' in FIG. 19 is referred to as a part I.

In each of FIGS. 20(a), 20(b), and 20(c), the illustration on the right end shows a cross-sectional configuration of a part taken along an arrow line J-J' in FIG. 19 showing electrode patterns, that is, a cross-sectional configuration of a connection portion where the touch electrode 202 and the lead line 204 are connected. In the following description, the part having the cross section taken along the arrow line J-J' in FIG. 19 is referred to as a part J.

In the method for manufacturing the touch panel 300 of the present embodiment, a transparent conductive film layer 211 made of ITO or the like is formed over an entire surface of the glass substrate as a transparent substrate, and thereafter, a MoN layer 212a, an aluminum layer 212b, and a MoN layer 212c that compose a metal layer 212 are laminated sequentially by sputtering.

Subsequently, a resist film 213 that functions as a protective film is formed on the MoN layer 212c as an uppermost layer of the metal layer 212. In this resist film 213, an opening 216 is formed by usual photolithography so as to correspond to a touched position detection region that includes the touch electrodes 202 and the floating electrodes 203, as shown in FIG. 20(b). Further, in the resist film 213, an opening 215 is formed in a portion thereof where the connection terminal 205 is to be formed, and an opening 214 is formed in a portion thereof where a junction portion between the lead lines 204 and the rerouting line 207 is to be formed, by photolithography.

Next, a conductive film 217 made of Mo or the like, which is to be the rerouting line, is formed by sputtering or the like, and a resist film 218 is formed so as to overlap the conductive film 217. Then, the resist film 218 is caused to remain on a portion where the rerouting line 207 is to be formed.

Thereafter, the conductive film 217, and the metal layer 212 (the MoN layer 212c, the aluminum layer 212b, and the MoN layer 212a) on portions where the touch electrode 202, the floating electrode 203, and the connection terminal 205 are to be formed are etched with an acid-mixed liquid of phosphoric acid, acetic acid, and nitric acid, with use of the resist films 213 and 218 as masks. The resist film 218 on the rerouting line 207 is caused to remain so as to function as a protective film for the rerouting line 207. By doing so, the state shown in FIG. 20(c) is obtained.

In the touch panel manufacturing method of the present embodiment, the touch panel 300 having the lead lines 204 each of which is obtained by laminating the transparent conductive film 211 and the metal layer 212 having a low resistance, and the rerouting line 207 that allows the lead lines 204 to cross three-dimensionally can be manufactured with use of three masks in total. More specifically, in the manufacture of the touch panel 300, a first exposure mask is needed for patterning the laminate of the transparent conductive film 211 and the metal layer 212. Further, a second exposure mask is needed for forming the openings 214, 215, and 216 in the resist film 213, and a third exposure mask is needed for patterning the resist film 218 necessary for forming the rerouting line 207.

Therefore, the touch panel 300 having the rerouting line 207 and having a high degree of freedom in the design of arrangement of the lead lines 204, with a fewer exposure masks. This makes it possible to decrease the touch panel manufacturing costs, and to improve the manufacturing accuracy owing to a decrease in the number of times of mask alignment.

Next, a touch panel manufacturing method according to an application example of the present embodiment is explained.

Figure 21:
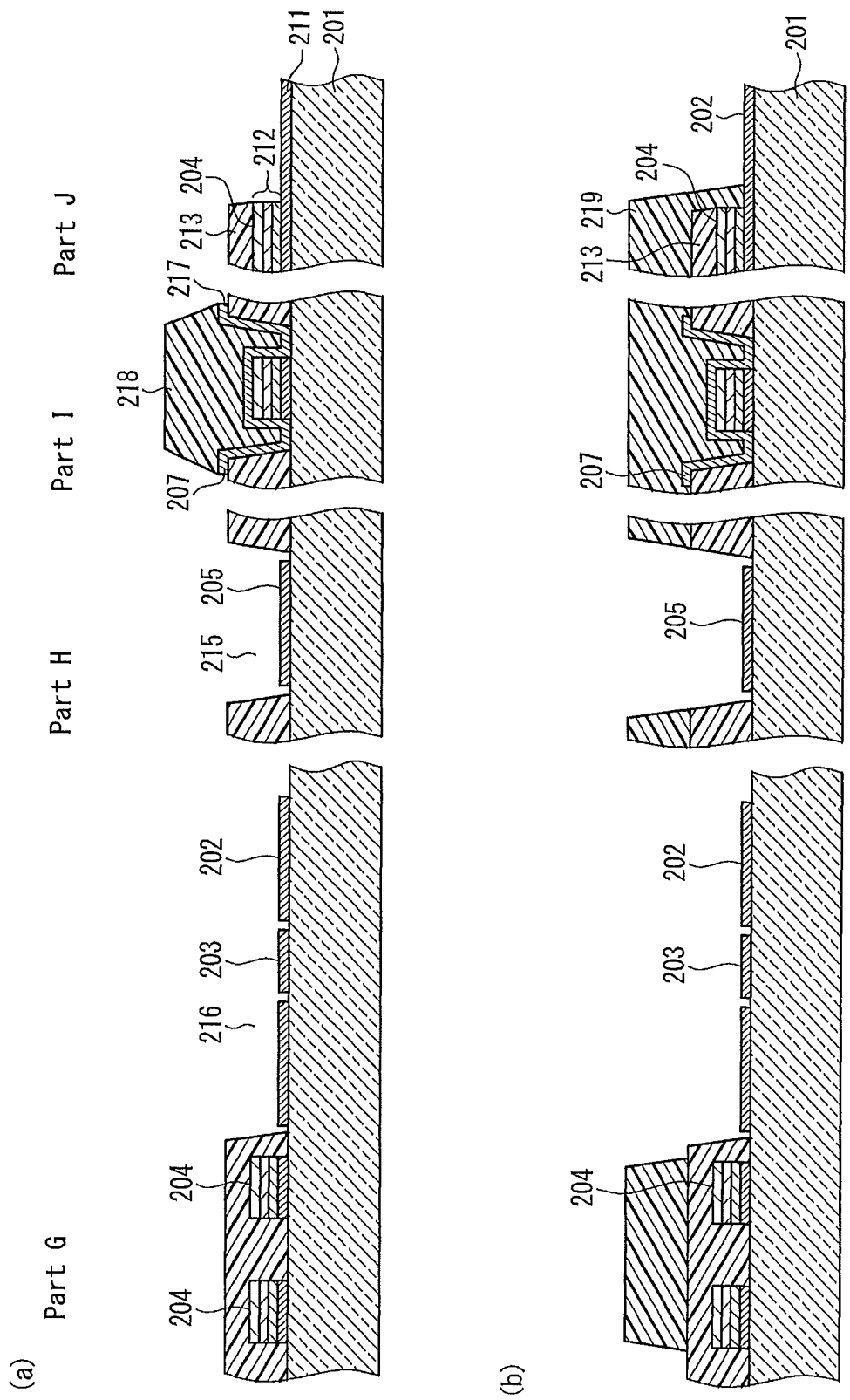
FIG. 21 are cross-sectional views showing steps of a touch panel manufacturing method according to an application example of Embodiment 3.

FIG. 21 are cross-sectional views showing an application example of the touch panel manufacturing method of the present embodiment. Regarding four illustrations in each of FIGS. 21(a) and 21(b), the illustration on the left end shows the part G as a part having a cross section taken along the arrow line G-G' in FIG. 19, and the second illustration from the left side shows the part H as a part having a cross section taken along the arrow line H-H' in FIG. 19, as is the case with FIG. 20. Further, in each of FIGS. 21(a) and 21(b), the third illustration from the left side shows the part I as a part having a cross section taken along the arrow line H' in FIG. 19, and the illustration on the right end shows the part J as a part having a cross section taken along the arrow line J-J' in FIG. 19.

In the touch panel manufacturing method according to the application example of the present embodiment, a transparent conductive film layer 211 made of ITO or the like is formed over an entire surface of the glass substrate 201 as a transparent substrate, and thereafter, a metal layer 212 composed of a MoN layer 212a, an aluminum layer 212b, and a MoN layer 212c is laminated and patterned. Thereafter, three openings 214, 215, and 216 are formed in a resist film 213 by photolithography. The above-described process up to this stage is identical to that of the touch panel manufacturing method explained with reference to FIG. 20.

Thereafter, in the present application example, the resist film 213 is annealed, for example, at a temperature of 220° C. for 50 minutes.

Next, a conductive film 217 made of Mo or the like, which is to be the rerouting line, is formed by sputtering or the like, and a resist film 218 is formed so as to overlap the conductive film 217. Then, the resist film 218 is caused to remain on a portion where the rerouting line 207 is to be formed. Thereafter, the conductive film 217, and the metal layer 212 (the MoN layer 212c, the aluminum layer 212b, and the MoN layer 212a) on portions where the touch electrode 202, the floating electrode 203, and the connection terminal 205 are to be formed are etched with an acid-mixed liquid of phosphoric acid, acetic acid, and nitric acid, with use of the resist films 213 and 218 as masks. The state after etching is shown in FIG. 21(a).

This configuration shown in FIG. 21(a) is identical to the configuration shown in FIG. 20(c) in terms of the appearance, but is different from the configuration shown in FIG. 20(c) in the point that the resist film 213 thus formed is annealed.

Subsequently, the resist film 218 on the rerouting line 207 is removed with a removing solution. Here, the resist film 213 annealed cannot be removed, since it is cured.

Finally, after the resist film 219 as a surface protective film is applied, the resist film 219 is caused to remain in the part G except for areas where the touch electrode 202 and the floating electrode 203 are formed, and in the part H except for areas where the connection terminal 205 is formed.

Therefore, by the above-described manufacturing method of the application example, the touch panel 300, whose surface except for the connection terminals 205 and the touched position detection region where the touch electrodes 202 and the floating electrodes 203 are formed is covered with the surface protective film having a uniform thickness, can be manufactured with use of four masks in total. More specifically, in the manufacturing method of the above-described application example, a first mask is needed for patterning the laminate of the transparent conductive film layer and the metal layer, and a second mask is needed for forming the openings 214, 215, and 216 in the resist film 213. Further, a third mask is needed for patterning the resist film 218 necessary for forming the rerouting line 217, and a fourth mask is needed for patterning the resist film 219 as a surface protective layer covering the surface of the touch panel.

Particularly, with the present application example, in the part J, that is, the connection portion where the touch electrode 202 and the lead line 204 are connected with each other, a side edge surface of the metal layer 212 laminated on the transparent conductive film 211 in the lead line 204 can be covered with the resist film 219 as a surface protective film, as shown in FIG. 21(b). By so doing, an inconvenience such as oxidation of the metal layer 212 exposed to air can be avoided.

Next, a touch panel manufacturing method of a first modification example of the present embodiment is explained. In this modification example, the touch panel has electrode patterns in which lead lines are formed as rerouting lines in a different layer than a layer where touch electrodes and connection terminals are provided.

Figure 22:
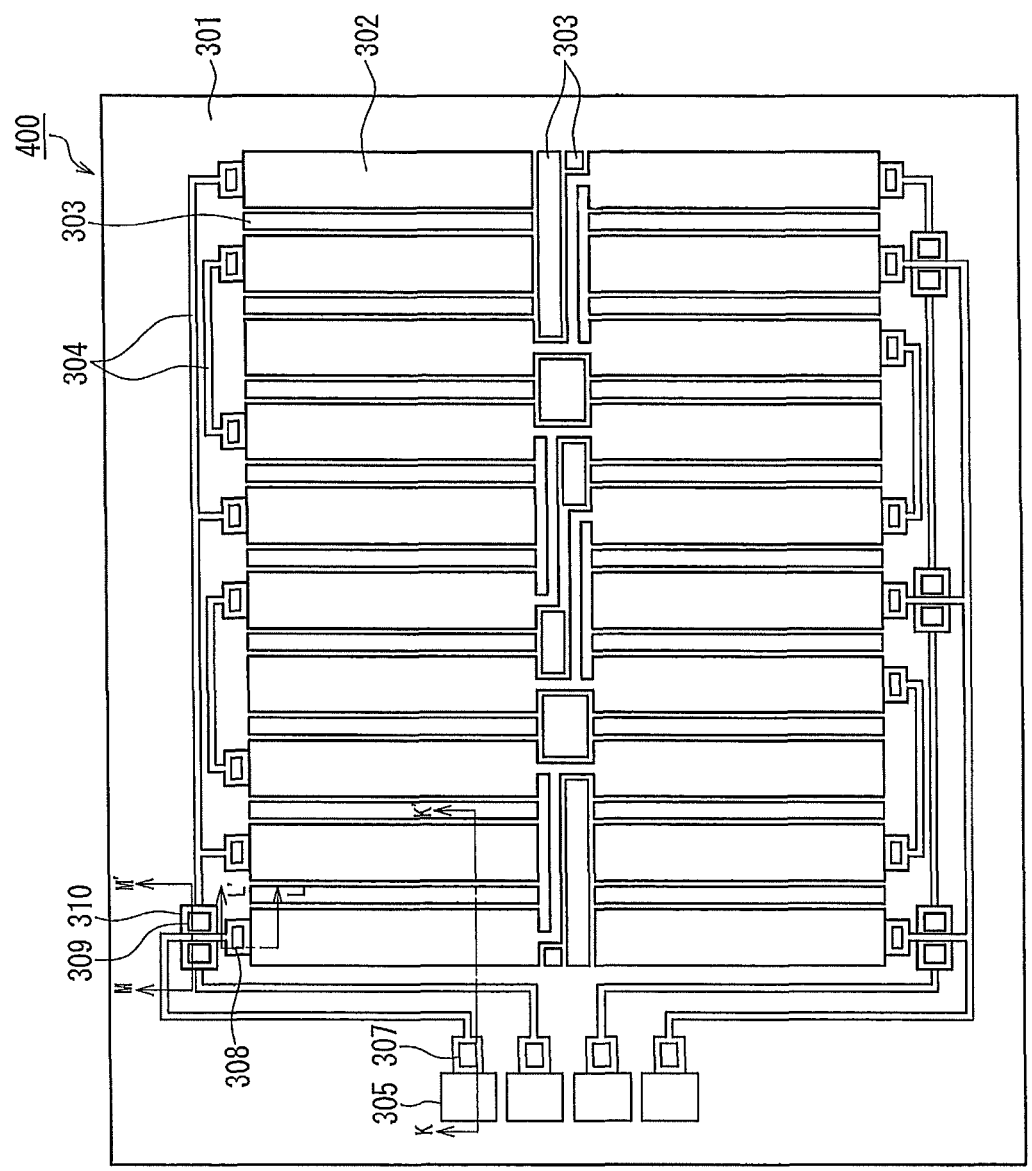
FIG. 22 is a plan view showing electrode patterns of a touch panel that is manufactured by a touch panel manufacturing method according to a first modification example of Embodiment 3, and in which lead lines are partially rerouting lines.

FIG. 22 is a plan view showing electrode patterns of a touch panel 400 manufactured by a touch panel manufacturing method of the first modification example.

The touch panel 400 has touch electrodes 302 obtained by forming a transparent conductive film layer made of ITO into two-dimensional patterns on a glass substrate 301 as an insulative transparent substrate. In the touch panel 400, further, connection terminals 305 for outputting a touched position signal detected by the touch electrodes 302 to outside of the touch panel 400 are formed on the glass substrate 301. The lead lines 304 for connecting the touch electrodes 302 and the connection terminals 305 are formed as rerouting lines in a different layer than the layer where the touch electrodes 302 and the connection terminals 305 are formed. In other words, in the touch panel 400, the touch electrodes 302 and the lead lines 304, which are formed in different layers, respectively, are electrically connected via through holes provided in connection portions 308. Further, in the touch panel 400, the connection terminals 305 and the lead lines 304, which are formed in different layers, respectively, are electrically connected via through holes provided in connection portions 307. Further, in the touch panel 400, in order that the lead lines are allowed to cross three-dimensionally, the lead lines 304, and lead line crossing portions 310 formed in the same layer where the touch electrodes 304 and the connection terminals 305 are formed, are connected via through holes provided in connection portions 309.

It should be noted that the configuration shown in FIG. 22 is identical to that of the touch panel 100 shown in FIG. 1 regarding the arrangement pattern of the touch electrodes 302, and the point that floating electrodes 303 are provided between the touch electrodes 302. Therefore, detailed explanation is omitted.

Figure 23:
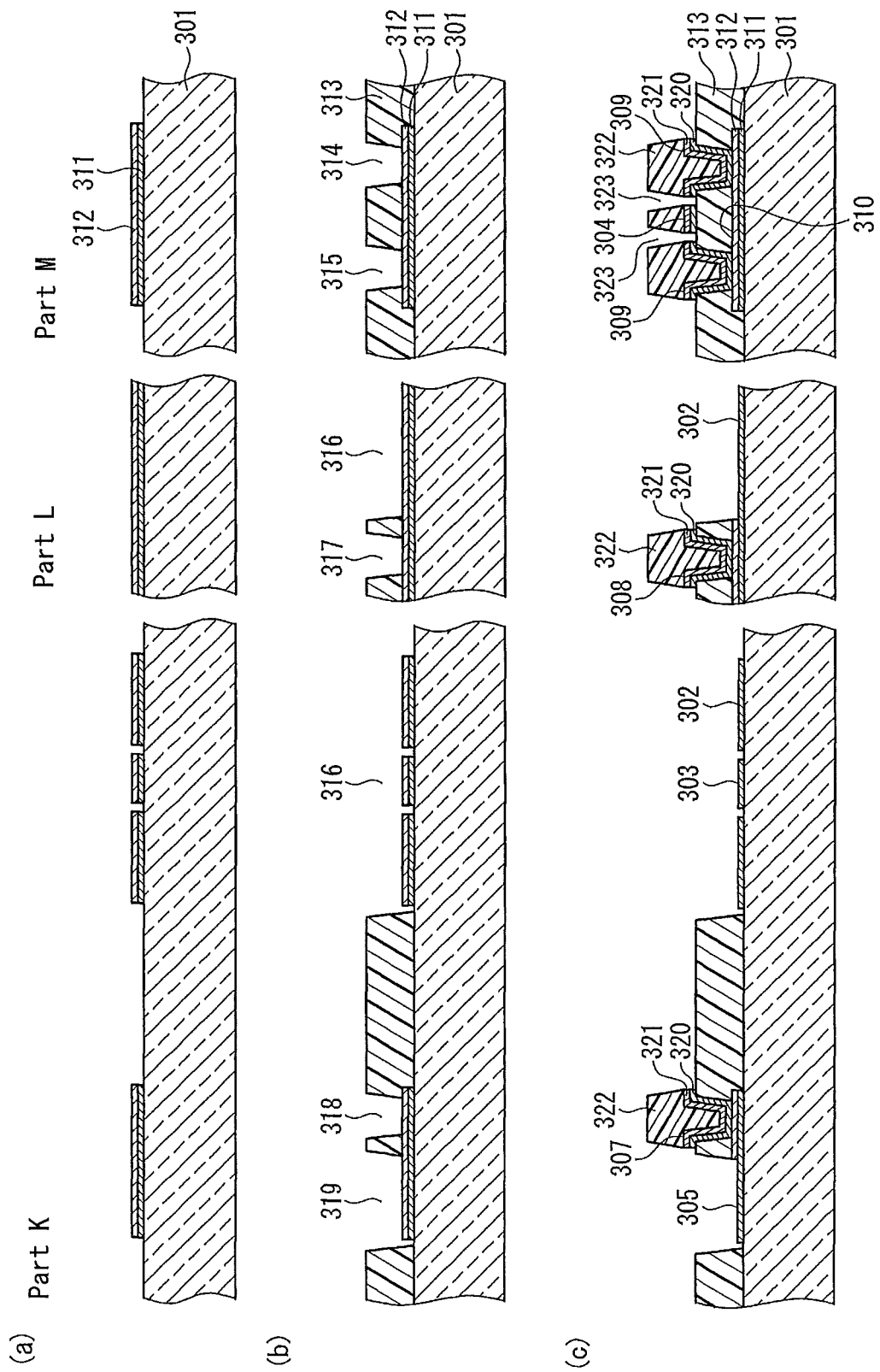
FIG. 23 are cross-sectional views showing steps of a touch panel manufacturing method according to the first modification example of Embodiment 3.

FIG. 23 are cross-sectional views showing exemplary manufacturing steps of a method for manufacturing the touch panel 400 shown in FIG. 22.

Each of FIGS. 23(a), 23(b), and 23(c) shows three illustrations. The illustration on the left side shows a cross section taken along an arrow line K-K' in FIG. 22 showing electrode patterns, that is, a cross section of a part in which the touch electrode 302, the floating electrode 303, the connection terminal 305, and the connection portion 307 for connecting the lead line 304 and the connection terminal 305 with each other, are formed. In the following description, the part having the cross section taken along the arrow line K-K' in FIG. 22 is referred to as a part K.

Further, in each of FIGS. 23(a), 23(b), and 23(c), the illustration in the center shows a cross section taken along an arrow line L-L' in FIG. 22, that is, a cross section of a part where the connection portion 308 for connecting the touch electrode 302 and the lead line 304 is formed. In the following description, the part having the cross section taken along the arrow line L-L' in FIG. 22 is referred to as a part L.

Still further, in each of FIGS. 23(a), 23(b), and 23(c), the illustration on the right side shows a cross section taken along an arrow line M-M' in FIG. 22, that is, a cross section of vicinities of the connection portion 309 for connecting the lead line 304 and the lead line crossing portion 310 that crosses the lead line 304 three-dimensionally. In the following description, the part having the cross section taken along the arrow line M-M' in FIG. 22 is referred to as a part M.

In the manufacturing method for manufacturing the touch panel 400 according to the first modification example of the present embodiment, a transparent conductive film layer 311 made of ITO or the like, and a Mo layer 312 as a metal layer are laminated sequentially by sputtering on an entire surface of the glass substrate 301 as a transparent substrate. Then, as shown in FIG. 23(a), the laminate of the transparent conductive film layer 311 and the metal layer 312 is patterned into a touched position detection region where the touch electrodes 302 and the floating electrodes 303 are to be formed, portions where the connection terminals 305 are to be formed, and the connection portions 308 for connecting the lead electrodes 304 as the rerouting lines and the touch electrodes 302. Further, the laminate of the transparent conductive film layer 311 and the metal layer 312 are patterned also into the connection portions 307 for connecting the lead electrodes 304 and the connection terminals 305, the lead line crossing portions 310, and the connection portions 309 for connecting the lead electrodes 304 and the lead line crossing portions 310.

Thereafter, a resist film 313 as a protective film is formed on the Mo layer 312. In this resist film 313, openings 316 are formed by usual photolithography, in a right-side part of the part K and a right-side part of the part L as viewed in the drawing where the touch electrodes 302 and the floating electrodes 303 are to be formed, as shown in FIG. 23(b). Besides, in the resist film 313, an opening 319 is formed in the part K, at a left-side position therein as viewed in the drawing where the connection terminal 305 is to be formed, and an opening 318 is formed in the part K, at a center position therein as viewed in the drawing where the connection portion 307 for connecting the lead line 304 and the connection terminal 305 is formed. Further, in the resist film 313, an opening 317 is formed in the part L, at a left-side position as viewed in the drawing where the connection portion 308 for connecting the touch electrode 302 and the lead line 304 is formed, and two openings 314 and 315 are formed in the part M where the connection portion 309 for connecting the lead line 304 and the lead line crossing portion 310 is provided.

Next, as a metal for forming the lead line 304 as a rerouting line, for example, an aluminum layer 320 and a MoN layer 321 are laminated by sputtering. Then, a resist film 322 is caused to remain at positions where the lead line 304, the connection portion 307, the connection portion 308, and the connection portion 309 are to be formed.

Thereafter, using this resist pattern as a mask, the MoN layer 321, the aluminum layer 320, and the Mo layer 312 as a metal layer laminated on the transparent conductive film layer 311 are etched with an acid-mixed liquid of phosphoric acid, acetic acid, and nitric acid. This causes the transparent conductive film layers 311 that form the touch electrode 302, the floating electrode 303, and the connection terminal 305 to be exposed. As shown in FIG. 23(c), in the part L, a predetermined distance between the lead line 304 and the connection portion 309 is surely provided by a space 323 provided in the resist film 322, so that the lead line 304 and the lead line crossing portion 310 should not be in contact with each other and become conductive, in a portion where they cross three-dimensionally.

Here, the resist film 322 remaining on the lead lines 304 and the connection portions 307, 308, and 309 functions as an oxidation prevention film covering the surfaces of the lead lines 304 and the connection portions 307, 308, and 309, and therefore, it is not removed but is left.

By the manufacturing method of the first modification example, the touch panel 400 having the lead lines 304 that are formed with a metal layer providing a low resistance and that are formed as rerouting lines in a different layer than a layer where the touch electrodes 302 and the connection terminals 305 are formed can be manufactured with three masks in total. More specifically, in order to manufacture the touch panel 400, a first exposure mask is needed for patterning the transparent conductive film 311 and the metal layer 312. Further, a second exposure mask is needed for forming the openings 314, 315, 316, 317, 318, and 319 in the resist film 313. Still further, a third exposure mask is needed for patterning the resist film 322 necessary for forming the lead lines 304 as rerouting lines.

Thus, the touch panel 400 having the lead line 304 having a low resistance can be manufactured with a smaller number of masks. Therefore, the mask manufacturing cost can be reduced, and the manufacturing accuracy can be improved by decreasing the times of mask alignment.

Next, an application example of the manufacturing method of the first modification example is explained.

Figure 24:
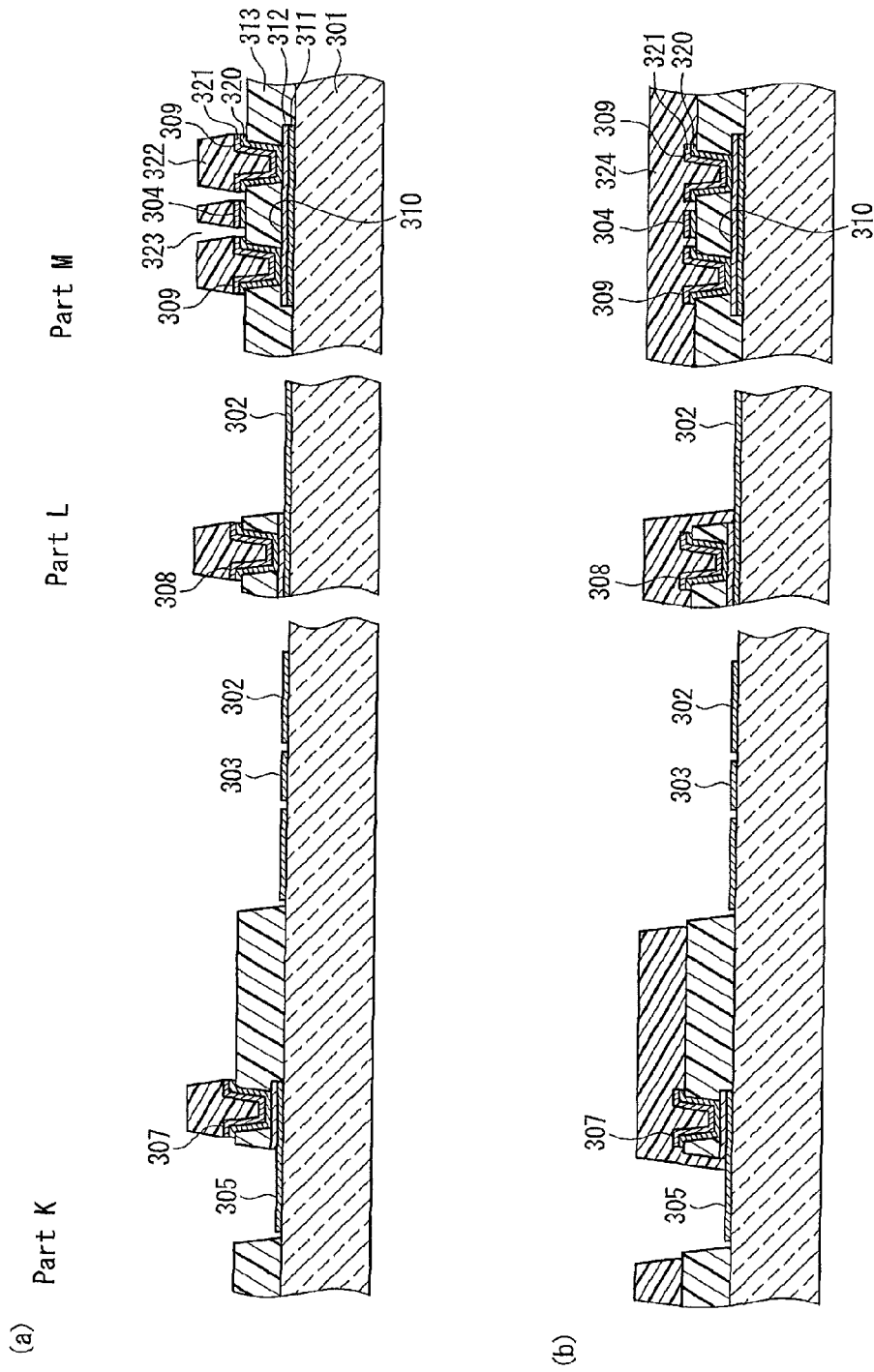
FIG. 24 are cross-sectional views showing steps of a touch panel manufacturing method according to an application example of the first modification example of Embodiment 3.

FIG. 24 are cross-sectional views showing an application example of the manufacturing method of the first modification example. It should be noted that, regarding the three illustrations in each of FIGS. 24(a) and 24(b), as is the case with FIG. 23, the illustration on the left side shows the part K as a part having a cross section taken along the arrow line K-K in FIG. 22, the illustration in the center shows the part L as a part having a cross section taken along the arrow line L-L' in FIG. 22, and the illustration on the right side shows the part M as a part having a cross section taken along the arrow line M-M' in FIG. 22.

In the application example of the manufacturing method of the first modification, the transparent conductive film layer 311 made of ITO or the like and the Mo layer 312 as a metal layer are laminated sequentially by sputtering over an entire surface of the glass substrate 301 as a transparent substrate, and are patterned. Then, the openings 314, 315, 316, 317, 318, and 319 are formed by photolithography in the resist film 313 formed over the entire surface. The process up to this stage is identical to that of the manufacturing method of the first modification example, which is explained with reference to FIG. 23.

Thereafter, in the present application example, the resist film 313 is cured by, for example, annealing at a temperature of 220° C. for 50 minutes.

Next, the aluminum layer 320 and the MoN layer 321 are laminated as metal layers that form the lead line 304 as a rerouting line, and thereafter, the aluminum layer 320 and the MoN layer 321 are etched by using the resist film 322 that is patterned. This state after etching is shown in FIG. 24(a). This configuration shown in FIG. 24(a) is identical to the configuration shown in FIG. 23(c) in terms of the appearance, but is different from the configuration shown in FIG. 23(c) in the point that the resist film 313 thus formed is annealed.

Subsequently, the resist film 322 on the lead line 304 and the connection portions 307, 308, and 309 is removed with a removing solution. Here, the resist film 313 annealed is not removed since it is cured.

Finally, after the resist film 324 as a surface protective film is applied, the resist film 324 is caused to remain in the part K and the part L except for areas where the touch electrode 302 and the floating electrode 303 are formed, and in the part K except for areas where the connection terminal 305 is formed.

Thus, in the application example of the first modification example, the touch panel 400 covered with the resist film 324 as a surface protective film having a uniform thickness except for the touched position detection region and the areas where the connection terminals 305 are formed can be manufactured with use of four masks in total. More specifically, a first exposure mask is needed for patterning the laminate of the transparent conductive film 311 and the metal layer 312, and a second exposure mask is needed for forming the openings 314, 315, 316, 317, 318, and 319 in the resist film 313. Further, a third exposure mask is needed for patterning the resist film 322 necessary for forming the lead lines 304 as the rerouting lines and the connection portions 307, 308, and 309, and a fourth exposure mask is needed for patterning the resist film 324 as a surface protective layer covering the surface of the touch panel.

Particularly, with the present application example, in the connection portion 307 for connecting the connection terminal 305 and the lead line 304 with each other, shown in the left-side part in the part K in FIG. 24(*b*), side edge surfaces of the metal layers 320 and 321 forming the metal layer 312 and the rerouting line can be covered with the resist film 324 as a surface protective film. Likewise, in the connection portion 308 for connecting the touch electrode 302 and the lead line 304 shown on the right side to the part L, and in the connection portion 309 for connecting the lead line 304 and the lead line crossing portion 310 in the part M, side edge surfaces of the metal layers 312, 320, and 321 can be covered with the resist film 324. With this, an inconvenience such as oxidation of the metal layers 312, 320 and 321 exposed to air can be avoided.

Next, a touch panel manufacturing method of a second modification example of the present embodiment is explained. In this second modification example, the touch panel has such a structure that lead lines are allowed to cross three-dimensionally by rerouting lines, and that side faces of the lead lines are not etched.

Figure 25:
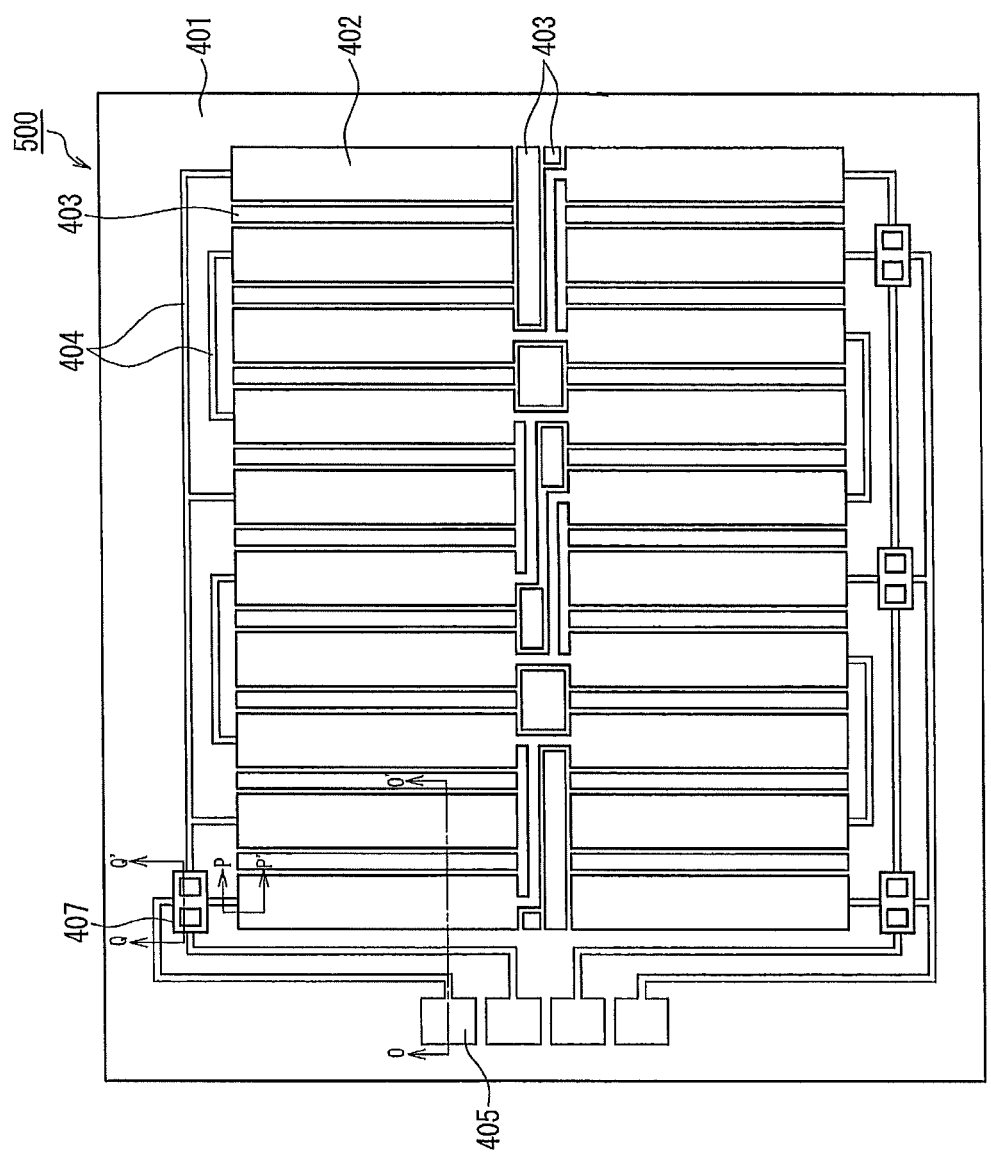
FIG. 25 is a plan view showing electrode patterns of a touch panel that is manufactured by a touch panel manufacturing method according to a second modification example of Embodiment 3, and in which lead lines are partially rerouting lines.

FIG. 25 is a plan view showing electrode patterns of a touch panel 500 manufactured by the manufacturing method of the second modification example.

The touch panel 500 has touch electrodes 402 obtained by forming a transparent conductive film layer made of ITO as two-dimensional patterns on a glass substrate 401 as an insulative transparent substrate. Further, in the touch panel 500, connection terminals 405 for outputting a touched position signal detected by the touch electrodes 402 to outside of the touch panel 500 are formed at an end part of the glass substrate 401. The lead lines 404 for connecting the touch electrodes 402 and the connection terminals 405 are formed in a peripheral area of the touch panel 500. Further, the lead lines 404, in certain parts thereof, cross the rerouting lines 407 formed in a different layer than the layer where the other parts of the lead lines 404 are formed. The lead lines 404 and the rerouting lines 407 are electrically connected with each other at connection portions in through holes formed in a protective film that functions as an insulative layer for separating the other parts of the lead lines 404 and the rerouting lines 407 from each other.

It should be noted that the touch panel 500 is identical to the touch panel 300 shown in FIG. 19 regarding the arrangement pattern of the touch electrodes 402, the point that floating electrodes 403 are arranged between the touch electrodes 402, and the like. Therefore, detailed explanation is omitted.

Figure 26:
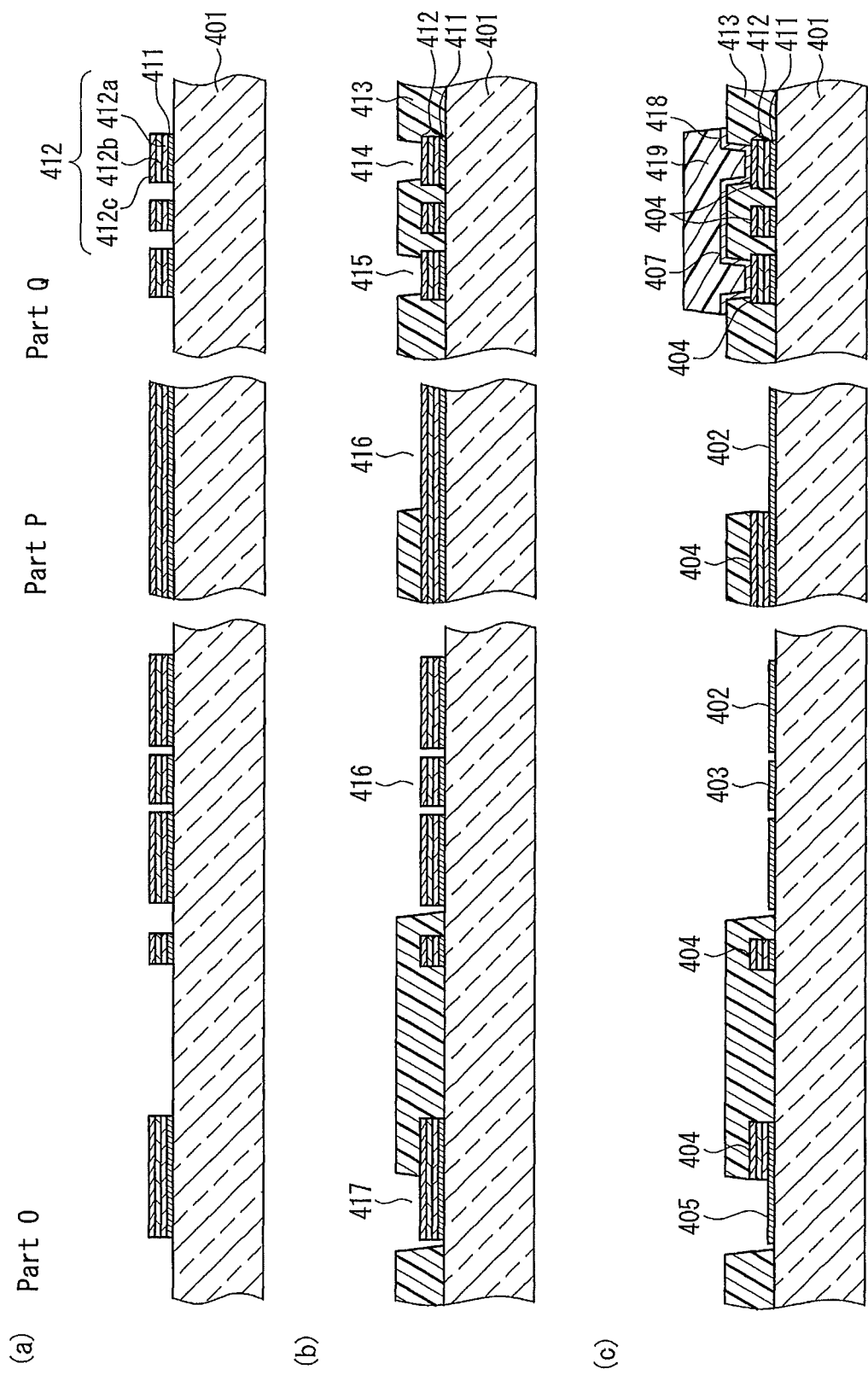
FIG. 26 are cross-sectional views showing steps of a touch panel manufacturing method according to the second modification example of Embodiment 3.

FIG. 26 are cross-sectional views showing exemplary manufacturing steps of a method for manufacturing the touch panel 500 shown in FIG. 25.

Each of FIGS. 26(*a*), 26(*b*), and 26(*c*) shows three illustrations. The illustration on the left side shows a cross-sectional configuration taken along an arrow line O-O' in FIG. 25 showing electrode patterns, that is, a configuration of a part in which the touch electrode 402, the floating electrode 403, the lead line 404, and the connection portion for connecting the lead line 404 and the connection terminal 405 with each other. In the following description, the part having the cross section taken along the arrow line O-O' in FIG. 25 is referred to as a part O.

Further, in each of FIGS. 26(*a*), 26(*b*), and 26(*c*), the illustration in the center shows a cross-sectional configuration taken along an arrow line P-P' in FIG. 25 showing the electrode patterns, that is, a configuration of a part where the connection portion for connecting the touch electrode 402 and the lead line 404 is formed. In the following description, the part having the cross section taken along the arrow line P-P' in FIG. 25 is referred to as a part P.

Still further, in each of FIGS. 26(*a*), 26(*b*), and 26(*c*), the illustration on the right side shows a cross-sectional configuration taken along an arrow line Q-Q' in FIG. 25 showing the electrode patterns, that is, a configuration of a part where the lead lines 404 cross each other via the rerouting line 407 three-dimensionally. In the following description, the part having the cross section taken along the arrow line Q-Q' in FIG. 25 is referred to as a part Q.

In the application example of the manufacturing method of the second modification for manufacturing the touch panel 500, a transparent conductive film layer 411 made of ITO or the like and a metal layer 412 composed of a MoN layer 412*a*, an aluminum layer 412*b*, and a MoN layer 412*c* are laminated sequentially by sputtering over an entire surface of a glass substrate 401 as a transparent substrate.

Subsequently, a resist film (not shown) is formed so as to cover the MoN layer 412*c* as an uppermost layer of the metal layer 412, and patterns of the touch electrodes 402, the floating electrodes 403, the lead lines 404, the connection terminals 405, and the like are formed by predetermined photolithography. Thereafter, using the resist film as a mask, the laminate of the transparent conductive film layer 411 and the metal layer 412 is patterned into a predetermined shape shown in FIG. 26(*a*), with an acid-mixed liquid of phosphoric acid, acetic acid, and nitric acid.

Thereafter, a resist film 413 as a protective film is formed on the MoN layer 412*c*. In this resist film 413, an opening 416 is formed by usual photolithography in a portion thereof where the touch electrodes 402 and the floating electrodes 403 are to be formed, as shown in the right-side part of the part O and the right-side part of the part P as viewed in FIG. 26(*b*). Further, in the resist film 413, an opening 417 is formed in a portion thereof where the connection terminal is to be formed, i.e., in the left-side part of the part O as viewed in the drawing, and an opening 414 is formed in a portion thereof where the lead line 404 and the rerouting line 407 are to be connected with each other, i.e., the part Q, by photolithography.

Here, in the method for manufacturing the touch panel 500 according to this second modification example, as shown in FIG. 26(*b*), each of the openings 414 and 415 formed in a portion in the part Q where the rerouting line is formed has a size smaller than the size of the laminate of the transparent conductive film layer 411 and the metal layer 412, so that side faces of the laminate of the transparent conductive film layer 411 and the metal layer 412 that is to be the lead line 404 should not be exposed.

Next, as a metal layer for forming the rerouting line 407, for example, a metal layer 418 formed with a Mo layer or the like is formed by sputtering. Then, after a resist film 419 is caused to remain on a portion where the rerouting line 407 is to be formed, the MoN layer 418 to become the rerouting line 407 is patterned with an acid-mixed liquid of phosphoric acid, acetic acid, and nitric acid with use of the patterned resist films 413 and 419 as a mask. At the same time, the metal layer 412 remaining on the transparent conductive film layer 411 on portions where the touch electrode 402, the floating electrode 403, and the connection terminal 405 are to be formed is etched, whereby the transparent conductive film layer 411 that forms the touch electrode 402, the floating electrode 403, and the connection terminal 405 is exposed.

Here, the patterned resist film 419 remaining on the rerouting line 407 functions as a protective film covering the surface of the rerouting line 407. Therefore, the resist film 419 is not removed but is left. Thus, the configuration as shown in FIG. 26(c) is obtained.

In the manufacturing method of the second modification example, as described above, side surfaces of the lead line 404 are not exposed when the rerouting line 407 is formed. Therefore, it is possible to prevent the aluminum layer 412b forming the lead line 404 from being corroded upon etching for forming the openings 415 and 414. This makes it possible to prevent the resistance from increasing due to corrosion of the aluminum layer 412 having a low resistance upon etching.

By the manufacturing method of the second modification example described above, the touch panel 500 having the lead lines 404 formed by laminating the metal layer 412 having a low resistance, and the rerouting lines 407 for allowing the lead lines 404 to cross three-dimensionally can be manufactured with three masks in total. More specifically, in the above-described method for manufacturing the touch panel 500, a first exposure mask is needed for patterning the transparent conductive film layer 411 and the metal layer 412. Further, a second exposure mask is needed for forming the openings 414, 415, 416, and 417 in the resist film 413. Still further, a third exposure mask is needed for patterning the resist film 419 for forming the rerouting lines 407, and removing the metal layer 412 remaining on the transparent conductive film layer 411 such as the touch electrodes 402.

Thus, the touch panel 500 having the lead lines 404 having a low resistance can be manufactured with a fewer masks. This makes it possible to decrease the mask manufacturing cost, and to improve the manufacturing accuracy owing to a decrease in the number of times of mask alignment.

In the manufacturing method according to the second modification example of the present embodiment, the rerouting lines 407 are formed with a Mo layer. However, since the rerouting lines are etched together with the metal layer 412 remaining on the transparent insulative film 411 in the etching step for forming the rerouting lines, the rerouting lines may have the same configuration as that of the metal layer 412, that is, the three-layer configuration composed of a MoN layer, an aluminum layer, and a MoN layer.

Next, an application example of the manufacturing method of the second modification example is explained.

Figure 27:
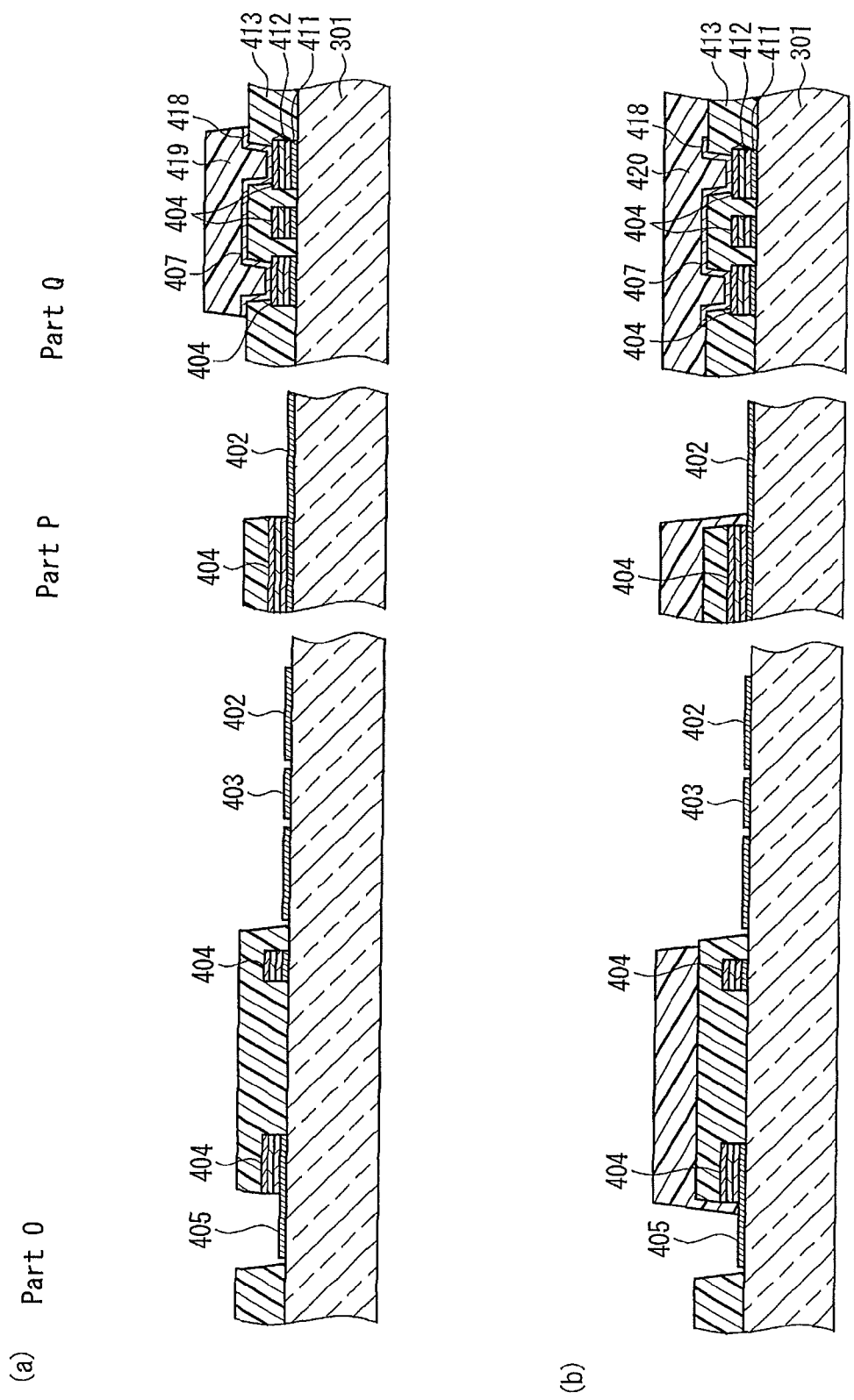
FIG. 27 are cross-sectional views showing steps of a touch panel manufacturing method according to an application example of the second modification example of Embodiment 3.

FIG. 27 are cross-sectional views showing the application example of the manufacturing method of the second modification example. It should be noted that regarding the three illustrations in each of FIGS. 27(a) and 27(b), as is the case with FIG. 26, the illustration on the left side shows the part O as a part having a cross section taken along the arrow line O-O' in FIG. 25, the illustration in the center shows the part P as a part having a cross section taken along the arrow line P-P' in FIG. 25, and the illustration on the right side shows the part Q as a part having a cross section taken along the arrow line Q-Q' in FIG. 25.

In the application example of the manufacturing method of the second modification example, a transparent conductive film layer 411 made of ITO or the like, and a three-layer metal layer 412 composed of a MoN layer 412a, an aluminum layer 412b, and a MoN layer 412c are laminated sequentially on an entire surface of the glass substrate 401 as a transparent substrate, and thereafter, they are patterned in a predetermined two-dimensional form. Then, four openings 414, 415, 416, and 417 are formed by photolithography in the resist film 413 formed as a protective film over the entire surface. The process up to this state is identical to that of the manufacturing method of the second modification example explained with reference to FIG. 26.

Thereafter, in the present example, the resist film 413 is cured by, for example, annealing at a temperature of 220° C. for 50 minutes.

Next, after the Mo layer 418 is formed as a metal layer for forming the rerouting line 407, etching is carried out with use of the patterned resist film 419. Here, at the same time, the metal layer 412 on portions of the transparent conductive film layer 411 that forms the touch electrode 402, the floating electrode 403, and the connection terminal 405 is removed by etching. The configuration obtained through these steps is shown in FIG. 27(a). The configuration shown in FIG. 27(a) is identical to the configuration shown in FIG. 26(c) in terms of the appearance, but is different from the configuration shown in FIG. 26(c) in the point that the resist film 413 thus formed is annealed.

Subsequently, the resist film 419 on the rerouting line 407 is removed with a removing solution. Here, the resist film 413 annealed is not removed since it is cured.

Finally, after the resist film 420 as a surface protective film is applied, the resist film 420 is caused to remain in the part O and the part P except for areas where the portions where the touch electrodes 402 and the floating electrodes 403 are formed, and in the part O except for an area where the portion where the connection terminal 405 is formed.

Therefore, in the application example of the second modification example, the touch panel 500 covered with the protective film 420 having a uniform thickness, except for the touched position detection region and areas where the connection terminals 405 are formed, can be manufactured with use of four masks in total. More specifically, in the above-described manufacturing method, a first exposure mask is needed for patterning the laminate of the transparent conductive film layer 411 and the metal layer 412, and a second exposure mask is needed for forming the openings 414, 415, 416, and 417 in the resist layer 413. Still further, a third mask is needed for patterning the resist film 419 for forming the rerouting lines 407, and exposing the transparent conductive film layer 411, and a fourth exposure mask is needed for patterning the resist film 420 that functions as a protective film covering the surface of the touch panel.

Particularly, according to the present application example, in the connection portion for connecting the connection terminal 405 and the lead electrode 404 and the connection portion for connecting the touch electrode 402 and the lead electrode 404, as shown in the left-side part of the part O and in the right-side part in the part P in FIG. 27(b), side edge surfaces of the metal layer 412 can be covered with the resist film 420 as a protective film. With this, an inconvenience such as oxidation of the metal layer 412 exposed to air can be avoided.

It should be noted that the film thicknesses of the respective layers mentioned as examples in the description of the touch panel manufacturing method of the present embodiment are basically identical to those in Embodiment 1 described above. Therefore, detailed explanation is omitted herein.

Film thicknesses of the members not included in Embodiment 1 are as follows, for example; the film thickness of the Mo film for forming the rerouting lines 207 and 407 and the lead lines 304 is, for example, 100 nm; the film thickness of the resist films 218, 322, and 419 that are caused to remain as protective films over the rerouting lines 207 and the lead lines 304 and 407 is, for example, 1.6 nm; and the film thickness of the resist films 219, 324, and 420 as surface protective films covering the entire surface of the touch panel, which are used in the application examples, is 1.6 nm, for example.

[Another Configuration]

Regarding the method for manufacturing a touch panel having rerouting lines, i.e., a touch panel in which lead lines are at least partially formed in another layer, modification examples and application examples of Embodiment 3 of the present invention have been so far explained with reference to drawings.

Here, regarding the method for manufacturing a touch panel having rerouting lines, which has been explained as Embodiment 3, another configuration that enables the manufacture with a fewer exposure masks is mentioned herein, though the configuration is not an embodiment of the present invention.

The touch panel manufacturing method explained as another configuration is a method for manufacturing a touch panel in which lead lines cross with use of rerouting lines, and the rerouting lines are formed with, not metal films, but transparent conductive films made of ITO or the like.

Figure 28:
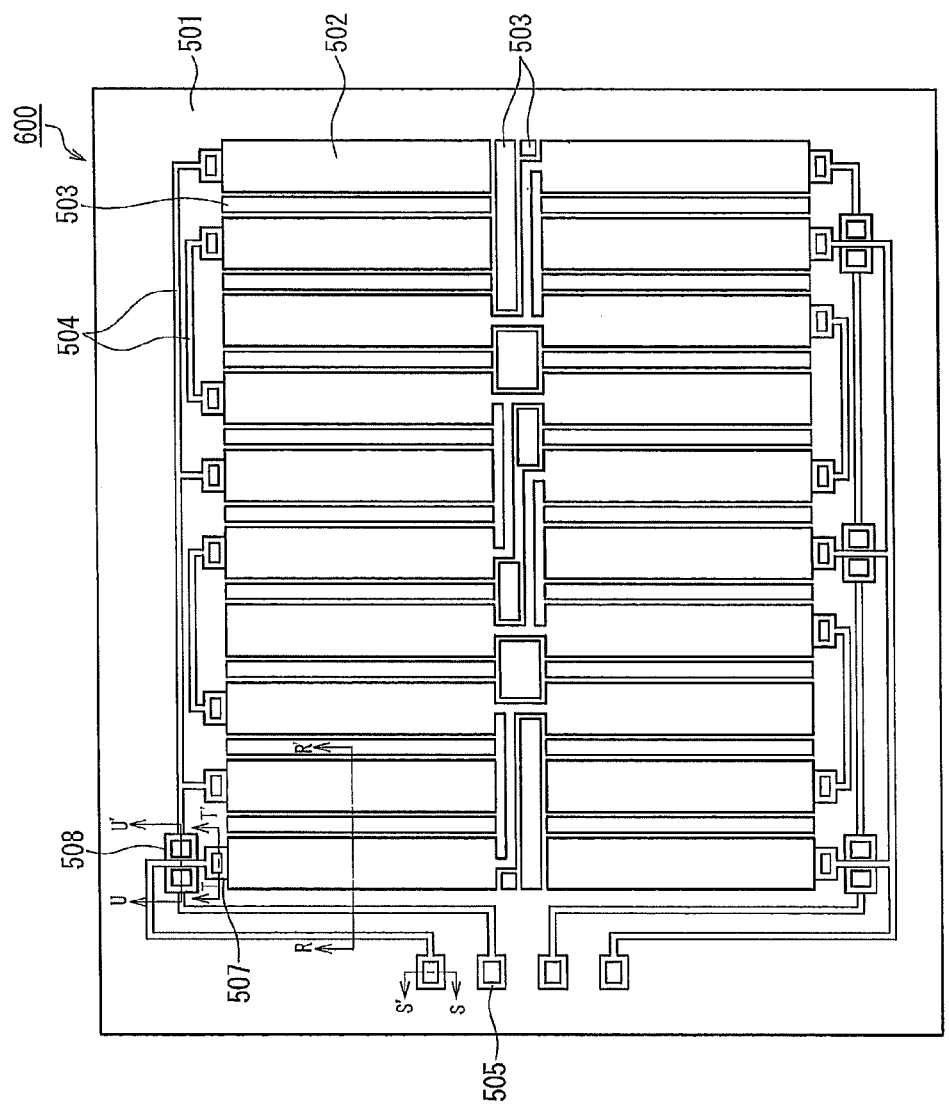
FIG. 28 is a plan view showing electrode patterns of a touch panel that is manufactured by a touch panel manufacturing method according to another embodiment, and in which lead lines are partially rerouting lines.

FIG. 28 is a plan view showing electrode patterns of a touch panel 600 manufactured by the touch panel manufacturing method of the another configuration.

The touch panel 600 has touch electrodes 502 obtained by forming a transparent conductive film made of ITO into two-dimensional patterns on a glass substrate 501 as an insulative transparent substrate. In the touch panel 600, further, connection terminals 505 for outputting a touched position signal detected by the touch electrodes 502 to outside of the touch panel 600 are formed at an end part of the glass substrate 501. The lead lines 504 for connecting the touch electrodes 502 and the connection terminals 505 are formed in a peripheral area of the touch panel 600. The lead lines 504, in certain parts thereof, cross one another three-dimensionally via the rerouting lines 508 formed in a different layer than the layer where the other parts of the lead lines 504 are formed. The lead lines 504 and the rerouting lines 508 are electrically connected via connection portions in through holes formed in a protective film that separates the other portions of the lead lines 504 and the rerouting line 508 from each other.

Further, in the touch panel 600 shown herein regarding the present configuration, the touch electrodes 502 and the floating electrodes 503 formed between the touch electrodes are formed, not directly on the glass substrate 501, but in the same layer where the rerouting lines 508 are formed. Therefore, the touch electrodes 502 and the lead lines 504 are electrically conductive to each other via the connection portions 507 passing through the protective film.

It should be noted that the touch panel 600 shown in FIG. 28 is identical to the touch panel 300 shown in FIG. 19 regarding the arrangement pattern of the touch electrodes 502, the point that the floating electrodes 503 are arranged between the touch electrodes 502, and the like. Therefore, detailed explanation is omitted.

Figure 29:
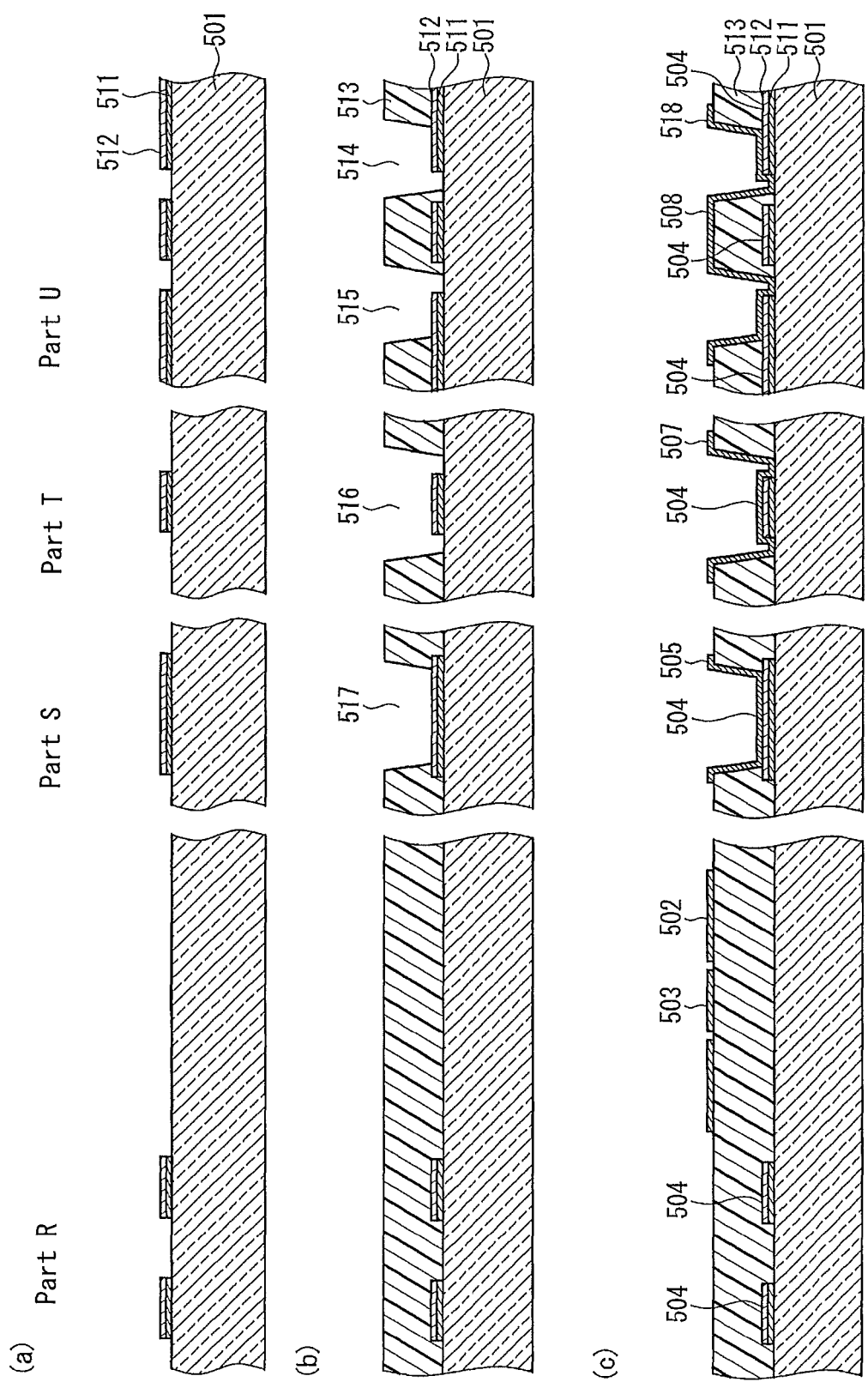
FIG. 29 are cross-sectional views showing steps of a touch panel manufacturing method according to another embodiment.

FIG. 29 are cross-sectional views showing exemplary steps of a method for manufacturing the touch panel 600 shown in FIG. 28.

Each of FIGS. 29(a), 29(b), and 29(c) shows four illustrations. The illustration on the left end shows a cross-sectional configuration taken along an arrow line R-R' in FIG. 28 showing electrode patterns, that is, a configuration of a part in which the touch electrode 502, the floating electrode 503, and the lead line 504 are formed. In the following description, the part having the cross section taken along the arrow line R-R' in FIG. 28 is referred to as a part R.

Further, in each of FIGS. 29(a), 29(b), and 29(c), the second illustration from the left side shows a cross-sectional configuration taken along an arrow line S-S' in FIG. 28, that is, a configuration of a part where the connection terminal 505 is formed. In the following description, the part having the cross section taken along the arrow line S-S' in FIG. 28 is referred to as a part S.

Still further, in each of FIGS. 29(a), 29(b), and 29(c), the third illustration from the left side shows a cross-sectional configuration taken along an arrow line T-T' in FIG. 28, that is, a configuration of a part where the connection portion for connecting the touch electrode 502 and the lead line 504 is formed. In the following description, the part having the cross section taken along the arrow line T-T' in FIG. 28 is referred to as a part T.

Still further, in each of FIGS. 29(a), 29(b), and 29(c), the illustration on the right end shows a cross-sectional configuration taken along an arrow line U-U' in FIG. 28, that is, a configuration of a part where the lead lines 504 cross one another three-dimensionally via the rerouting lines. In the following description, the part having the cross section taken along the arrow line U-U' in FIG. 28 is referred to as a part U.

In the method for manufacturing the touch panel 600 as the another configuration, first, an aluminum film 511 and a MoN film 512 as metal layers are laminated by sputtering or the like over an entire surface of the glass substrate 501 as a transparent substrate.

Subsequently, a resist film (not shown) is formed so as to cover the MoN film 512, and the resist film is patterned by usual photolithography so as to remain on portions in the parts R, T, and U where the lead line 504 is to be formed, on a portion in the part U where the connection portion for connecting the rerouting line 508 and the lead line 504 is to be formed, and on a portion in the part S where the connection terminal 505 is to be formed. Then, using this resist film, the metal layers 511 and 512 are etched, so as to have a predetermined shaped pattern shown in FIG. 29(a).

Thereafter, a resist film 513 as a protective film is formed on the MoN layer 512. In this resist film 513, an opening 517 is formed by usual photolithography in the part S, so that the connection terminal 505 is to be formed therein, as shown in FIG. 29(b). Further, in the resist film 513, by photolithography, an opening 516 is formed in the part T, so that the connection portion 507 for connecting the touch electrode 502 and the lead electrode 504 is to be formed therein, and openings 514 and 515 are formed in the part U so that connection portions for connecting the rerouting line 508 and the lead electrode 504 are to be formed therein.

Thereafter, for example, annealing at a temperature of 220° C. for 50 minutes is carried out, whereby the resist film 513 is cured.

Subsequently, a transparent conductive film layer 518 made of ITO or the like is formed over an entire surface of the glass substrate 501. A resist film (not shown) is formed, and by usual photolithography, the resist film is patterned so as to remain on portions where the touch electrodes 502 are to be formed, portions where the floating electrodes 503 are to be formed, portions where the connection terminals 505 are formed, portions where the connection portions 507 for connecting the touch electrodes 502 and the lead lines 504 are to be formed, and portions where the rerouting electrodes 508 for connecting the lead lines 504 are to be formed. Thereafter, with use of this patterned resist film as a mask, the transparent conductive film layer 518 made of ITO or the like is etched with oxalic acid. Further, the resist film remaining on the transparent conductive film layer 518 is etched. Still further, the resist film remaining on the transparent conductive film layer 518 is removed with a removing solution. Thus, the configuration shown in FIG. 29(*c*) is obtained.

With the another configuration explained so far, the touch panel 600 having the connection terminals 505 obtained by laminating the metal layers 511 and 512 having low resistances and the transparent conductive film layer 518, the connection portions 507, and the rerouting lines 508 for allowing the lead lines 504 to cross three-dimensionally can be manufactured with use of three masks in total. More specifically, in the above-described another configuration, a first exposure mask is needed for patterning the metal layers 511 and 512 that form the lead lines 504. Further, a second exposure mask is needed for forming the openings 514, 515, 516, and 517 in the resist layer 513, and a third exposure mask is needed for patterning the transparent conductive film layer 518 so that the transparent conductive film layer 518 becomes the touch electrodes 402, the protective film 507 for the connection terminals 505, and the rerouting lines 508.

This makes it possible to manufacture, with use of a fewer masks, the touch panel 600 that has the lead lines 504 and the connection terminals 505 formed by laminating the metal layers 511 and 512 having low resistances, and that has the rerouting lines 508 thereby having a higher degree of freedom in pattern designing of the lead lines 504. Therefore, this makes it possible to decrease the touch panel manufacturing costs, and to improve the manufacturing accuracy owing to a decrease in the number of times of mask alignment.

[Embodiment 4]

Next, a method for manufacturing a display device provided with the touch panel formed by the above-described touch panel manufacturing method is explained, with reference to drawings.

Figure 30:
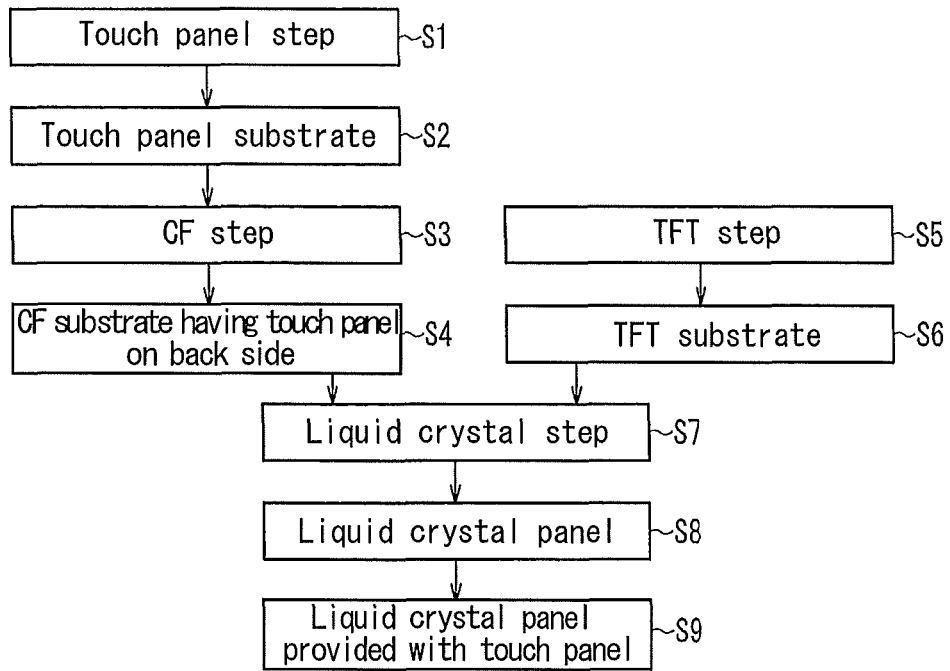
FIG. 30 is a flowchart explaining a first manufacturing method among methods for manufacturing a display device provided with a touch panel according to Embodiment 4.

FIG. 30 is a flowchart showing a first method for manufacturing a liquid crystal display device having a liquid crystal panel as a display panel, as an exemplary method for manufacturing a display device provided with the touch panel manufactured by the above-described touch panel manufacturing method.

As shown in FIG. 30, the first method for manufacturing a liquid crystal display device has a touch panel step for manufacturing a touch panel on a transparent glass substrate, by the above-described touch panel manufacturing method explained as Embodiments 1 to 3 (Step S1).

The glass substrate having touch electrodes and the like formed on one surface thereof through the foregoing touch panel step is treated as a front substrate positioned on a front side as an image-viewed side of the liquid crystal display device (Step S2).

On a surface of the front substrate opposite to the side thereof where the touch electrodes are formed, a color filter layer, a black matrix (BM) layer, a counter electrode, a protective film, an alignment film for directing liquid crystal molecules in a predetermined direction, etc. are formed through a usual color filter forming step (CF step) (Step S3).

Thus, the front substrate is obtained, which is a touch-panel-provided CF substrate having a touch panel formed on one surface and a CF layer formed on the other surface (Step S4).

Subsequently, pixel electrodes, gate lines and source lines for applying voltage signals for image display to the pixel electrodes, and TFTs as switching elements formed in correspondence to the pixel electrodes are formed on a glass substrate through a TFT step as a usual active substrate forming step (Step S5). Besides, in this step, a protective film, an alignment film for aligning liquid crystal molecules, etc. are formed as required.

In this way, a back substrate is obtained as a TFT substrate positioned on a back side of the liquid crystal panel (Step S6).

Subsequently, in a liquid crystal step, a sealing resin is applied in a frame form on a surface of either one of the front substrate and the back substrate, liquid crystal is dropped thereon so as to form a liquid crystal layer, and the substrate and the other substrate are stacked (Step S7).

Thereafter, the sealing resin is cured, whereby a liquid crystal panel is obtained (Step S8).

Two polarization plates are applied to both external surfaces of the obtained liquid crystal panel so as to have different polarization directions, respectively, and a backlight device is disposed on the back side of the liquid crystal panel. Thus, a liquid crystal display device provided with the touch panel is obtained. It should be noted that in the case where liquid crystal display devices provided with the touch panels are manufactured by using a plurality of liquid crystal display panels that are formed continuously on one glass substrate, after the sealing resin is cured and liquid crystal panels are obtained, the liquid crystal panels are separated into a size suitable for the liquid crystal display device provided with the touch panel (Step 9).

Figure 31:
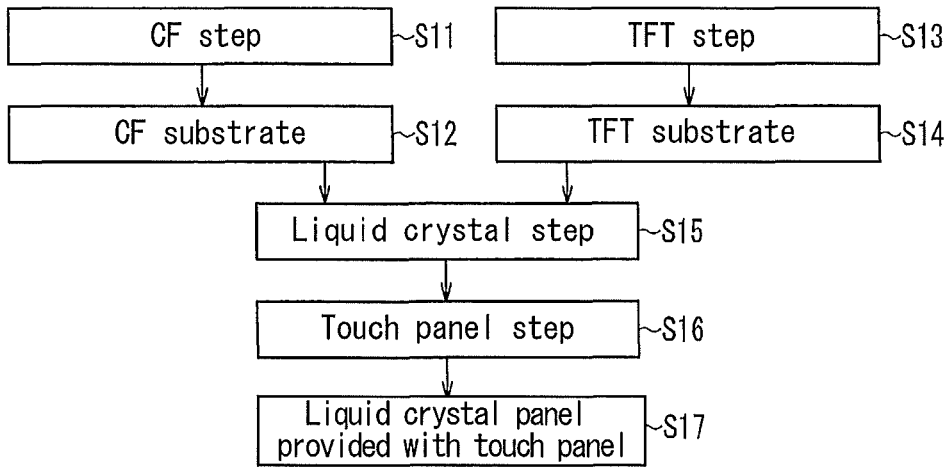
FIG. 31 is a flowchart explaining a second manufacturing method among methods for manufacturing a display device provided with a touch panel according to Embodiment 4.

FIG. 31 is a flowchart showing a second manufacturing method for manufacturing a display device provided with the touch panel manufactured by the above-described touch panel manufacturing method.

As shown in FIG. 31, in the second manufacturing method, first, a color filter layer, a black matrix (BM) layer, a counter electrode, a protective film, an alignment film for directing liquid crystal molecules in a predetermined direction, and the like are formed on one surface of a glass substrate, through a usual color filter forming step (CF step) (Step S11).

Thus, the front substrate is obtained, which is a CF substrate having a CF layer formed on one surface (Step S12).

Subsequently, pixel electrodes, gate lines and source lines for applying voltage signals for image display to the pixel electrodes, and TFTs as switching elements formed in correspondence to the pixel electrodes are formed on another glass substrate through a TFT step as a usual active substrate forming step. Besides, in this step, a protective film, an alignment film for aligning liquid crystal molecules, etc. are formed as required (Step S13).

In this way, a back substrate is obtained as a TFT substrate positioned on a back side of the liquid crystal panel (Step S14).

Subsequently, in the liquid crystal step, a sealing resin is applied in a frame form, on a surface of either one of the front substrate and the back substrate, liquid crystal is dropped thereon so as to form a liquid crystal layer, and the substrate and the other substrate are stacked (Step S15).

Thereafter, the sealing resin is cured, whereby a liquid crystal panel is obtained.

Subsequently, the liquid crystal panel is polished as required so as to be thinned, and then, a touch panel is manufactured on an external surface of the front substrate of the liquid crystal panel, that is, the CF substrate, by the above-described touch panel manufacturing method (Step S16).

Two polarization plates are applied to both external surfaces of the obtained liquid crystal panel so as to have different polarization directions, respectively, and a backlight device is disposed on the back side of the liquid crystal panel. Thus, a liquid crystal display device provided with the touch panel is obtained. It should be noted that in the case where liquid crystal display devices provided with the touch panels are manufactured by using a plurality of liquid crystal display panels that are formed continuously on one glass substrate, liquid crystal panels are separated into a size suitable for the liquid crystal display device provided with the touch panel (Step 17).

Figure 32:
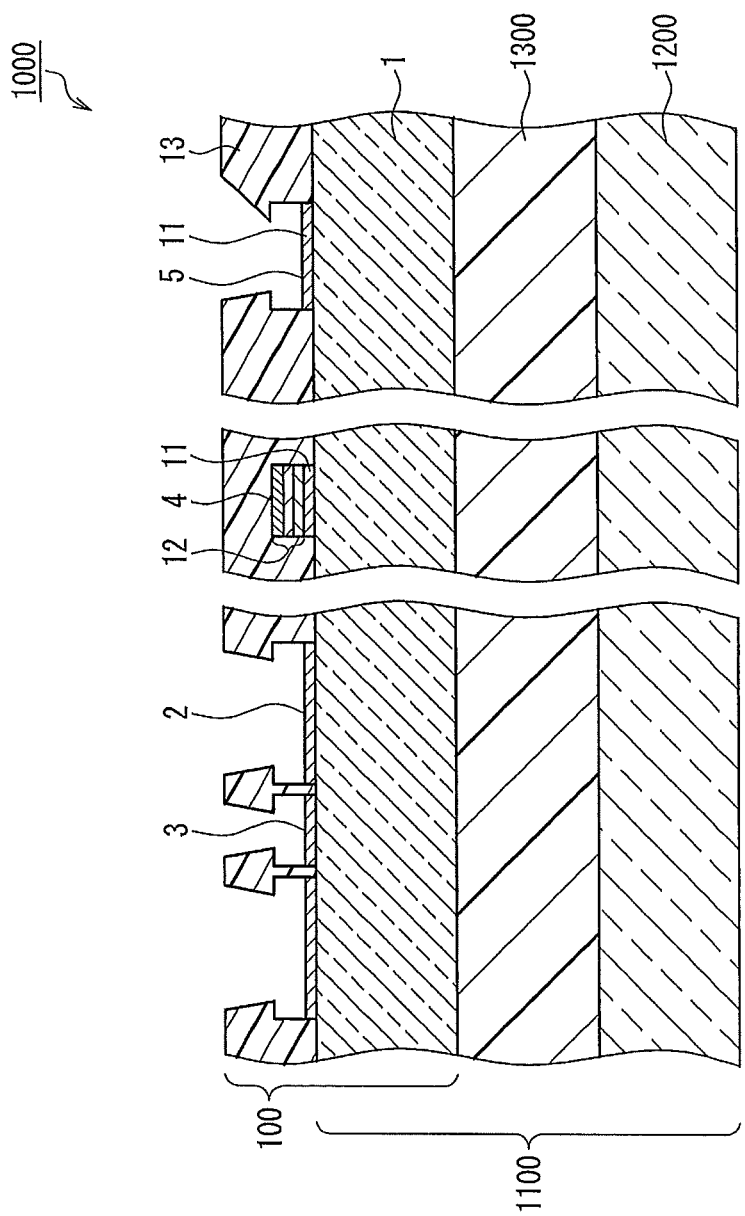
FIG. 32 are cross-sectional views showing a configuration of a liquid crystal display device manufactured by the method for manufacturing a display device provided with a touch panel according to Embodiment 4.

FIG. 32 shows a cross-sectional configuration of a liquid crystal display device obtained by the manufacturing method shown in FIG. 30 or by the manufacturing method shown in FIG. 31. It should be noted that the present embodiment is explained by referring to, as an example, a transmissive liquid crystal display device having the touch panel 100 explained as Embodiment 1 as its front substrate.

As shown in FIG. 32, a touch panel-provided liquid crystal display device 1000 according to the present embodiment includes the touch panel 100 for detecting a position touched from outside, and a liquid crystal panel 1100 as a display panel. The touch panel 100 and the liquid crystal panel 1100 are laminated, and the front substrate as one of substrates composing the liquid crystal panel 1100 doubles as a glass substrate 1 for the touch panel 100.

The liquid crystal panel 1100 is a usual transmissive liquid crystal panel, and a liquid crystal layer 1300 is formed between the front substrate 1 and a back substrate 1200, which are two glass substrates composing the liquid crystal panel 1100.

On an internal surface of the front substrate 1, color filters (not shown) corresponding to respective pixels are formed for color image display. On the internal surface of the front substrate 1, a counter electrode (not shown) for applying a predetermined voltage to the liquid crystal layer 12 is provided.

On an internal surface of the back substrate 1200, pixel electrodes (not shown) are provided in a plurality of row and a plurality of columns, in matrix. In the liquid crystal panel 1100, potentials across these pixel electrodes and the counter electrode of the front substrate 1 are adjusted so that alignment states of liquid crystal molecules in the liquid crystal layer 1300 are changed, whereby image display is carried out. A region in the back substrate 1200 where the pixel electrodes are formed is a display region of the liquid crystal panel 1100. The display region of the liquid crystal panel 1100 substantially coincides with the touched position detection region of the touch panel 100.

In the display region of the back substrate 1200, there are provided a plurality of gate line arranged in the row direction of the pixel electrodes and a plurality of source lines arranged in the column direction of the same, both of which are not shown, as well as TFTs that are arranged in the vicinities of intersections of the gate lines and source lines orthogonally crossing and are connected to the pixel electrodes. By applying a voltage to the gate lines sequentially, the TFTs as switching elements are turned on row by row, thereby being selected, and voltages necessary for image display are applied to the pixel electrodes belonging to the selected row, via the source lines, respectively.

A pair of polarization plates (not shown) that, combined with the liquid crystal layer 1300, control transmitted light so as to carry out image display, are arranged on an upper side of the touch panel 100 as viewed in FIG. 32 and on a lower side of the back substrate 1200 of the liquid crystal panel 1100 as viewed in the drawing, respectively, in a state in which polarization angles thereof are made different by a predetermined degree from each other. Further, on the internal surfaces of the front substrate 1 and the back substrate 1200 of the liquid crystal panel 1100, facing the liquid crystal layer 1300, insulative films are formed so as to cover the electrodes and the switching elements described above, and alignment films for determining alignment directions of liquid crystal molecules are formed on surfaces of the insulative films. The configurations of the insulative films and the alignment films are usual ones for the liquid crystal panel, and therefore, illustration and detailed explanation of the same are omitted.

Further, on the back face of the liquid crystal panel 1100, a backlight (not shown) is disposed that projects illumination light necessary for allowing the liquid crystal panel 1100 to display images. As the backlight of the touch-panel-equipped liquid crystal display device 100 of the present embodiment, for example, a backlight of a type referred to as "side light type" or "edge light type" can be used that includes a flat light guide, and a light source provided on a side face of the light guide, such as a cold cathode ray tube, a light emitting diode, or the like. Alternatively, a backlight of the so-called direct type having the following configuration may be used: a light source is arranged two-dimensionally on a back face of the liquid crystal panel 1100 so as to project light toward the liquid crystal panel 1100, and the illumination light is projected from the light source to the liquid crystal panel via an optical sheet such as a light condensing sheet or a diffusion sheet. The light source for the backlight is not limited to a cold cathode ray tube or a light emitting diode, but any of various types of light sources, such as a hot cathode ray tube or an EL light emitter, can be used.

The above description explains a case where the front substrate on which the touch panel is formed is a color filter substrate. However, the liquid crystal display device obtained by the above-described manufacturing method is not limited to this configuration, but may have a configuration in which the front substrate on which the touch panel is formed is an active matrix substrate, and the back substrate is a color filter substrate. Alternatively, a liquid crystal panel of the so-called CF-on array type may be used, in which color filters are formed on an active matrix substrate.

Further, the above description explains the so-called active matrix liquid crystal panel as an example regarding the configuration of the liquid crystal panel, but the liquid crystal display device obtained by the above-described manufacturing method is not limited to this. The so-called simple matrix liquid crystal panel may be used. Further, the method for driving the liquid crystal panel is not limited to the so-called vertical alignment mode of applying a voltage across the substrates opposed to each other. Another driving method can be adopted, such as the IPS mode of applying a voltage in a planar direction of the substrates.

Still further, the liquid crystal panel itself is not limited to that having a configuration called a "transmission" type or a "reflection-transmission" type that uses illumination light from a backlight for image display. The so-called reflection-type liquid crystal panel may be used that causes external light incident through the front substrate 1 to be reflected by a reflection electrode formed on the back substrate and uses the light for image display. In this case, the backlight and the polarization plate arranged on an outer side of the back substrate (a lower side as viewed in FIG. 32) are unnecessary.

The above description explains an exemplary liquid crystal display device in which a liquid crystal panel is used, as a display device for image display, provided with a touch panel laminated thereon. However, the display device is not limited to a display device provided with a liquid crystal panel as a display panel, but it may be any of various types of flat display panels such as organic and inorganic electroluminescence (EL) panels, plasma display panels (PDP), and field emission displays.

So far, specific embodiments have been explained with reference to drawings, regarding the touch panel manufacturing method, and the touch-panel-equipped display device manufacturing method. However, the touch panel manufacturing method and the touch-panel-equipped display device manufacturing method are not limited to the above-described embodiments.

For example, a touch panel may be laminated on a display panel, and bonded thereto with an adhesive or the like. In other words, the glass substrate of the touch panel and the front substrate of the display panel are separate substrates, respectively.

It should be noted that in the case where the substrate of the touch panel does not double as the front substrate of the display panel such as a liquid crystal panel in this way, the substrate of the touch panel may be, for example, a flexible resin substrate, other than the glass substrate used in the above-described embodiments.

Industrial Applicability

The present invention is industrially applicable as a touch panel manufacturing method, and a method for manufacturing a display device provided with a touch panel.

The invention claimed is:

1. A touch panel manufacturing method comprising:
   sequentially laminating a transparent conductive film layer and a metal layer on an insulative transparent substrate, and thereafter, forming the transparent conductive film layer and the metal layer into a predetermined electrode pattern, using a same resist pattern;
   forming a protective film that covers the transparent conductive film layer and the metal layer, and providing an opening at a predetermined position in the protective film so that the opening passes through the protective film; and
   removing the metal layer by etching with use of the protective film having the opening, so as to expose the transparent conductive film layer, thereby forming at least one of a touch electrode and a connection terminal that outputs a potential of the touch electrode to outside of the touch panel; wherein
   the protective film is formed of an organic resin film,
   the method further comprising:
   exposing the transparent conductive film layer by the etching, and thereafter, partially fusing the protective film so as to smoothen a wall surface of the opening.

2. A touch panel manufacturing method, comprising:
   sequentially laminating a transparent conductive film layer and a metal layer on an insulative transparent substrate, and thereafter, forming the transparent conductive film layer and the metal layer into a predetermined electrode pattern, using a same resist pattern;
   forming a protective film that covers the transparent conductive film layer and the metal layer, and providing an opening at a predetermined position in the protective film so that the opening passes through the protective film; and
   removing the metal layer by etching with use of the protective film having the opening, so as to expose the transparent conductive film layer, thereby forming at least one of a touch electrode and a connection terminal that outputs a potential of the touch electrode to outside of the touch panel;
   sequentially laminating the transparent conductive film layer of a first layer and the metal layer of the first layer on the transparent substrate, and thereafter, forming the transparent conductive film of the first layer and the metal layer of the first layer into a predetermined electrode pattern, using a same resist pattern;
   forming the protective film of the first layer that covers the transparent conductive film layer of the first layer and the metal layer of the first layer;
   sequentially laminating a transparent conductive film layer of a second layer and a metal layer of the second layer on the protective film of the first layer, and thereafter, forming the transparent conductive film layer of the second layer and the metal layer of the second layer into a predetermined electrode pattern, using a same resist pattern;
   forming a protective film of the second layer that covers the transparent conductive film layer of the second layer and the metal layer of the second layer;
   providing the opening of the first layer at the predetermined position in the protective film of the first layer and providing an opening of the second layer at a predetermined position in the protective film of the second layer so that the opening of the first layer passes through the protective film of the first layer and the opening of the second layer passes through the protective film of the second layer; and
   removing the metal layer of the first layer and the metal film of the second layer by etching with use of the protective film of the first layer having the opening of the first layer and the protective film of the second layer having the opening of the second layer, so as to expose the transparent conductive film layer of the first layer and the transparent conductive film layer of the second layer, thereby forming at least one of the touch electrode and the connection terminal.

3. The touch panel manufacturing method according to claim 2,
   wherein the protective film of the first layer and the protective film of the second layer are formed with a same material, and
   the opening of the first layer in the protective film of the first layer is formed at the same time when the opening of the second layer in the protective film of the second layer, by using the resist pattern formed on the protective film of the second layer as a mask.

4. The touch panel manufacturing method according to claim 2,
   wherein the protective film of the first layer is formed with a material different from that of the protective film of the second layer, and
   the opening of the first layer in the protective film of the first layer is formed by using the protective film of the second layer having the opening of the second layer as a mask.

5. The touch panel manufacturing method according to claim 2,
   wherein the protective film of the second layer is formed with an organic resin film,
   the method further comprising:
   exposing the transparent conductive film layer of the first layer and the transparent conductive film layer of the second layer by the etching, and thereafter, partially fusing the protective film of the second layer so as to smoothen wall surfaces of the opening of the first layer and the opening of the second layer.

6. The touch panel manufacturing method according to claim 1,
   between the touch electrode and another touch electrode, a floating electrode that is not conductive to the touch electrodes is provided, and the floating electrode is formed with the transparent conductive film layer, at the same time when the touch electrodes are formed.

7. A method for manufacturing a display device provided with a touch panel, comprising:

forming a display panel by using, as a substrate, the transparent substrate of the touch panel manufactured by the touch panel manufacturing method according to claim 1.

8. A method for manufacturing a display device provided with a touch panel, comprising:

forming a display panel having a front substrate and a back substrate, and thereafter, forming a touch panel by using, as a transparent substrate, the front substrate of the display panel, by the touch panel manufacturing method according to claim 1.

9. The method for manufacturing a display device provided with a touch panel according to claim 7, wherein the display panel is a liquid crystal panel.

10. The method for manufacturing a display device provided with a touch panel according to claim 8, wherein the display panel is a liquid crystal panel.

11. The touch panel manufacturing method according to claim 1, further comprising:

laminating a surface transparent conductive film layer on the metal layer, and thereafter, forming the surface transparent conductive film layer into the predetermined electrode pattern, using the same resist pattern; and modifying a portion of the surface transparent conductive film layer thus formed, the portion being to become the connection terminal, so that the portion should not be removed by the etching.

12. The touch panel manufacturing method according to claim 2, between the touch electrode and another touch electrode, a floating electrode that is not conductive to the touch electrodes is provided, and the floating electrode is formed with the transparent conductive film layer, at the same time when the touch electrodes are formed.

13. A method for manufacturing a display device provided with a touch panel, comprising:

forming a display panel by using, as a substrate, the transparent substrate of the touch panel manufactured by the touch panel manufacturing method according to claim 2.

14. A method for manufacturing a display device provided with a touch panel, comprising:

forming a display panel having a front substrate and a back substrate, and thereafter, forming a touch panel by using, as a transparent substrate, the front substrate of the display panel, by the touch panel manufacturing method according to claim 2.

15. The method for manufacturing a display device provided with a touch panel according to claim 13, wherein the display panel is a liquid crystal panel.

16. The method for manufacturing a display device provided with a touch panel according to claim 14, wherein the display panel is a liquid crystal panel.

* * * * *